US011649922B2

(12) United States Patent
Lyons et al.

(10) Patent No.: US 11,649,922 B2
(45) Date of Patent: May 16, 2023

(54) MULTI-FUNCTION PROJECT SUPPORT SYSTEM

(71) Applicant: Kreg Enterprises, Inc., Huxley, IA (US)

(72) Inventors: Andrew Lyons, West Des Moines, IA (US); Matthew Nazzaro, Runnels, IA (US)

(73) Assignee: Kreg Enterprises, Inc., Ankeny, IA (US)

( * ) Notice: Subject to any disclaimer, the term of this patent is extended or adjusted under 35 U.S.C. 154(b) by 0 days.

(21) Appl. No.: 17/239,915

(22) Filed: Apr. 26, 2021

(65) Prior Publication Data

US 2021/0332941 A1 Oct. 28, 2021

Related U.S. Application Data

(60) Provisional application No. 63/015,797, filed on Apr. 27, 2020.

(51) Int. Cl.
| | |
|---|---|
| *F16M 11/24* | (2006.01) |
| *B05C 13/00* | (2006.01) |
| *B23Q 3/00* | (2006.01) |
| *B05B 13/02* | (2006.01) |
| *B05C 13/02* | (2006.01) |

(52) U.S. Cl.
CPC ............ *F16M 11/24* (2013.01); *B05C 13/00* (2013.01); *B05B 13/0285* (2013.01); *B05C 13/02* (2013.01); *B23Q 3/00* (2013.01); *F16M 2200/08* (2013.01)

(58) Field of Classification Search
CPC ..... B05B 13/0285; B05C 13/02; B05C 13/00; F16M 11/24; F16M 11/20; F16M 2200/08; B25H 1/00; B23Q 3/00
See application file for complete search history.

(56) References Cited

U.S. PATENT DOCUMENTS

| | | | | |
|---|---|---|---|---|
| 2,295,666 | A | * | 9/1942 | King .................... H04M 1/23 248/346.06 |
| 4,545,554 | A | * | 10/1985 | Latino ............... A47B 21/0371 248/188.4 |
| D646,554 | S | | 10/2011 | Krohmer et al. |
| 8,347,811 | B2 | | 1/2013 | Bucci |
| 9,061,399 | B2 | | 6/2015 | Krohmer et al. |
| 9,416,483 | B1 | * | 8/2016 | Freakes ................ F16M 7/00 |
| 9,575,395 | B2 | * | 2/2017 | Unno .................. F16M 11/105 |

(Continued)

*Primary Examiner* — Tan Le
(74) *Attorney, Agent, or Firm* — Brownwinick Law Firm; Christopher A. Proskey

(57) ABSTRACT

In one or more embodiments, a project support system is provided having a base, a dial, a top cover, a moveable member, and a mechanical assembly. The dial is rotatably connected to the base. The top cover has an opening. The mechanical assembly is configured to extend the movable member upward through the opening to a fully extended position in response to the dial being rotated in a first direction relative to the base, thereby providing a smaller upper surface for support of a workpiece. The mechanical assembly is further configured to retract the movable member downward back through the opening to a fully retracted position in response to the dial being rotated in a second opposite direction relative the base, thereby providing a larger upper surface for support of the workpiece.

32 Claims, 68 Drawing Sheets

(56) References Cited

U.S. PATENT DOCUMENTS

| | | | | |
|---|---|---|---|---|
| 2004/0150151 A1* | 8/2004 | Diermeier | ............ | A47J 47/005 269/289 R |
| 2008/0191111 A1* | 8/2008 | Selle | ................ | A47B 91/024 248/302 |
| 2012/0326376 A1* | 12/2012 | Krohmer | ................ | B25B 11/00 269/289 R |

\* cited by examiner

MULTI-FUNCTION PROJECT SUPPORT SYSTEM

CROSS REFERENCE TO RELATED APPLICATIONS

This application claims the benefit of U.S. Provisional Application No. 63/015,797 filed Apr. 27, 2020 and titled MULTI-FUNCTION PROJECT SUPPORT SYSTEM, which is hereby incorporated herein fully by reference in its entirety.

FIELD OF THE DISCLOSURE

This disclosure relates generally to project supports for fabrication, repair, and/or painting of components or articles. More specifically, and without limitation, this disclosure is directed to a multi-function project support system configurable for multiple repair, fabrication, and/or painting tasks.

OVERVIEW OF THE DISCLOSURE

Project supports are known in the art. There are many forms of project supports, which are used to hold a workpiece in a stationary convenient position to facilitate performance of various tasks (e.g., fabrication, repair, painting, finishing, and/or detailing).

Some project supports, like sawhorses, are general purpose project supports applicable to a number of various tasks. These project supports typically have strength and durability sufficient to support workpieces of various weights. Other project supports, are special purpose project supports, specifically tailored for a particular task and/or workpiece. Many general and/or special purpose project supports are not easily portable. Such project supports are permanently installed at a fixed location and/or are bulky and heavy and require effort to move the project support into position when required. Some other project supports, may be portable, but are awkward and/or unwieldly, and take up a lot of space for storage.

One type of special purpose project support for painting is known as paint pyramids (also known as paint points) are pyramid shaped project supports configured to suspend a workpiece above a work surface while painting. These project supports generally have a wider base extending up to a narrow point. Typically, a workpiece is placed on small point of three or more paint point project supports to suspend the workpiece. Because the narrow points of the project supports make minimal contact with the workpiece, the project supports can be used to hold a freshly painted portion of workpiece while drying and/or curing. Accordingly, a workpiece may be painted on a top side and flipped, prior to completely drying and curing, to permit the other side to be painted. The small surface area of contact between the paint point and the workpiece makes minimal damage and marking on the workpiece.

However, paint point project supports are not well suited for use outside of the painting context. For example, the small contact area of pyramid shaped project support is not well suited for holding heavier projects, which may result in damage to project workpiece and/or the project support. Furthermore, with small contact surface area, workpieces are prone to sliding, on the project supports when performing many tasks other than painting. Rather, for many projects, it is preferred to have a support surface with a wider area to contact and hold a workpiece.

Therefore, for all the reasons stated above, and the reasons stated below, there is a need in the art for a multi-function project support having a support surface that can be reconfigured for a variety of different tasks and/or workpieces. It is a primary object of the disclosure to provide a multi-function project support system having a reconfigurable support surface.

Another object of the disclosure is to provide a project support system that is easily and quickly configured for use with any of a number of different shaped and sized workpieces.

Yet another object of the disclosure is to provide a project support that is strong, robust, and durable.

Another object of the disclosure is to provide a project support system that can be used in many applications.

Yet another object of the disclosure is to provide a project support that can be used with practically any support surface or workbench.

Another object of the disclosure is to provide a project support system that provides unique functionality.

Yet another object of the disclosure is to provide a project support that is fast to use.

Another object of the disclosure is to provide a project support system that is safe to use.

Yet another object of the disclosure is to provide a project support that saves time.

Another object of the disclosure is to provide a project support that is compact in size.

Yet another object of the disclosure is to provide a project support that is easily stored.

Another object of the disclosure is to provide a project support system that is portable.

Yet another object of the disclosure is to provide a project support system that is easy and intuitive to use.

Another object of the disclosure is to provide a project support system that has a long useful life.

Yet another object of the disclosure is to provide a project support system that can support a painted surface prior to fully drying.

Another object of the disclosure is to provide a project support system that is high quality.

Yet another object of the disclosure is to provide a project support system that improves the quality of the products made using the device.

Another object of the disclosure is to provide a project support system that prevents workpieces from slipping.

Yet another object of the disclosure is to provide a project support system that has a high coefficient of friction.

Another object of the disclosure is to provide a project support system that converts between having a large upper surface area of contact and a small upper surface area of contact.

These and other objects, features, or advantages of the disclosure will become apparent from the specification, figures, and claims.

SUMMARY OF THE DISCLOSURE

Figure 1:
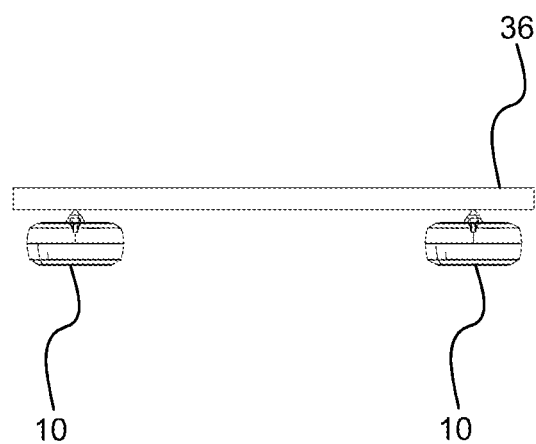
FIG. 1 shows a front view of a workpiece supported by a set of project support systems, in accordance with one or more arrangements of the present disclosure; the view showing movable members of project support systems in a fully extended position.
Figure 2:
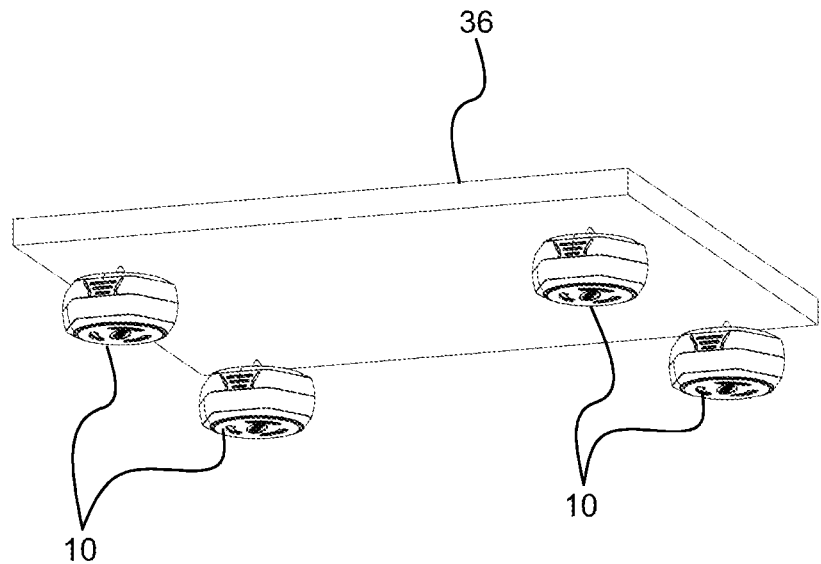
FIG. 2 shows a lower front left perspective view of a workpiece supported by a set of project support systems, in accordance with one or more arrangements of the present disclosure; the view showing movable members of project support systems in a fully extended position.
Figure 3:
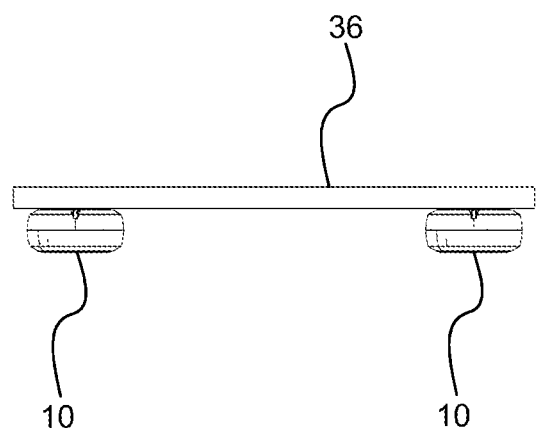
FIG. 3 shows a front view of a workpiece supported by a set of project support systems, in accordance with one or more arrangements of the present disclosure; the view showing movable members of project support systems in a fully retracted position.
Figure 4:
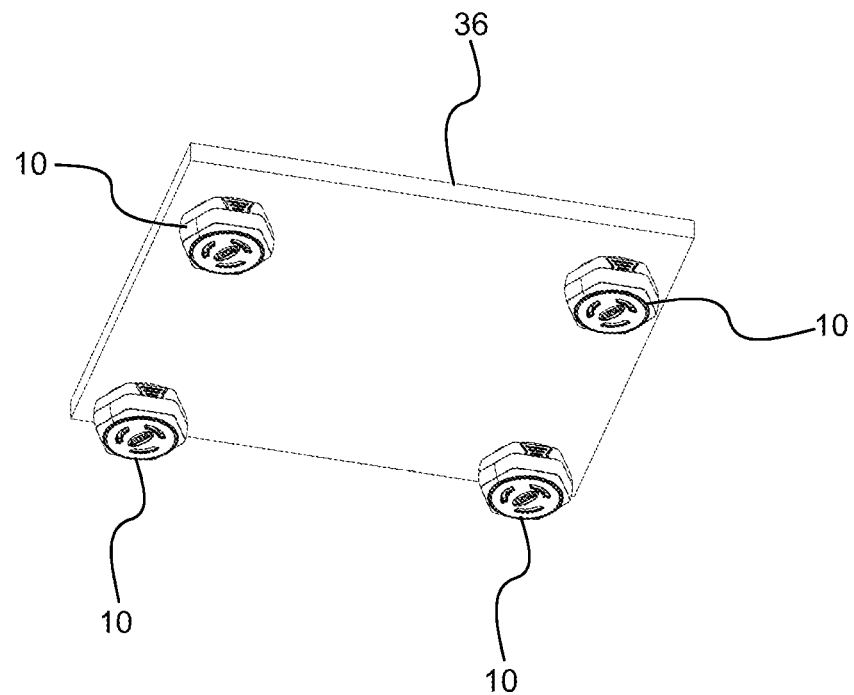
FIG. 4 shows a lower front left perspective view of a workpiece supported by a set of project support systems, in accordance with one or more arrangements of the present disclosure; the view showing movable members of project support systems in a fully retracted position.
Figure 5:
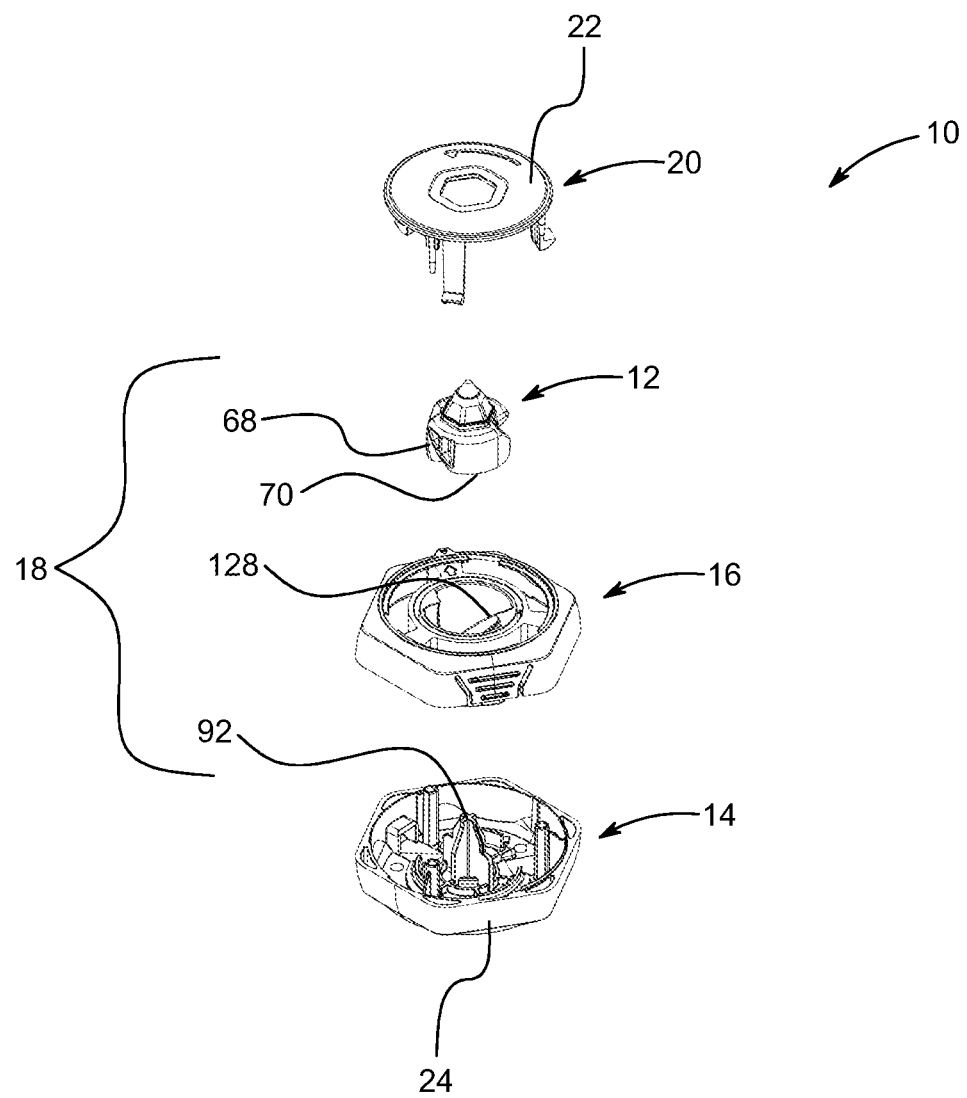
FIG. 5 shows an exploded upper front right perspective view of a project support system, in accordance with one or more arrangements of the present disclosure.
Figure 6:
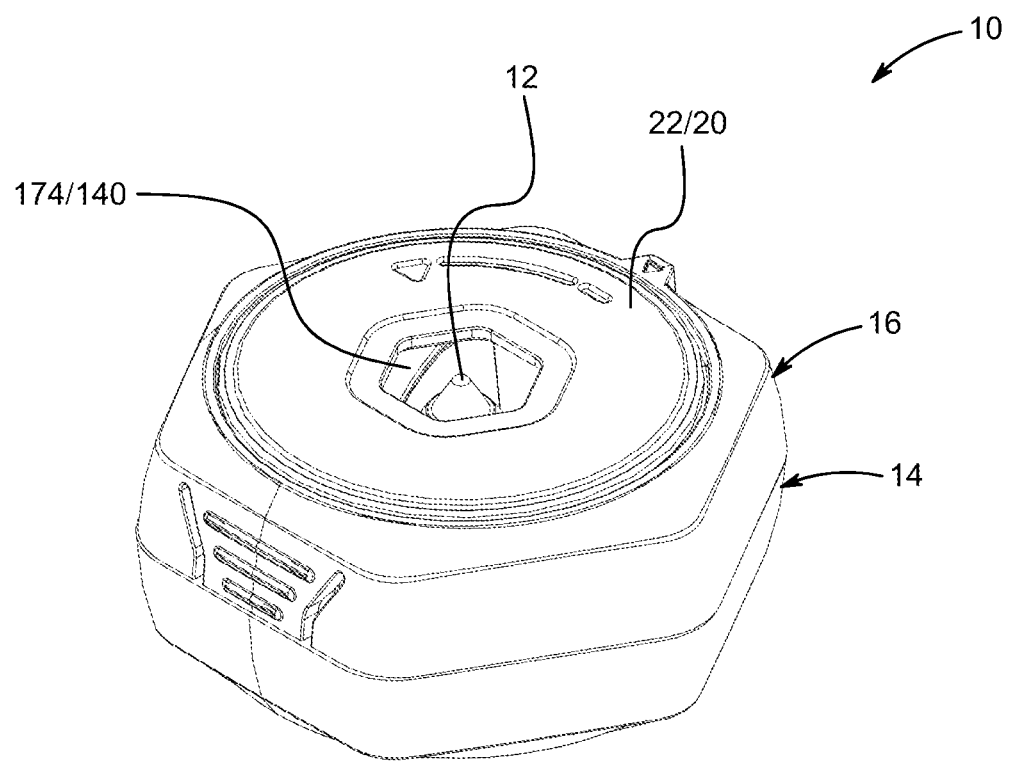
FIG. 6 shows an upper front left perspective view of a project support system, in accordance with one or more arrangements of the present disclosure; the view showing movable members of project support systems in a fully retracted position.
Figure 7:
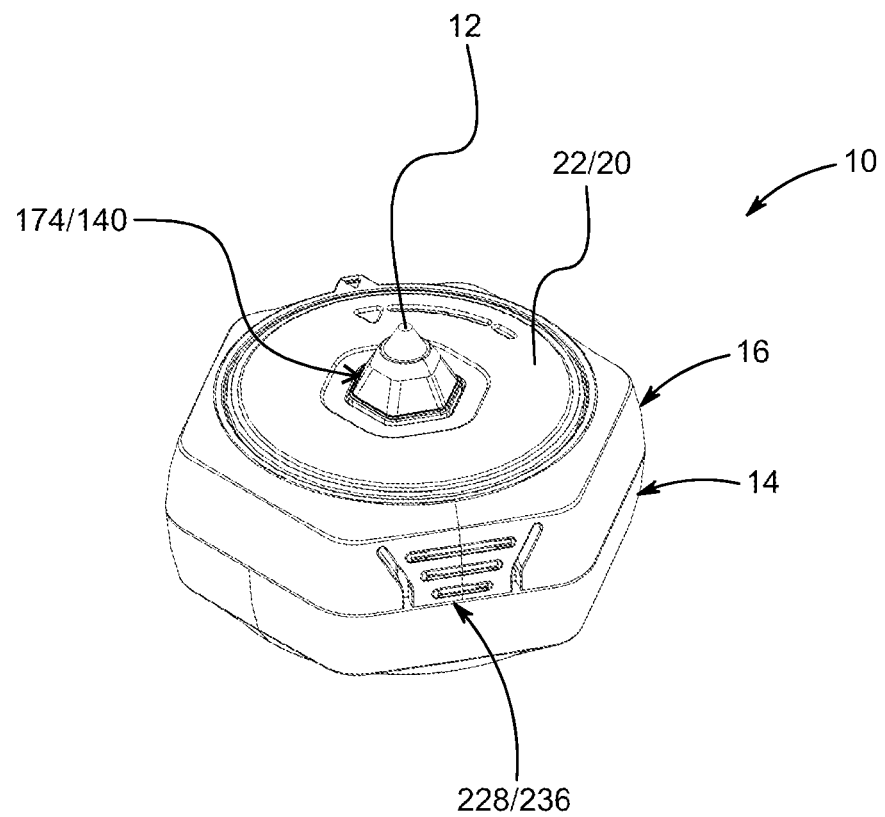
FIG. 7 shows an upper front right perspective view of a project support system, in accordance with one or more arrangements of the present disclosure; the view showing movable members of project support systems in a fully extended position.
Figure 8:
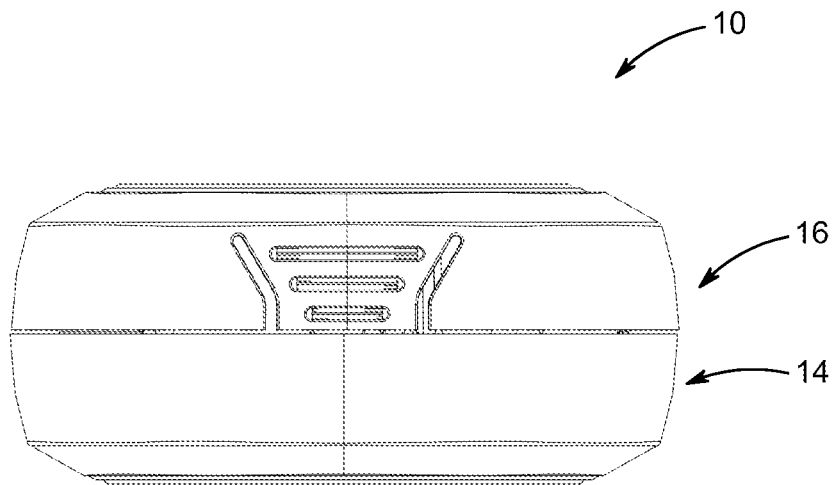
FIG. 8 shows a front view of a project support system, in accordance with one or more arrangements of the present disclosure; the view showing movable members of project support systems in a fully retracted position.
Figure 9:
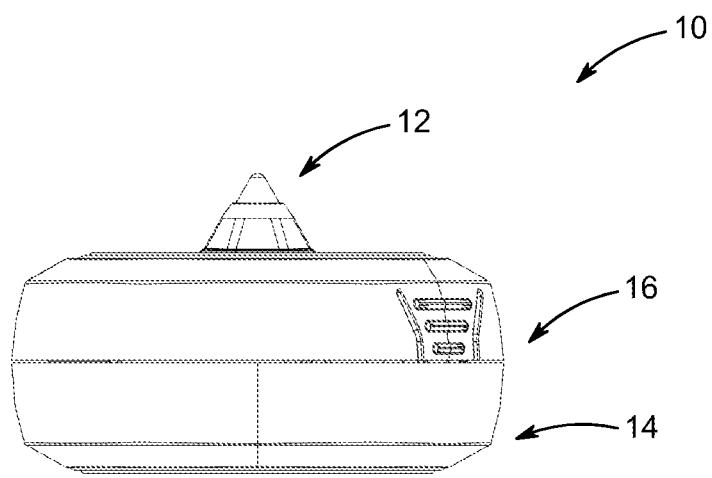
FIG. 9 shows a front right view of a project support system, in accordance with one or more arrangements of the present disclosure; the view showing movable members of project support systems in a fully extended position.
Figure 10:
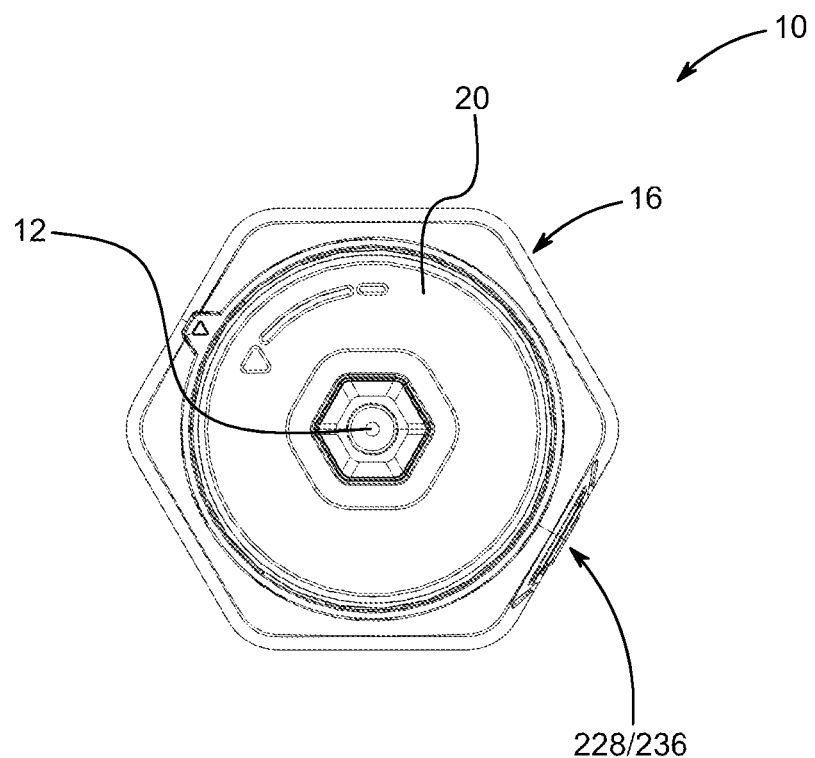
FIG. 10 shows a top view of a project support system, in accordance with one or more arrangements of the present disclosure; the view showing movable members of project support systems in a fully extended position.
Figure 11:
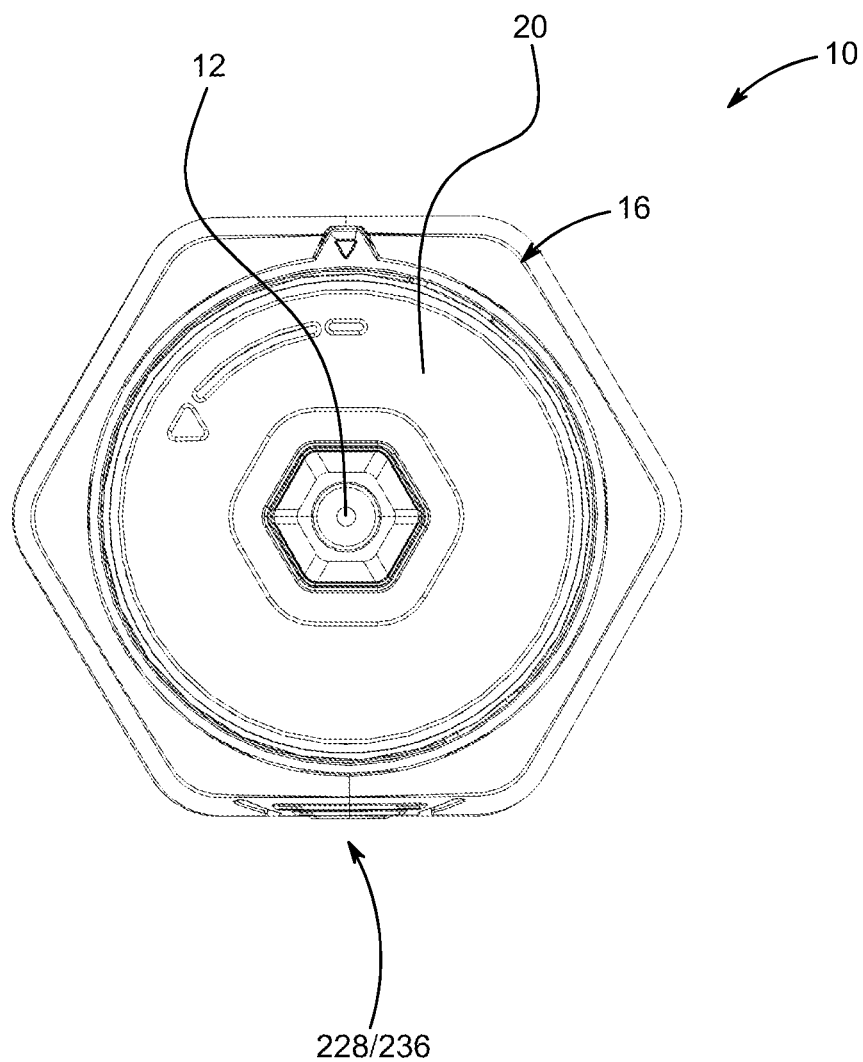
FIG. 11 shows a top view of a project support system, in accordance with one or more arrangements of the present disclosure; the view showing movable members of project support systems in a fully retracted position.
Figure 12:
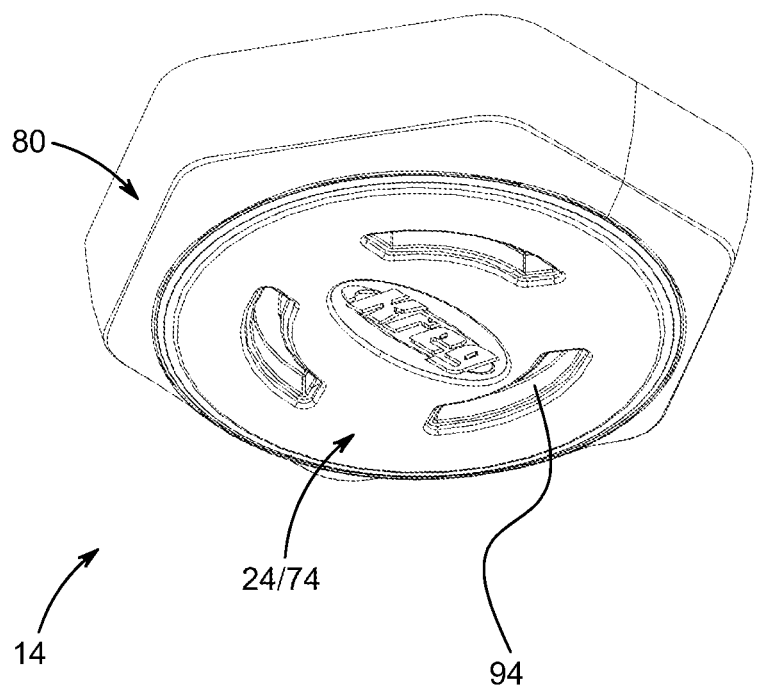
FIG. 12 shows a lower rear left perspective view of a base of a project support system, in accordance with one or more arrangements of the present disclosure.
Figure 13:
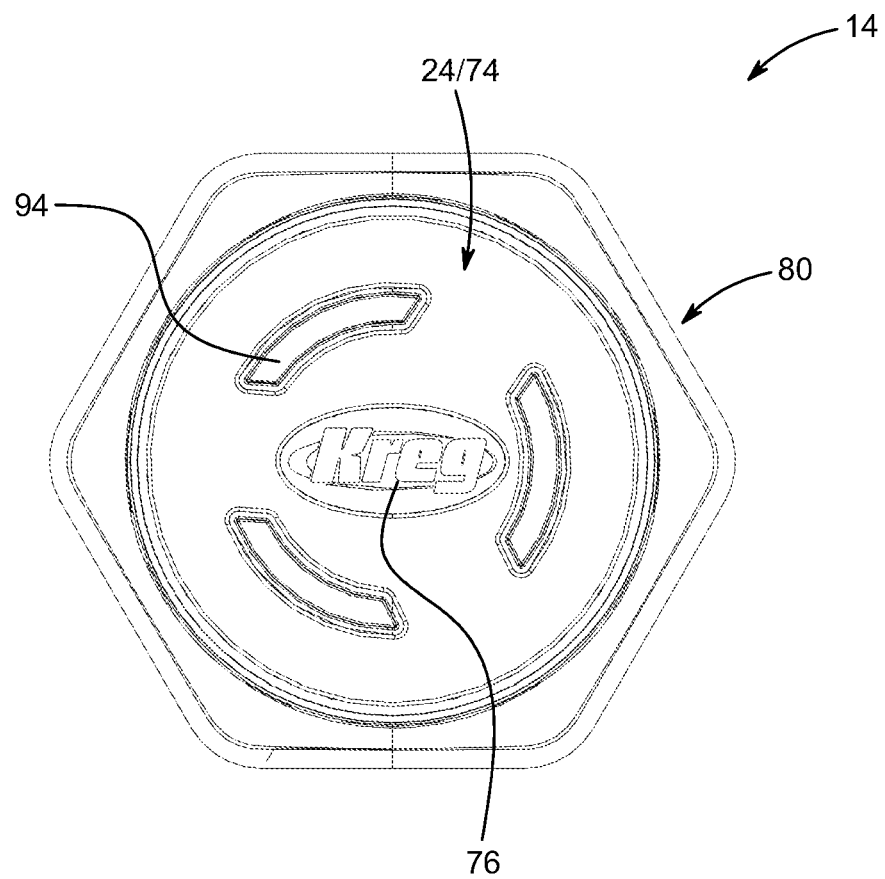
FIG. 13 shows a bottom view of a base of a project support system, in accordance with one or more arrangements of the present disclosure.
Figure 14:
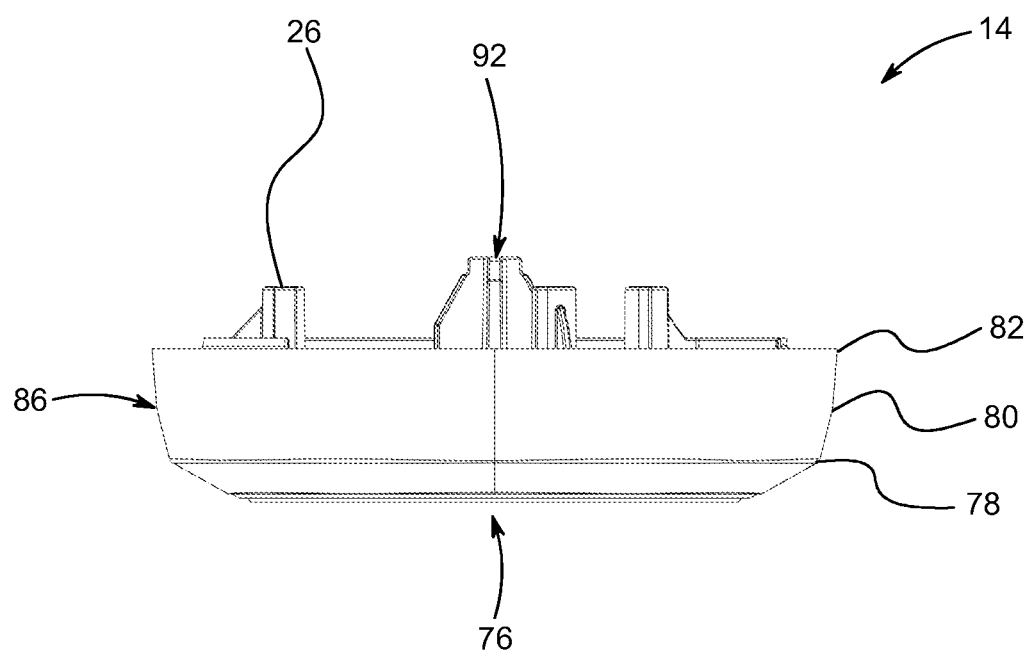
FIG. 14 shows a rear view of a base of a project support system, in accordance with one or more arrangements of the present disclosure.

In one or more embodiments, a project support system is provided. The project support system includes a base, a dial, a top cover, a moveable member, and a mechanical assembly. The dial is rotatably connected to the base. The top cover has a hollow interior, an interior edge adjacent the hollow interior, and a first surface extending outward from an interior edge to an exterior edge. The movable member has a top and a bottom. The top of the movable member has a second surface having an area that is smaller than that of the first surface. The mechanical assembly is configured and arranged to extend the movable member upward through the hollow interior to a fully extended position in response to the dial being rotated in a first direction relative to the base. The mechanical assembly is further configured and arranged to retract the movable member downward back through the hollow interior to a fully retracted position in response to the dial being rotated in a second direction relative the base. The second direction being opposite the first direction.

In one or more embodiments, the base has an upper exterior edge and a lower exterior edge. The base has a bottom, which extends outward from a center point to the lower exterior edge. The lower exterior edge extends around the center point. The base has an exterior side surface extending between the upper exterior edge and the bottom. The dial has an axis of rotation through the center point of the base.

In one or more embodiments, in the fully extended position, the second surface is above the first surface. In the fully retracted position, the second surface is below the first surface.

In one or more embodiments, the movable member has a tapered shape.

In one or more embodiments, the movable member includes an exterior side surface having a cylindrical shape and extending between an upper end and a lower end. The movable member includes a first set of helical features on the exterior side surface. The dial includes a second set of helical features. The second set of helical features are configured to engage the first set of helical features and move the movable member upward in response to the dial being rotated in the first direction.

In one or more embodiments, the movable member includes a first vertical guide feature. The base includes a second vertical guide feature. The second vertical guide feature being configured to engage the first vertical guide feature and prevent the movable member from being rotated relative to the base when the dial is rotated relative to the base.

In one or more embodiments, the movable member includes a recess in the bottom of the movable member. The movable member includes a first set of helical features in the recess of the movable member. The base includes a second set of helical features. The second set of helical features are configured to engage the first set of helical features and move the movable member upward in response to the dial being rotated in the first direction.

In one or more embodiments, the movable member includes a first vertical guide feature. The dial includes a second vertical guide feature. The second vertical guide feature is configured to engage the first vertical guide feature and rotate the movable member along with the dial when the dial is rotated relative to the base.

In one or more embodiments, the dial includes an exterior portion having a ring shape. Exterior portion has an exterior surface, extending between a lower exterior edge and an upper exterior edge, and an interior surface. The dial includes an interior portion having a ring shape with a hollow interior. The interior portion has a top surface, a bottom surface, an interior surface extending between the top and bottom surfaces, and an exterior surface extending between the top and bottom surfaces. The dial includes a plurality of connection members operably connecting the interior portion to the exterior portion.

In one or more embodiments, the system includes a pad attached to the first surface of the top cover. The pad has a higher coefficient of friction than a material forming the top cover.

In one or more embodiments, the system includes a pad attached to a bottom surface of the base. The pad has a higher coefficient of friction than a material forming the base.

In one or more embodiments, the system includes at least one stop member. The stop member is configured and arranged to prevent the dial from being rotated in the first direction when the movable member is in the fully extended position. The stop member is configured and arranged to prevent the dial from being rotated in second direction when the movable member is in the fully retracted position. In one or more embodiments, the stop member has an elongated shape extending from the base to the top cover through an opening of the dial.

In one or more embodiments, the system includes one or more lock features. The lock features are configured and arranged to inhibit rotation of the dial when the movable member is in the fully extended position. In some embodiments, the lock features are configured and arranged to inhibit rotation of the dial when the movable member is in the fully retracted position.

DETAILED DESCRIPTION OF THE DISCLOSURE

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of project supports. However, the embodiments are not so limited. In is appreciated that the embodiments may be adapted for use in other applications which may be improved by the disclosed structures, arrangements and/or methods. The system is merely shown and described as being used in in the context of project supports for ease of description and as one of countless examples.

System 10:

With reference to the figures, a multi-function project support system 10 (or project support system 10 or simply system 10) is presented. The system 10 is formed of any suitable size, shape and design and is configured to provide a reconfigurable support surface for support of workpieces. In an arrangement shown, as one example, the system 10 includes the following component pieces: a movable member 12, a base 14, a dial 16, a mechanical assembly 18, a top cover 20, a top surface pad 22, a bottom pad 24, rotation stop members 26, and lock features 28 among other components.

In an arrangement shown, for example, system 10 is reconfigurable to provide either a larger support surface or a smaller support surface for support of a workpiece 36. In an arrangement shown, for example, components of system 10 are configured to facilitate extension of movable member 12 upward through an opening through hollow interior 140 of top cover 20, which has a larger surface area, to provide a smaller support surface for support of workpiece 36. In one example arrangement, components of system 10 are configured to extend movable member 12 upward in response to dial 16 being rotated in a first direction relative to the base 14 to a fully extended position. In this example arrangement, components of system 10 are configured to retract movable member 12 downward in response to dial 16 being rotated in the opposite direction to provide the larger support surface to a fully retracted position.

Movable Member 12:

In one or more arrangements, system 10 includes a movable member 12. Movable member 12 is formed of any suitable size, shape and design and is configured to provide a smaller support surface when in a fully extended position and facilitate extension and/or retraction of movable member 12 in response to rotation of dial 16 relative to base 14. In the arrangement shown, as one example, movable member 12 includes a top 42 and a bottom 44. When movable member 12 is extended through a hollow interior 140 in top cover 20 to a fully extended position, top 42 provides a support surface having a smaller area than the surface of top cover 20 of system 10. When workpiece 36 is placed on the project support system 10 with movable member 12 in the fully extended position, only the small surface of top 42 makes contact with and supports workpiece 36.

In one arrangement shown, as one example, movable member 12 includes a lower portion 48 and an upper portion 64.

In this example arrangement, lower portion 48 has a cylindrical-shaped exterior side surface 50 extending around a center point or center axis that extends vertically through the center of movable member 12. In the arrangement shown, as one example, lower portion extends a length between an upper end 54 and a lower end 56.

In this example arrangement, upper portion 64 has an exterior side surface 66 extending from upper end 54 of exterior side surface 50 of lower portion 48 to top 42 of movable member 12. In one arrangement shown, as one example, exterior side surface 66 has a tapered shape that reduces in diameter from a larger diameter of exterior side surface 50 at lower portion 48 to a smaller diameter at top 42 of movable member 12. However, any other size, shape and design is hereby contemplated for use.

In the arrangement shown, as one example, upper portion 64 is formed of a pyramid-type shape having six triangular shaped panels that extend from the upper end 54 of lower portion 48 to top 42. These panels angle toward one another as they extend upward before terminating at top 42. However any other shape or configuration is hereby contemplated for use as upper portion 64, such as a square, rectangular, cone-shaped, and cylindrical or any other shaped member.

Top 42 of movable member 12 is formed of any suitable size, shape, and design and are configured to facilitate support of a workpiece 36 with a smaller support surface while preventing damage to workpiece 36. In the arrangement shown, as one example top 42 has a curved or rounded top surface. In this example arrangement, only a small portion of the curved/rounded surface of top 42 makes contact with a supported workpiece 36 but is large enough to prevent denting, puncturing, marring, or scratching of workpiece 36. Any other shape is hereby contemplated for use for top 42, such as a flat planar shape, or a point, such as a sharp point or multiple points or any other shape or configuration.

Helical Guide Features 68:

In an arrangement shown, as one example, movable member 12 includes a helical guide feature 68. Helical guide feature 68 is formed of any suitable size, shape, and design and is configured to facilitate movement of movable member 12 in response to rotation of dial 16 relative to base 14.

In the arrangement shown, as one example, helical guide feature 68 includes helical shaped recesses formed in exterior side surface 50 of moveable member 12. Helical guide feature 68 is configured to mate with corresponding helical guide feature 128 of dial 16 to cause movable member 12 to move up and/or down as movable member 12 is rotated relative to dial 16 or alternatively as dial 16 is rotated relative to movable member 12. Conversely, in some arrangements, helical guide features 68 may be protrusions and helical guide features 128 may be recesses. Or, helical guide features 68, 128 may be a combination of recesses and grooves.

In the arrangement shown, as one example, helical guide features 68 and 128 have a counter-clockwise rotation as the features extend upward. However, it is contemplated that in some embodiments helical guide features 68 and 128 may be configured to have a clockwise rotation.

In this example arrangement, movable member 12 and dial 16 each include three helical guide features 68/128 spaced approximately 120 degrees apart. However, embodiments are not so limited. Rather, it is contemplated that various embodiments may include a greater or lesser number of helical guide features 68/128 and/or have helical guide features with different spacing and/or placement. Any number of helical guide features 68 are hereby contemplated for use such as one, two, three, four, five, six, seven, eight, nine, ten or more.

Vertical Guide Features 70:

In this example arrangement, movable member 12 also includes vertical guide feature 70 formed in bottom 44 of movable member 12. Vertical guide feature 70 is formed of any suitable size, shape, and design and is configured to prevent rotation of movable member 12 while permitting movable member 12 to be moved up and/or down between a fully extended position and a fully retracted position. In the arrangement shown, as one example, vertical guide feature 70 includes a cross-shaped recess extending upward in bottom 44 of movable member 12. Vertical guide feature 70 is configured to mate with a corresponding vertical guide feature 92 extending upward from a bottom 74 of base 14. In this arrangement, sides of vertical guide feature 70 engage with sides of vertical guide feature 92 to prevent movable member 12 from being rotated relative to base 14. Any other size, shape or design is hereby contemplated for use for vertical guide feature 70, such as a square member, a rectangular member, or any non-round member or the like or any combination thereof.

Base 14:

In one or more arrangements, system 10 includes a base 14. Base 14 is formed of any suitable size, shape and design and is configured to hold movable member 12, dial 16, mechanical assembly 18, top cover 20, top surface pad 22, rotation stop members 26, and/or lock features 28, so as to facilitate operation of the project support system 10. In the arrangement shown, as one example, base 14 holds dial 16 such that dial 16 rotates within base 14.

In the arrangement shown, as one example, base 14 has a bottom 74. Bottom 74 is formed of any suitable size, shape and design and is configured to support base 14 on a surface and facilitate smooth operation of system 10. In one arrangement shown, as one example, bottom 74 has a generally planar hexagonal shape that extends outward from a center point 76 to a lower exterior edge 78, which extends around the center point 76. In this example arrangement, bottom 74 includes a number of holes 94. Holes 94 may beneficially facilitate removal of materials (e.g., sawdust) that fall into base 14 through hollow interior 140 of top cover 20 during use. Additionally, or alternatively, holes 94 may facilitate connection of base 14 to other components of system 10 such as, for example, bottom pad 24.

Figure 21:
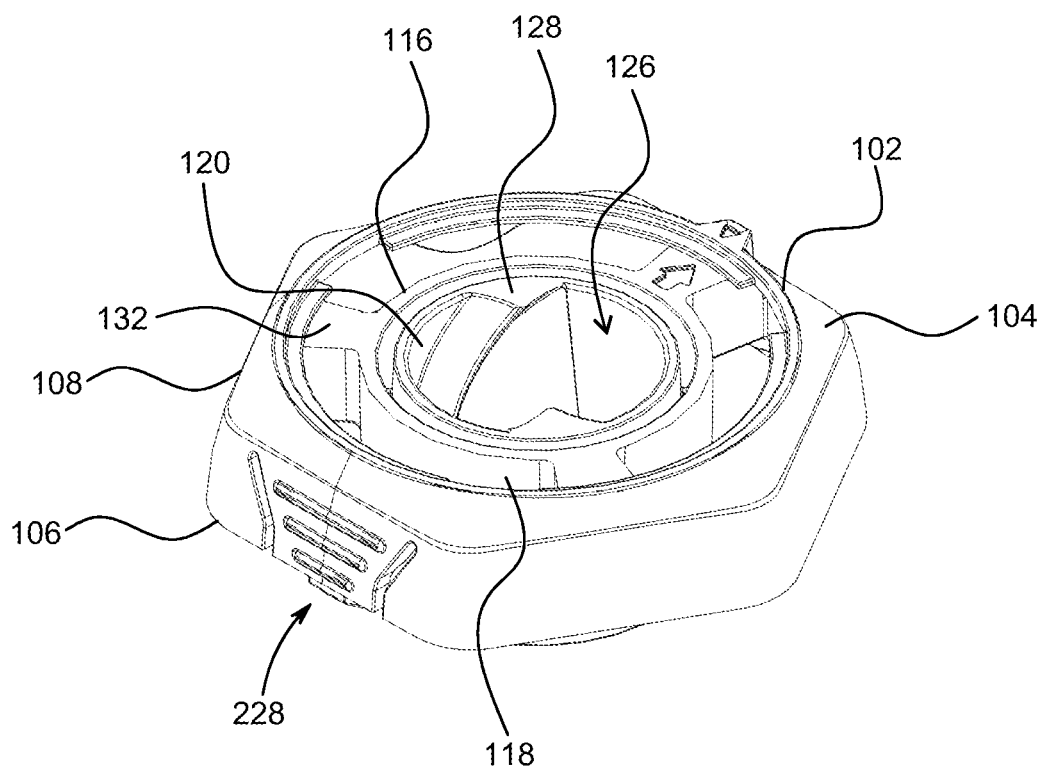
FIG. 21 shows an upper front left perspective view of a dial of a project support system, in accordance with one or more arrangements of the present disclosure.
Figure 22:
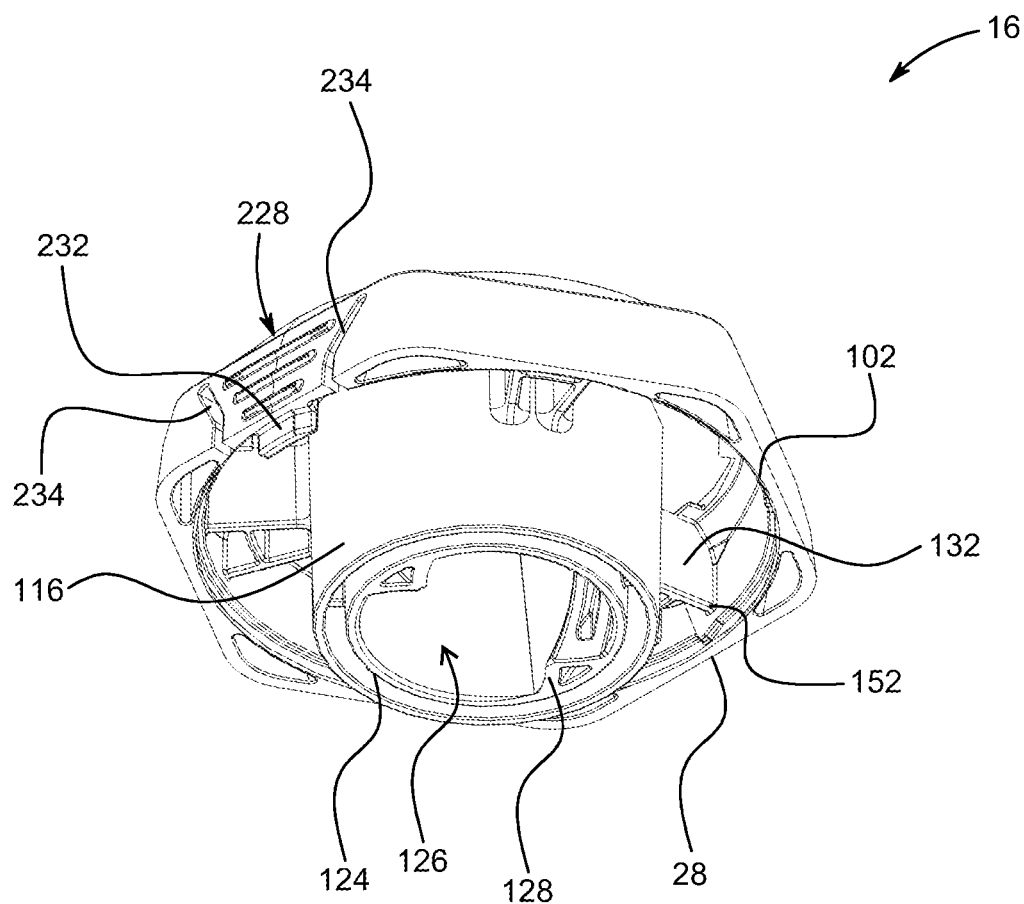
FIG. 22 shows a lower front left perspective view of a dial of a project support system, in accordance with one or more arrangements of the present disclosure.
Figure 23:
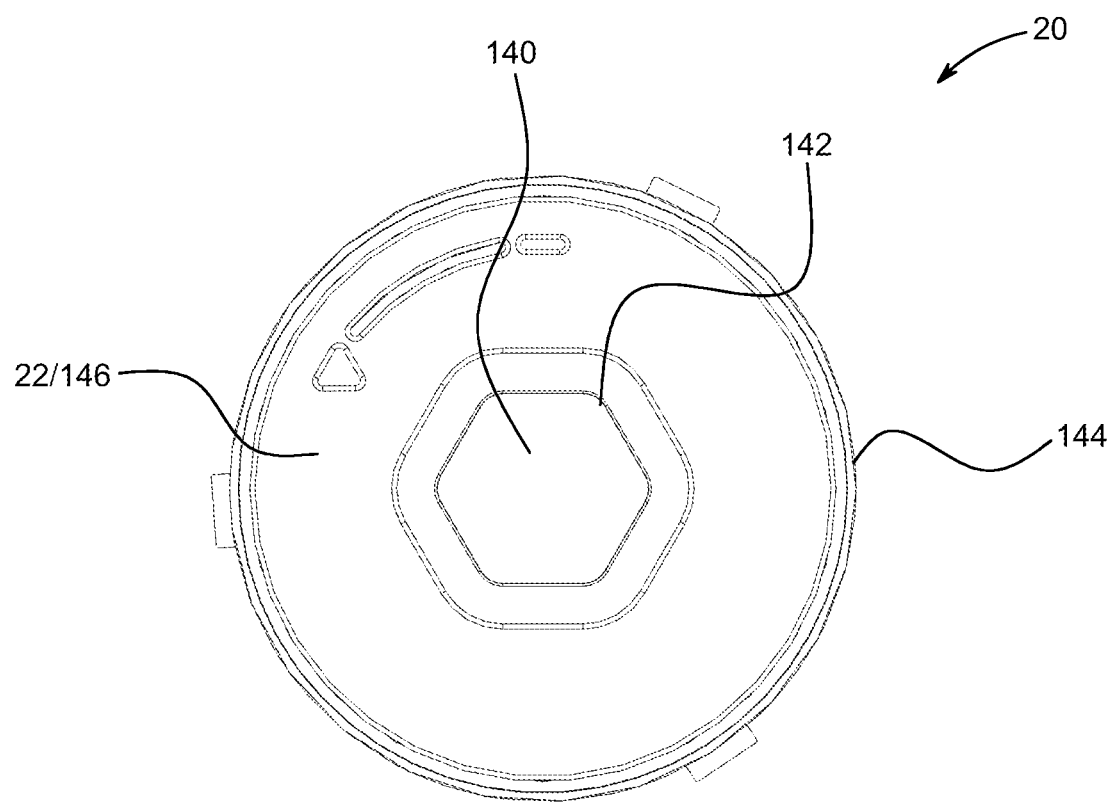
FIG. 23 shows a top view of a dial of a project support system, in accordance with one or more arrangements of the present disclosure.
Figure 24:
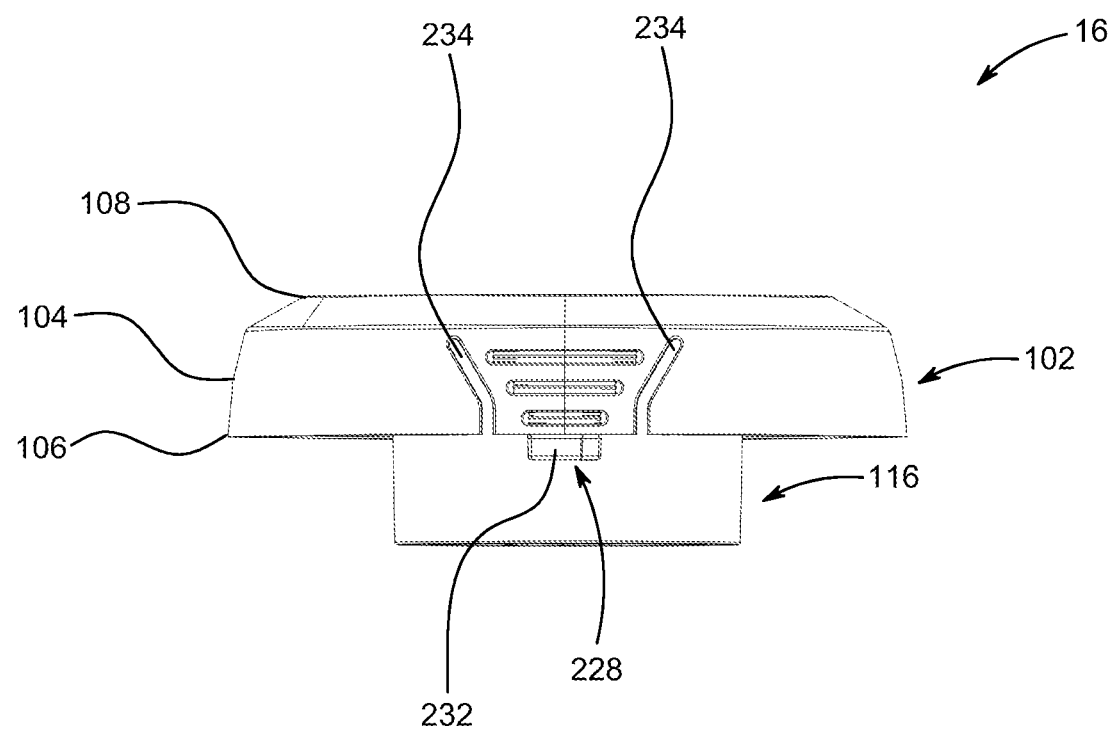
FIG. 24 shows a front view of a dial of a project support system, in accordance with one or more arrangements of the present disclosure.
Figure 25:
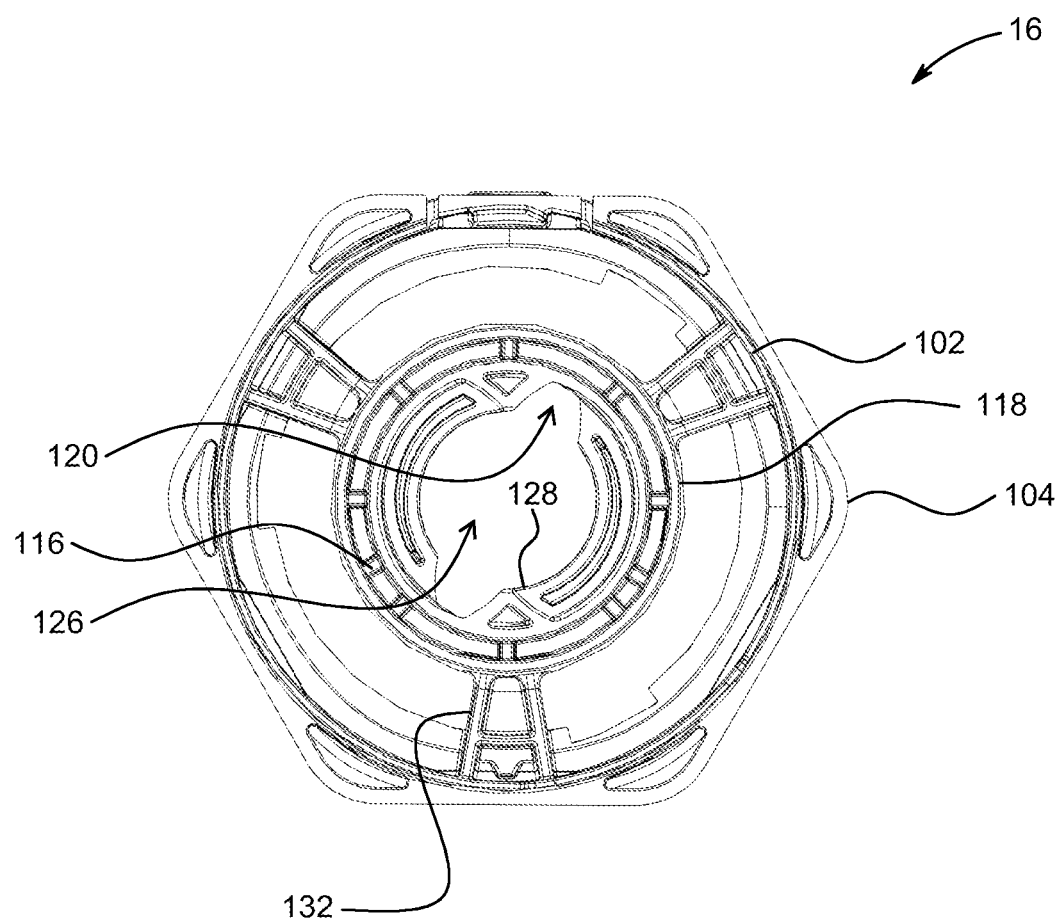
FIG. 25 shows a bottom view of a dial of a project support system, in accordance with one or more arrangements of the present disclosure.
Figure 26:
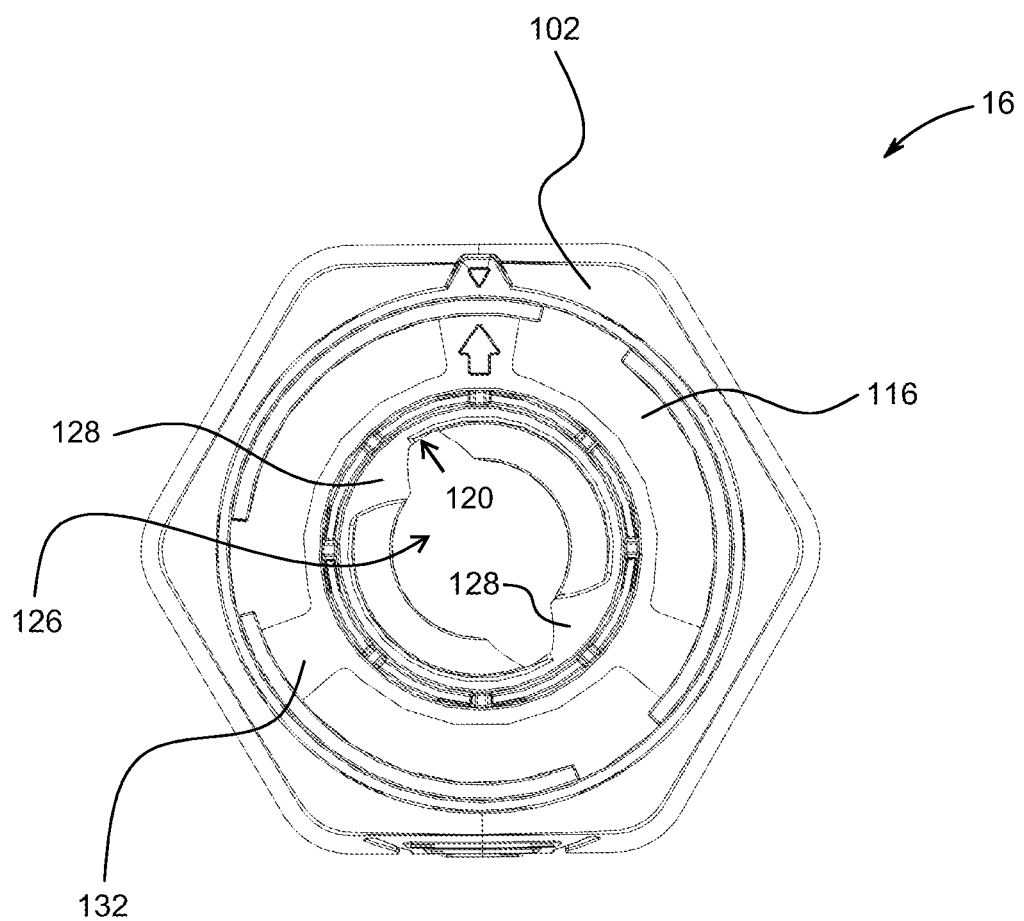
FIG. 26 shows a top view of a dial of a project support system, in accordance with one or more arrangements of the present disclosure.
Figure 27:
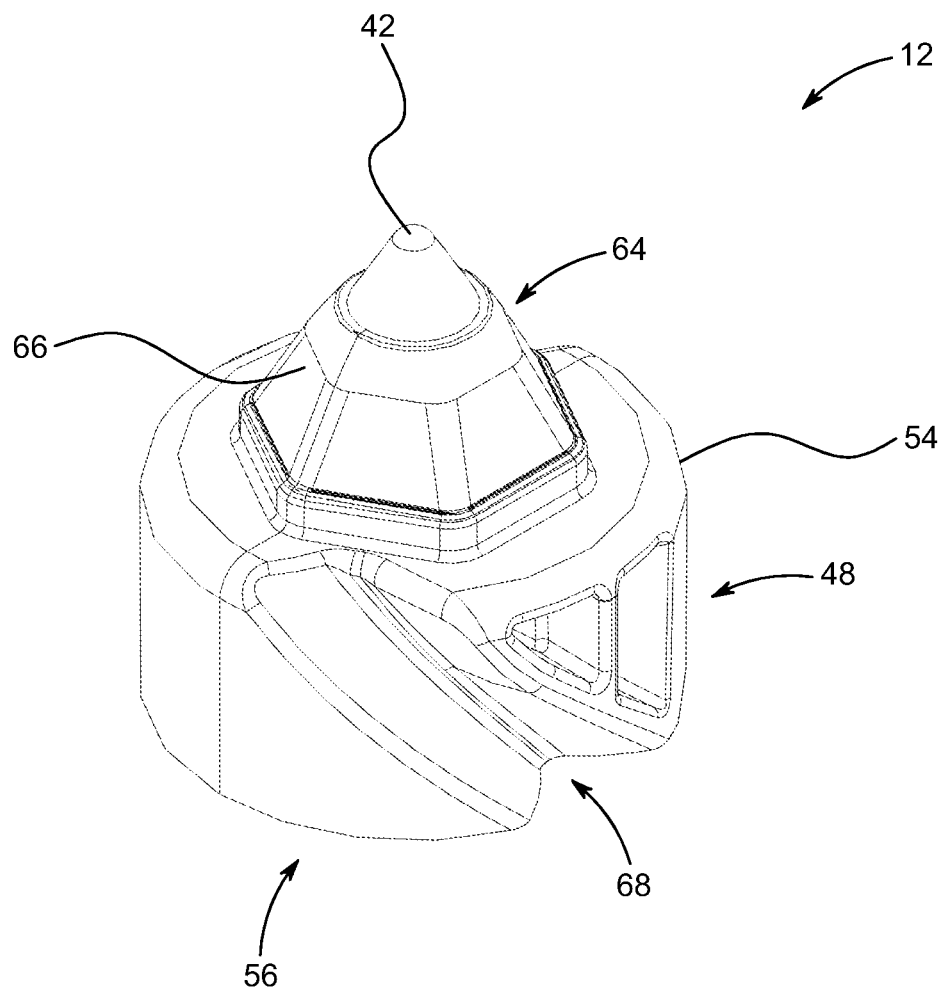
FIG. 27 shows an upper front perspective view of a movable member of a project support system, in accordance with one or more arrangements of the present disclosure.
Figure 28:
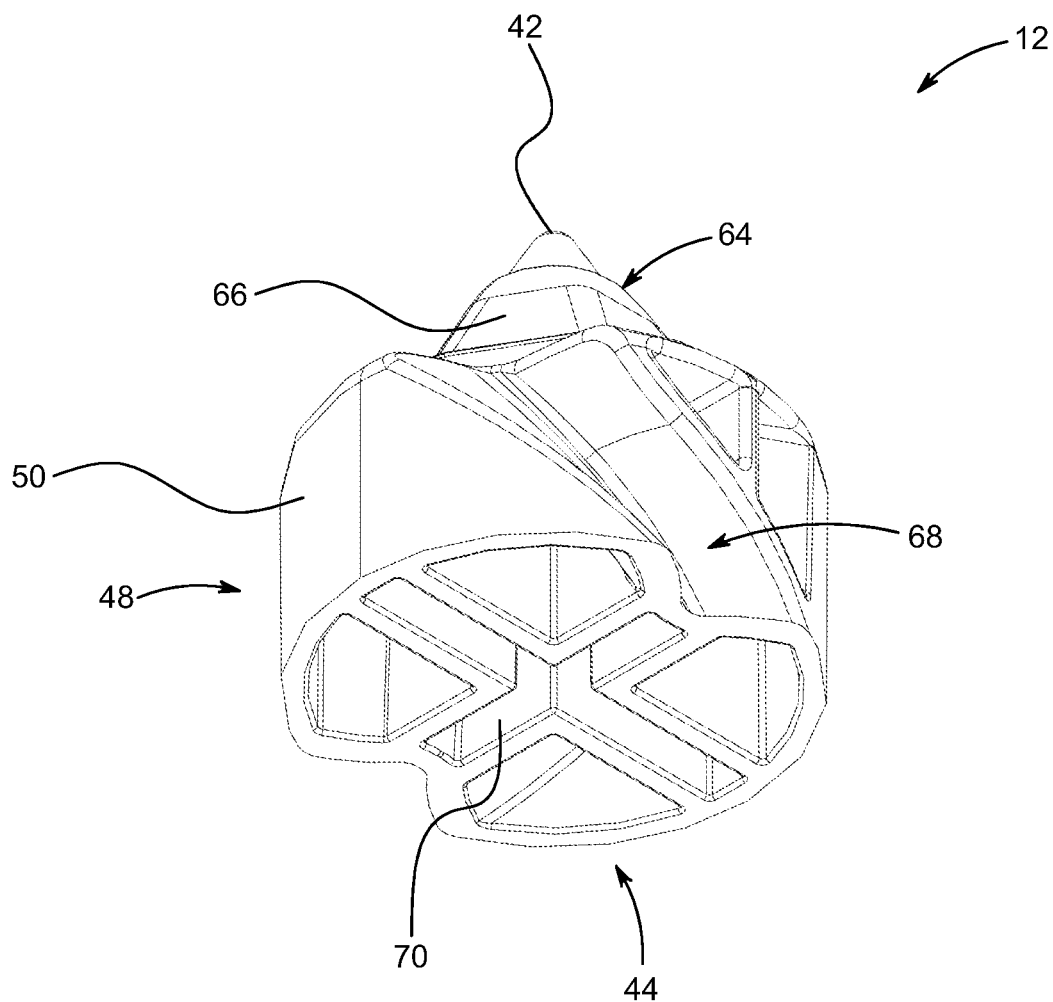
FIG. 28 shows a lower front perspective view of a movable member of a project support system, in accordance with one or more arrangements of the present disclosure.
Figure 29:
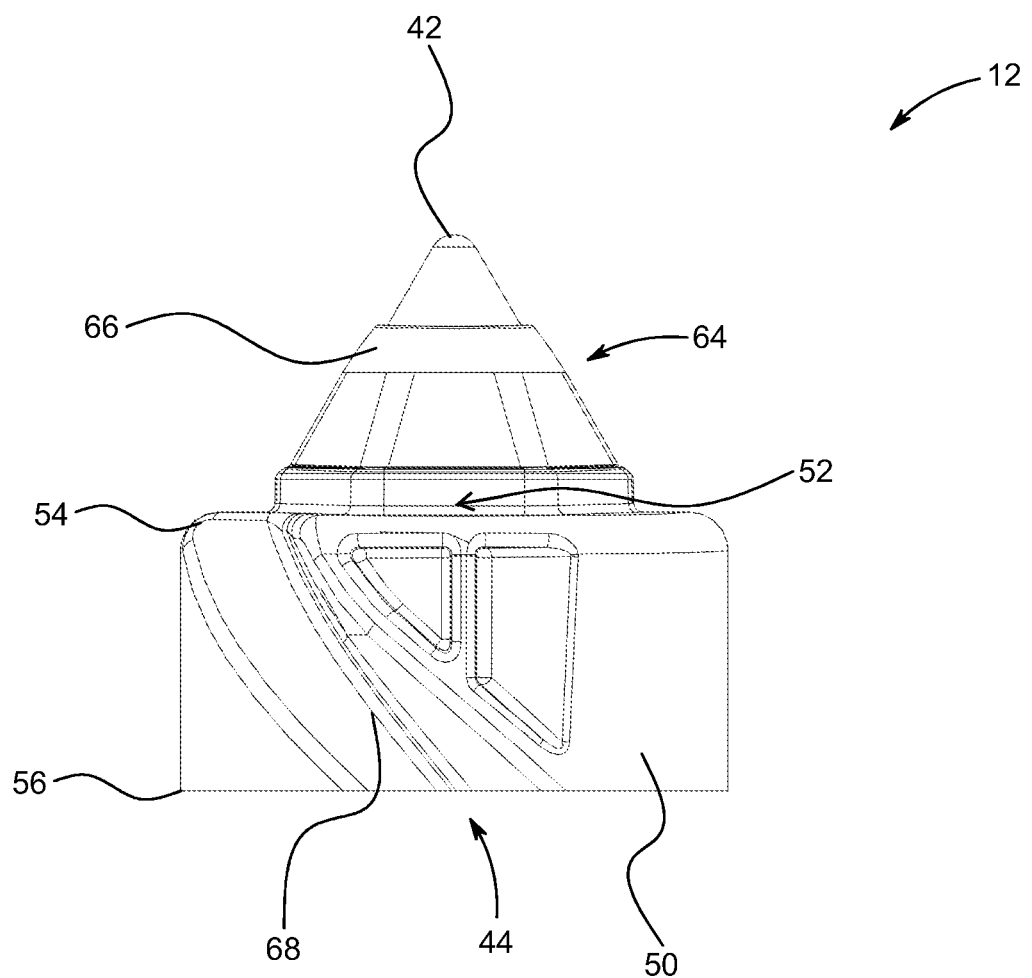
FIG. 29 shows a front view of a movable member of a project support system, in accordance with one or more arrangements of the present disclosure.
Figure 30:
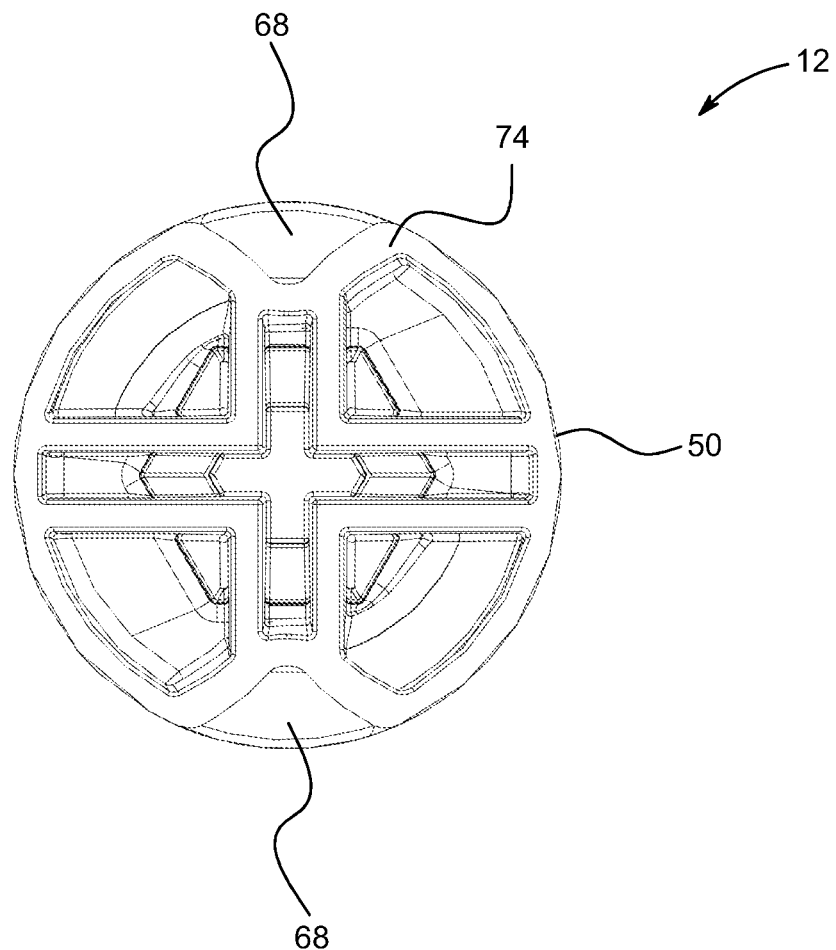
FIG. 30 shows a bottom view of a movable member of a project support system, in accordance with one or more arrangements of the present disclosure.
Figure 31:
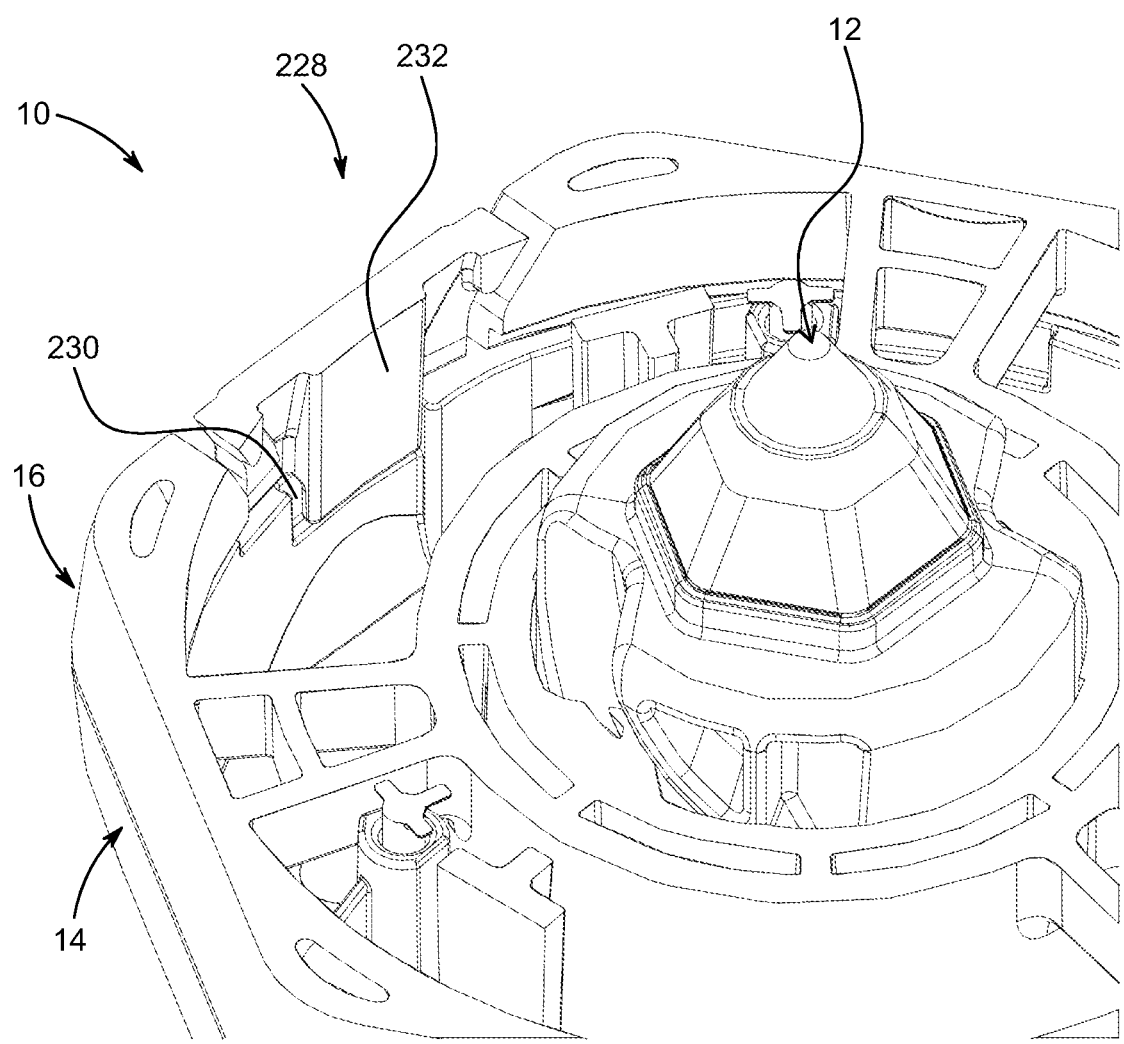
FIG. 31 shows a partial upper rear left perspective view of a project support system, in accordance with one or more arrangements of the present disclosure; the view showing top cover and top pad omitted.
Figure 32:
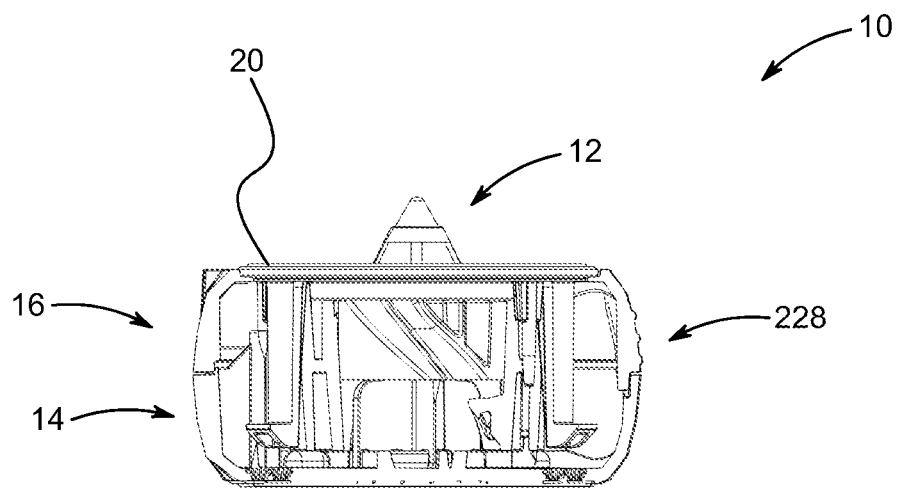
FIG. 32 shows a cross section right side view of a project support system, in accordance with one or more arrangements of the present disclosure.
Figure 33:
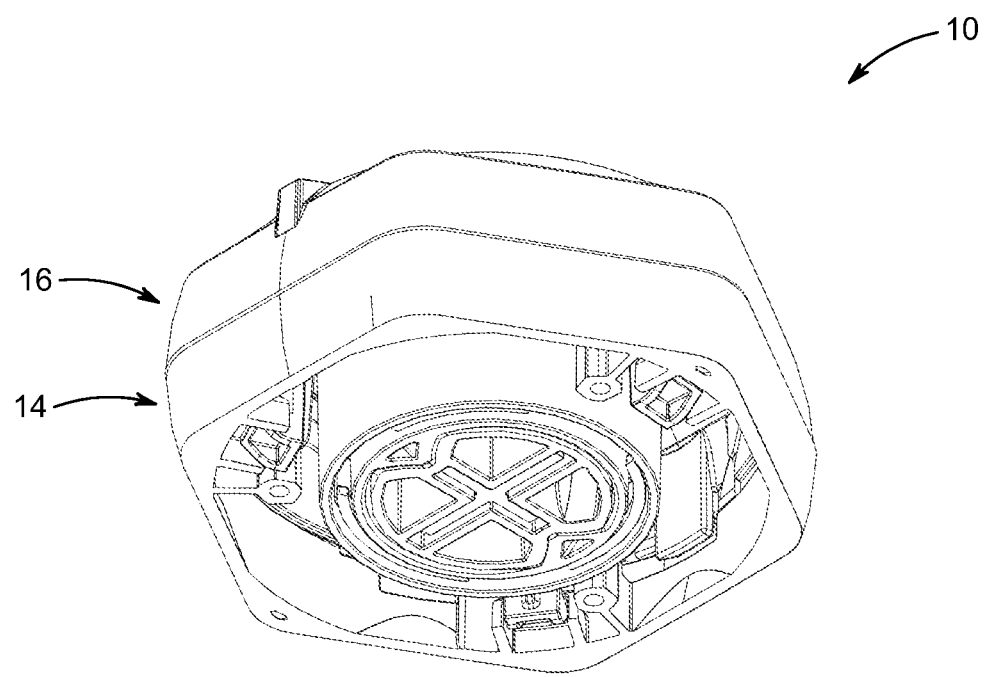
FIG. 33 shows lower rear right perspective view of a project support system, in accordance with one or more arrangements of the present disclosure; the view showing system with a bottom pad and a bottom of base omitted.
Figure 34:
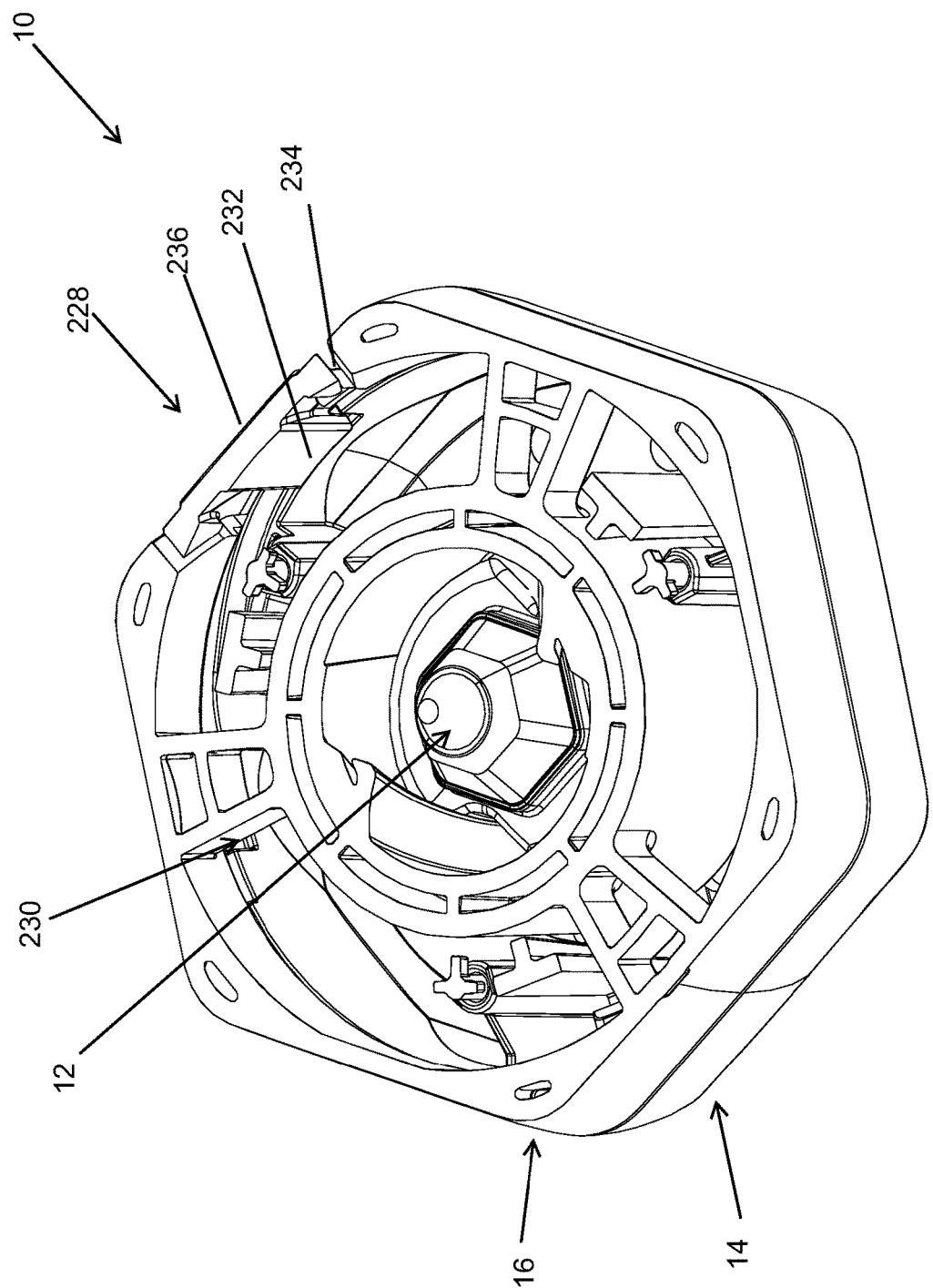
FIG. 34 shows an upper rear right perspective view of a project support system having a lock feature, in accordance with one or more arrangements of the present disclosure; the view showing top cover and top pad omitted; the view showing the dial rotated relative to the base to move the movable member to a fully retracted position.
Figure 35:
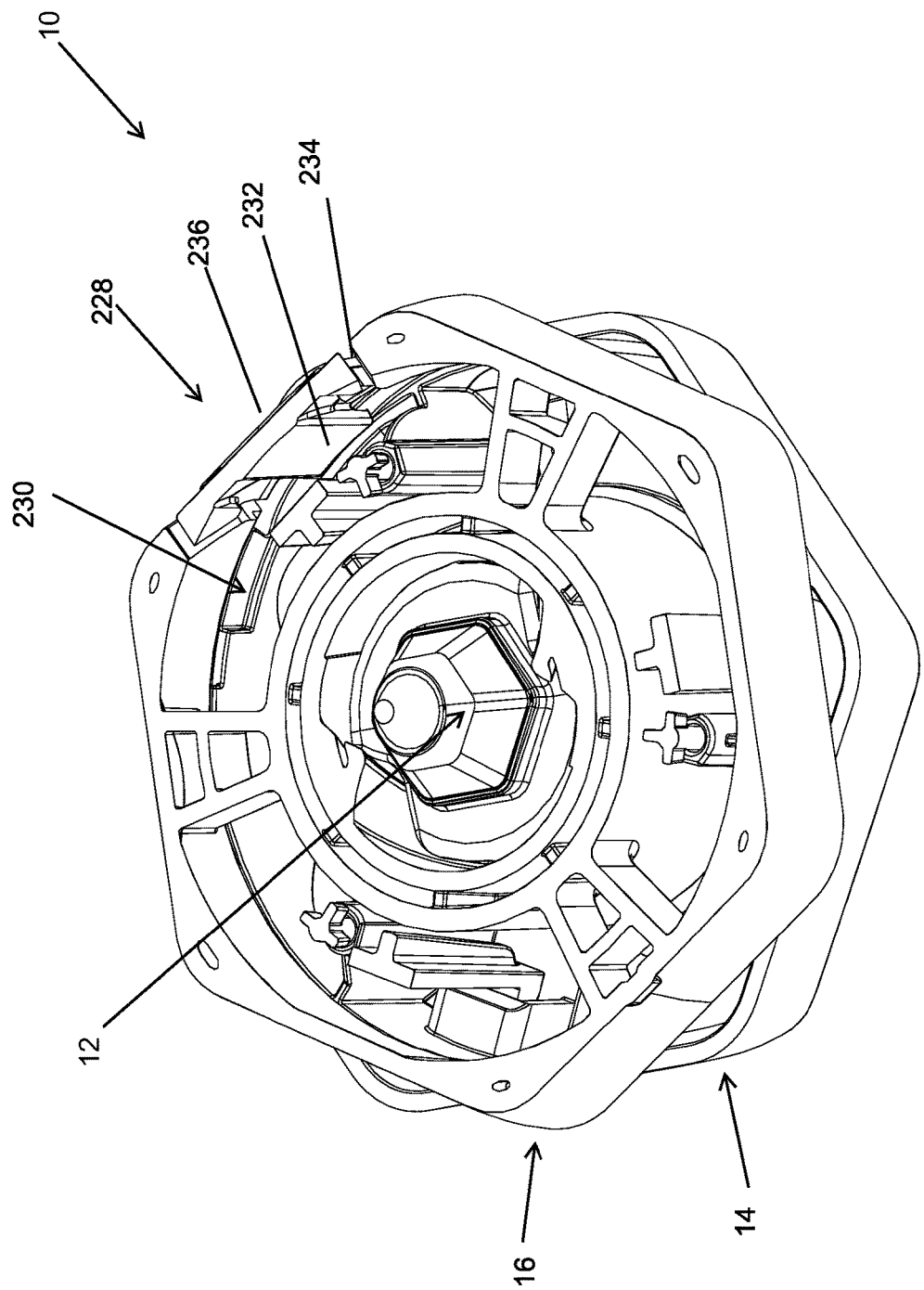
FIG. 35 shows an upper rear right perspective view of a project support system having a lock feature, in accordance with one or more arrangements of the present disclosure; the view showing top cover and top pad omitted; the view showing the dial rotated relative to the base to move the movable member to a partially retracted position.
Figure 36:
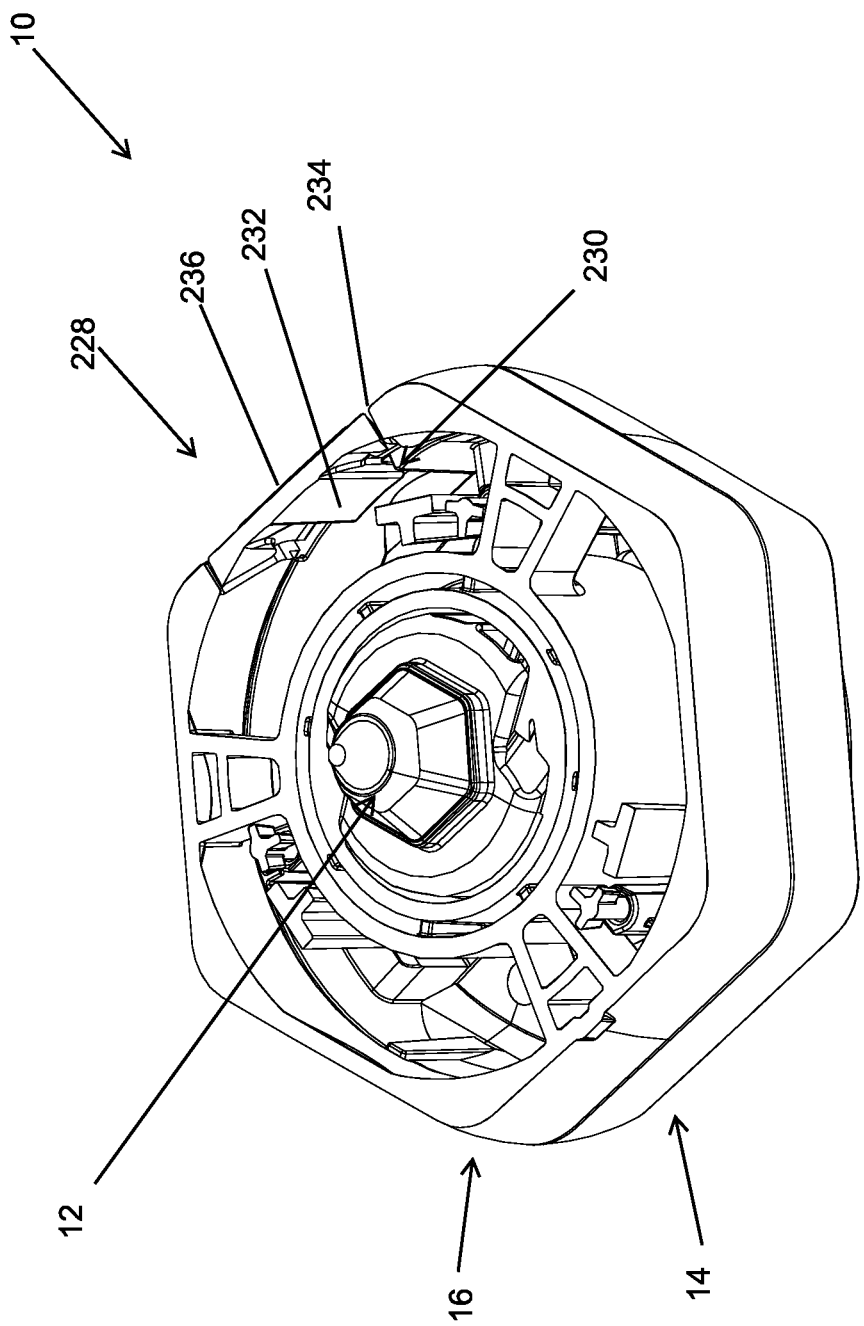
FIG. 36 shows an upper rear right perspective view of a project support system having a lock feature, in accordance with one or more arrangements of the present disclosure; the view showing top cover and top pad omitted; the view showing the dial rotated relative to the base to move the movable member to a fully extended position.
Figure 37:
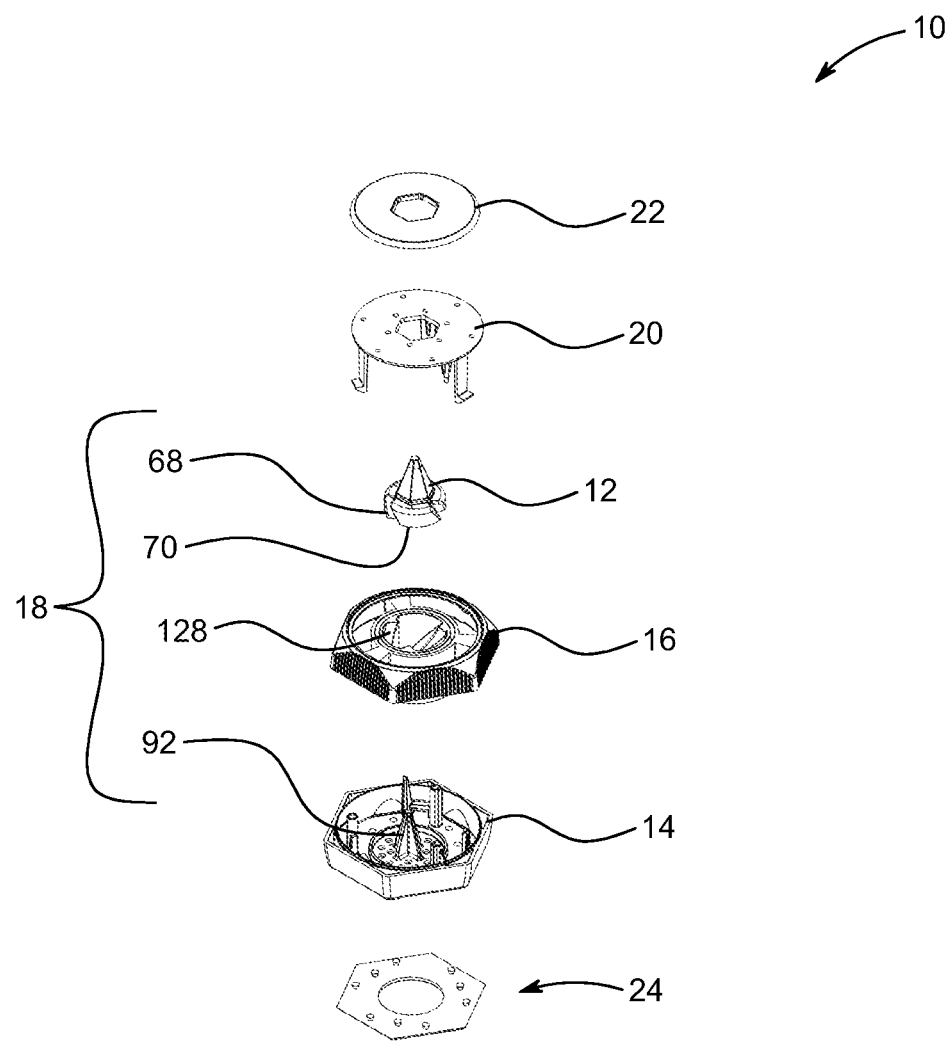
FIG. 37 shows an exploded upper rear right perspective view of a project support system, in accordance with one or more arrangements of the present disclosure.
Figure 38:
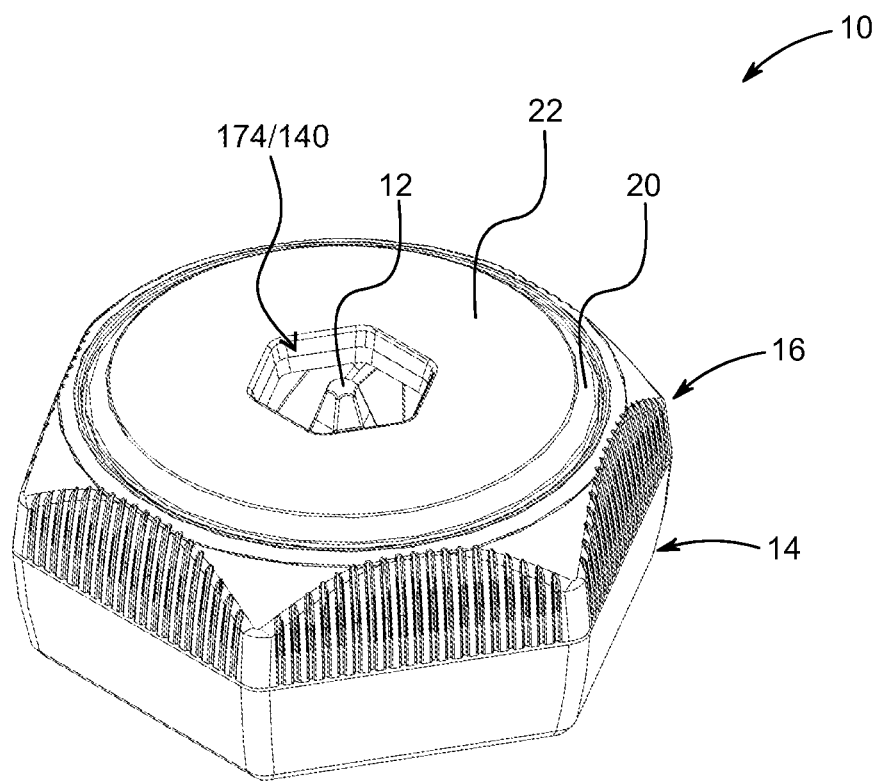
FIG. 38 shows an upper front right perspective view of a project support system, in accordance with one or more arrangements of the present disclosure; the view showing movable members of project support systems in a fully retracted position.
Figure 39:
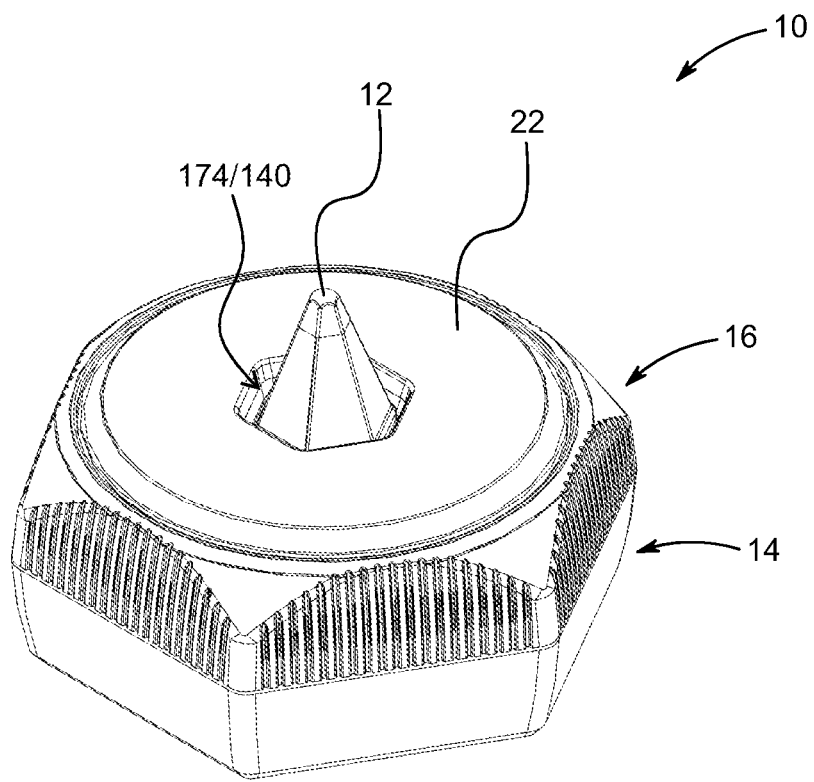
FIG. 39 shows an upper front right perspective view of a project support system, in accordance with one or more arrangements of the present disclosure; the view showing movable members of project support systems in a fully extended position.
Figure 40:
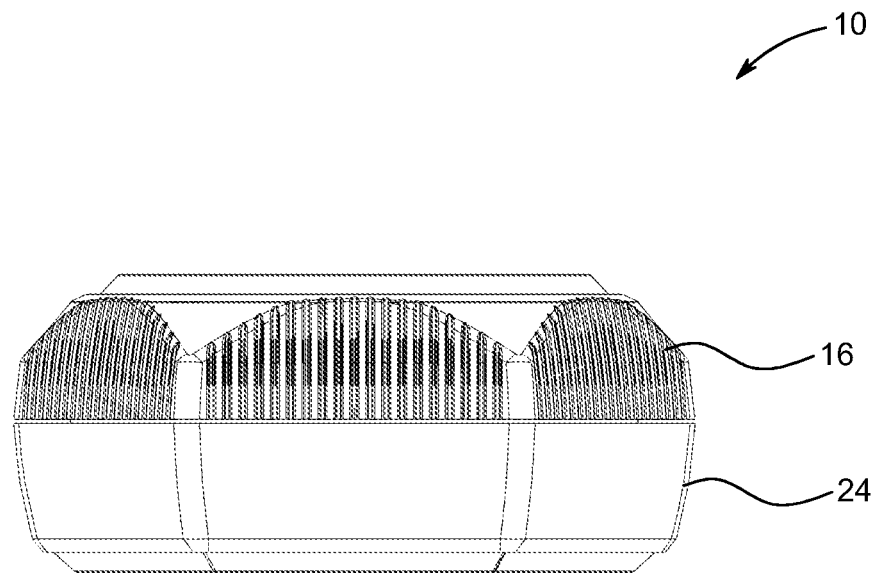
FIG. 40 shows a front view of a project support system, in accordance with one or more arrangements of the present disclosure; the view showing movable members of project support systems in a fully retracted position.
Figure 41:
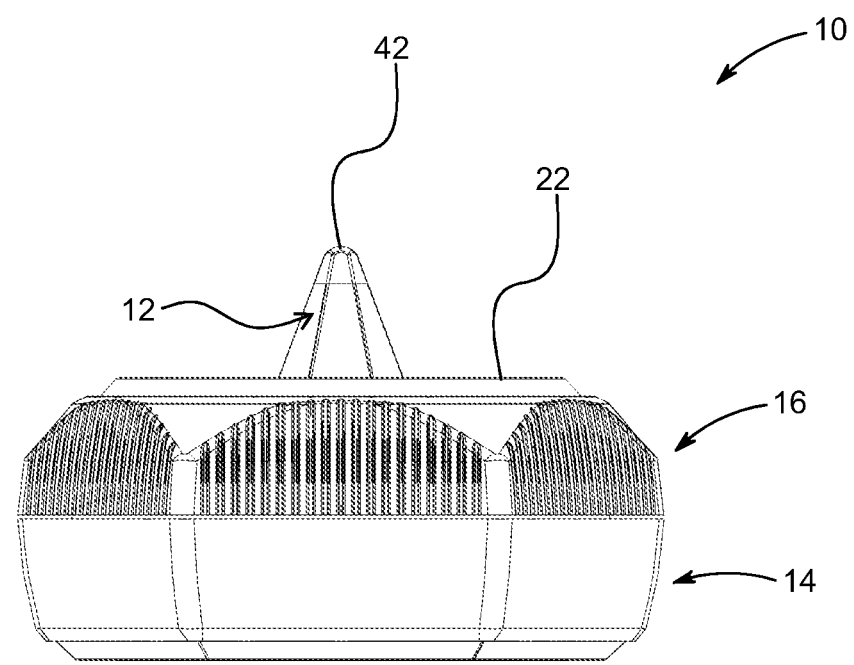
FIG. 41 shows a front right view of a project support system, in accordance with one or more arrangements of the present disclosure; the view showing movable members of project support systems in a fully extended position.
Figure 42:
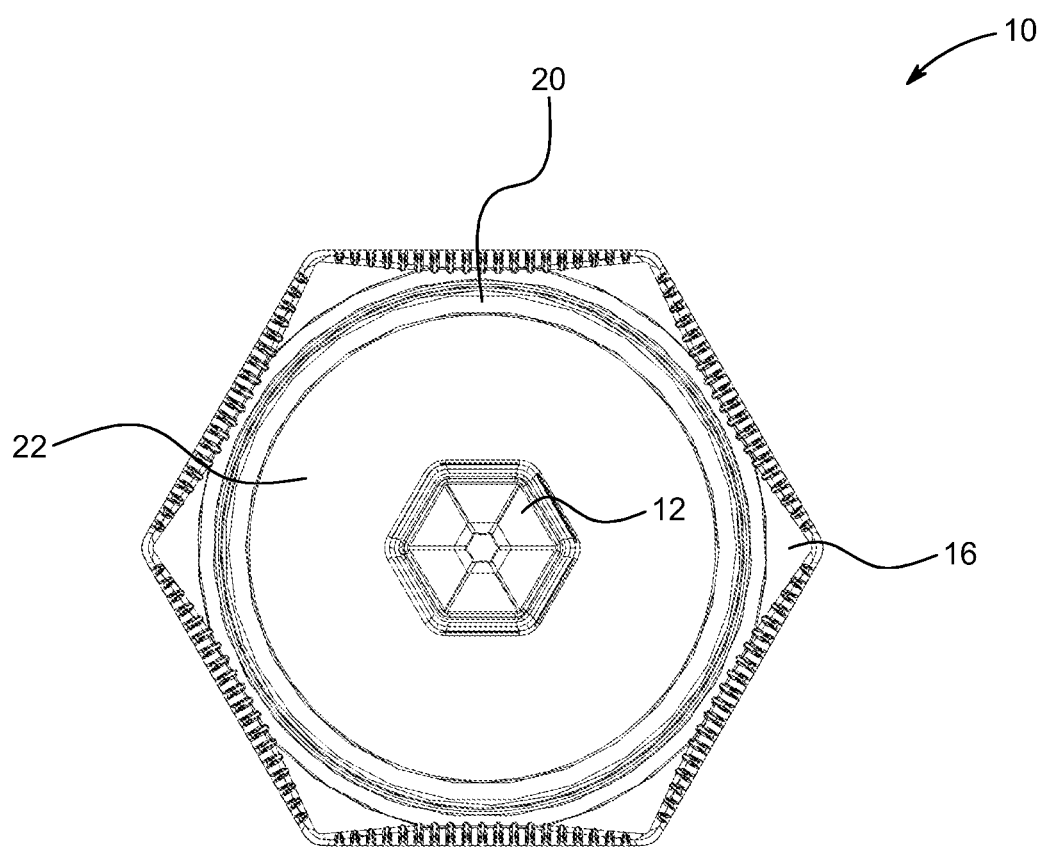
FIG. 42 shows a top view of a project support system, in accordance with one or more arrangements of the present disclosure; the view showing movable members of project support systems in a fully extended position.
Figure 43:
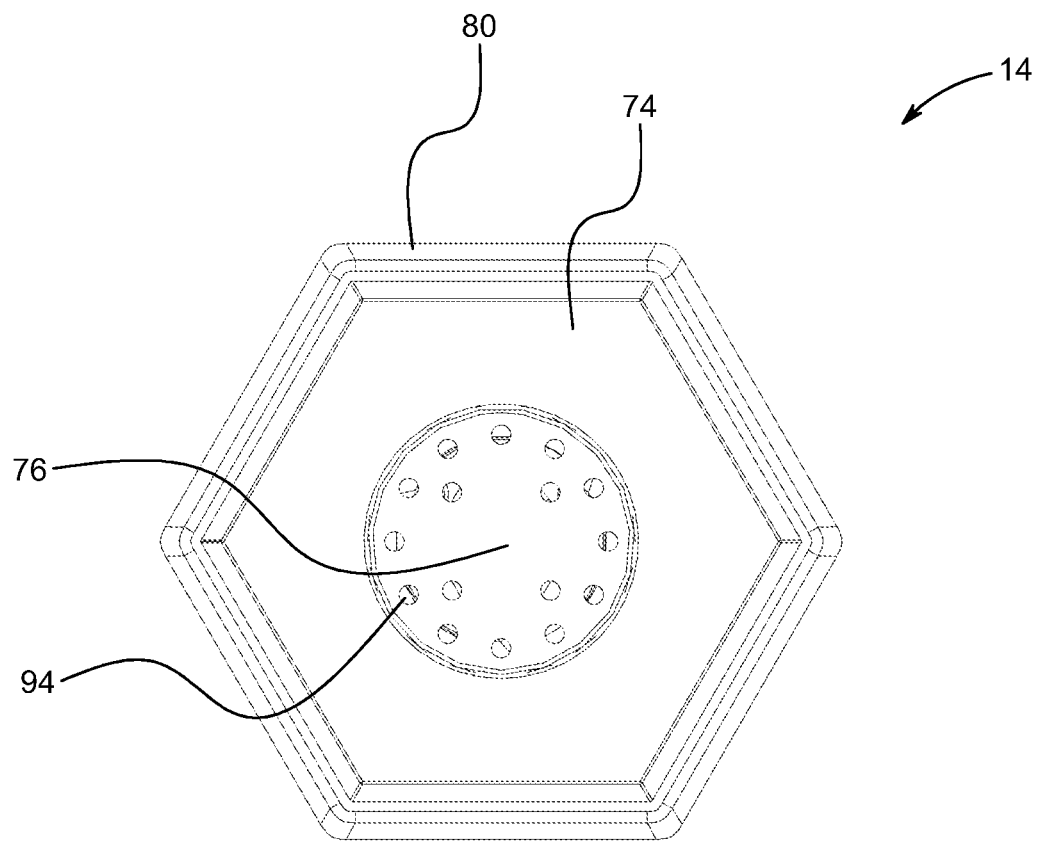
FIG. 43 shows a bottom view of a project support system, in accordance with one or more arrangements of the present disclosure; the view showing movable members of project support systems in a fully retracted position.
Figure 44:
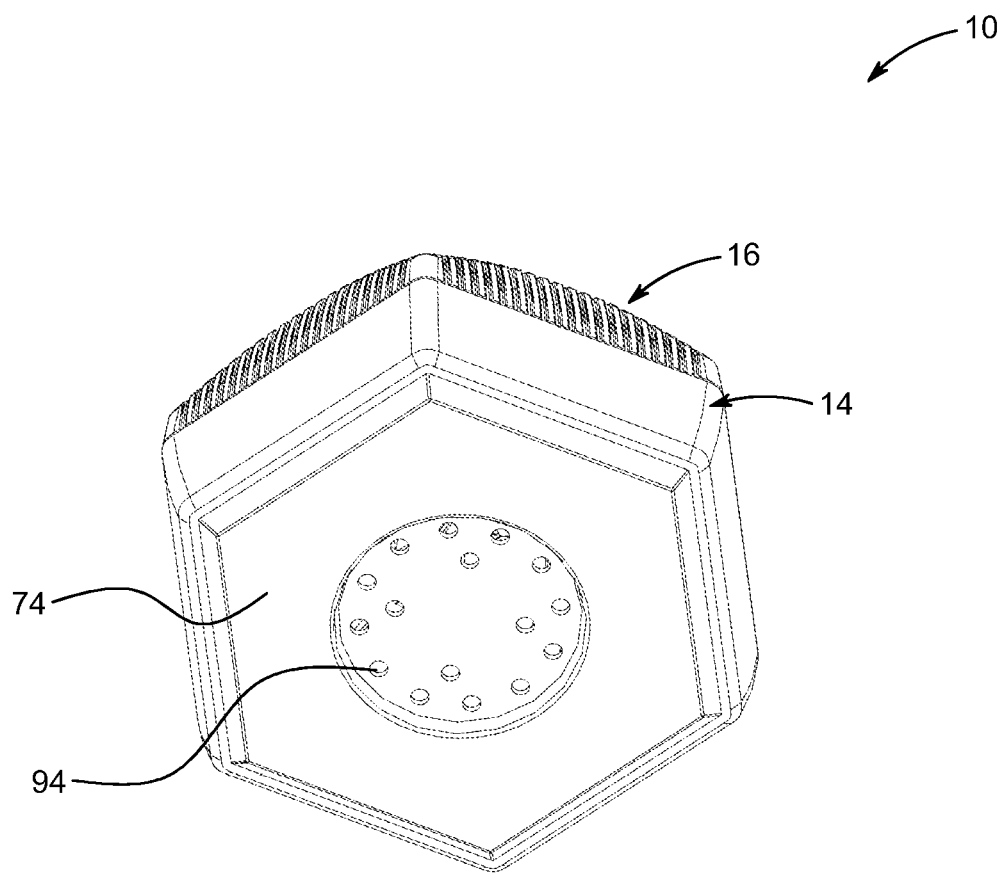
FIG. 44 shows a lower rear left perspective view of a project support system, in accordance with one or more arrangements of the present disclosure.
Figure 45:
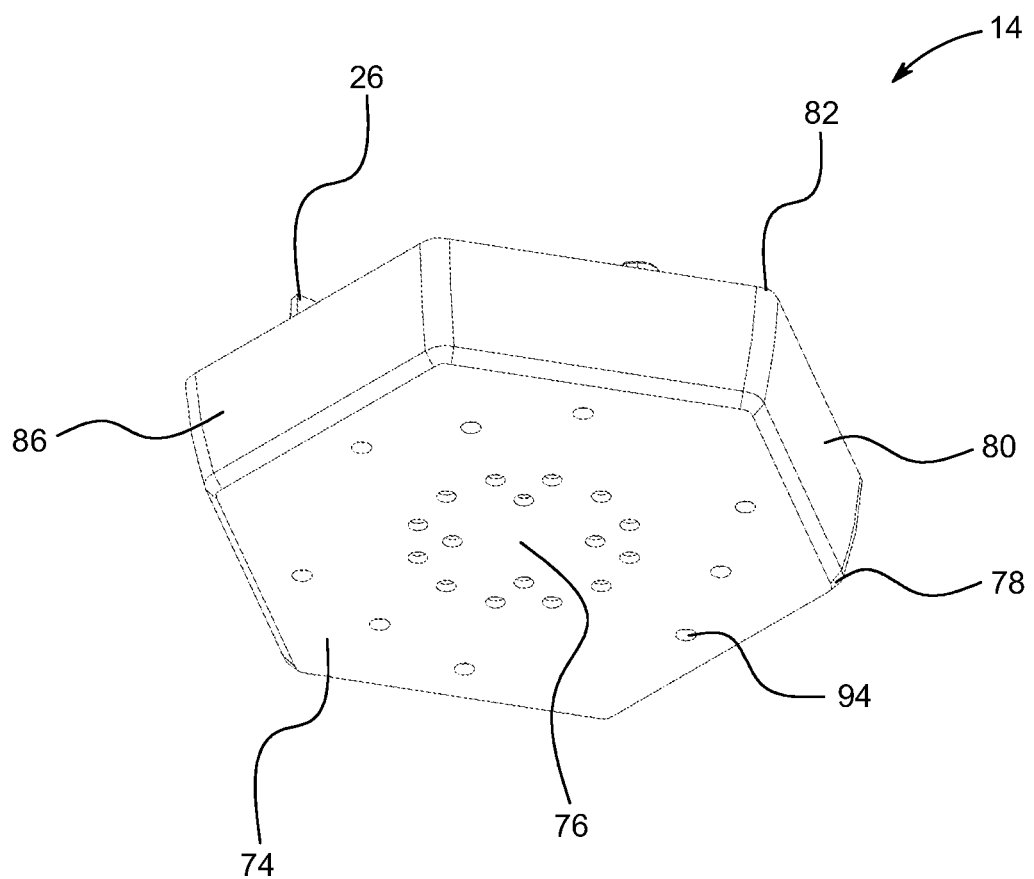
FIG. 45 shows an upper rear left perspective view of a base of a project support system, in accordance with one or more arrangements of the present disclosure.
Figure 46:
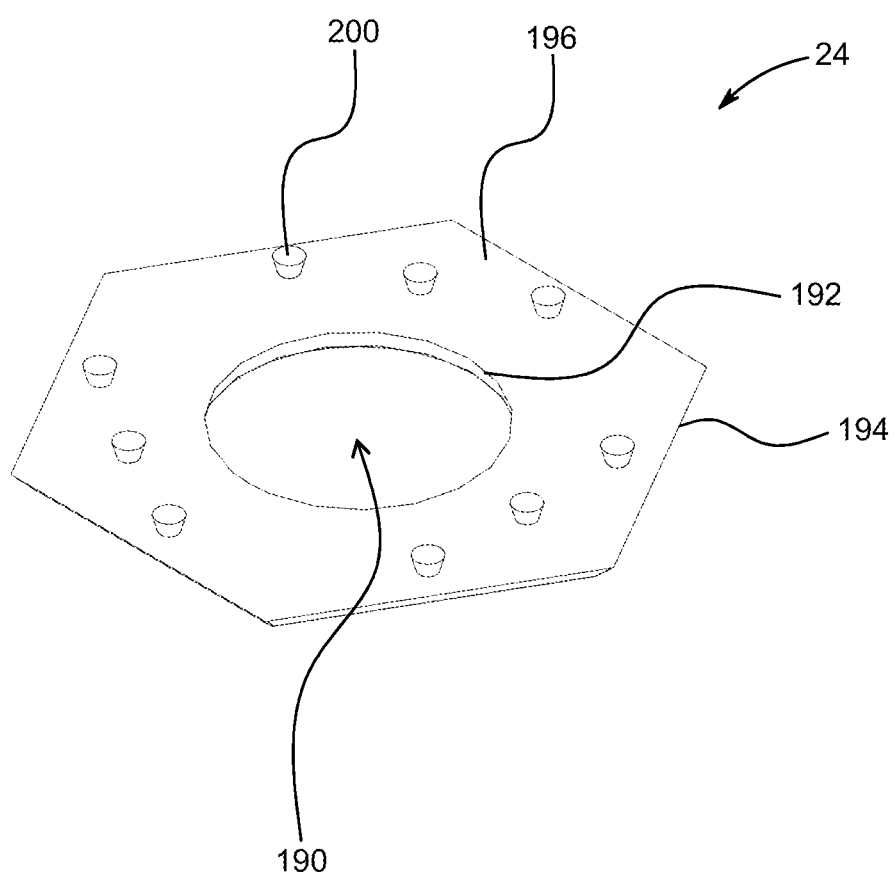
FIG. 46 shows an upper rear left perspective view of a bottom pad of a project support system, in accordance with one or more arrangements of the present disclosure.
Figure 47:
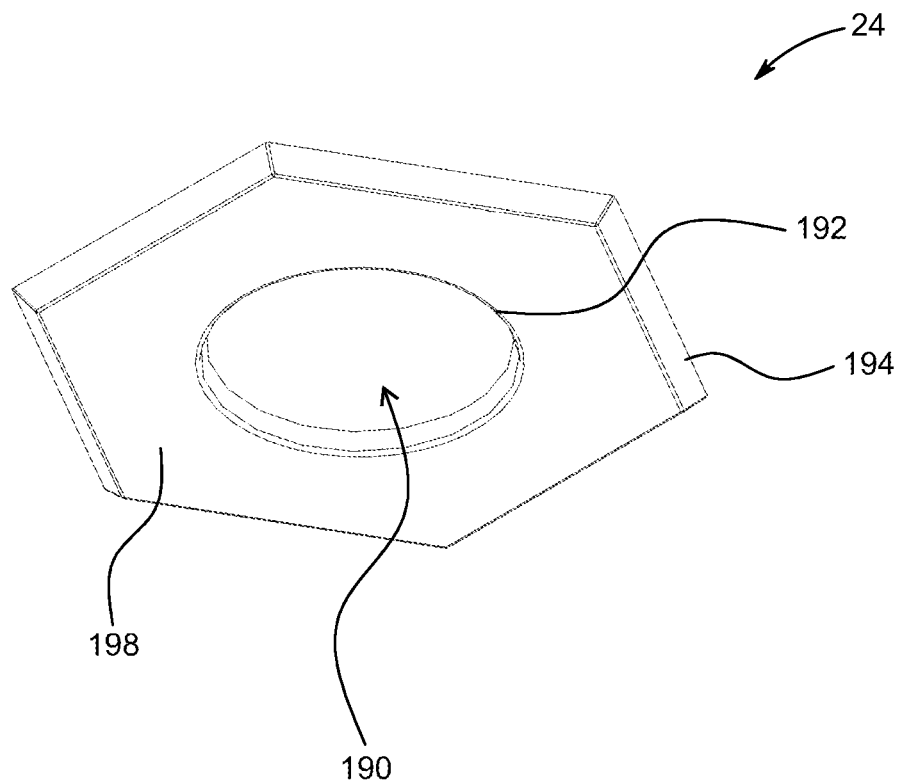
FIG. 47 shows a lower rear left perspective view of a bottom pad of a project support system, in accordance with one or more arrangements of the present disclosure.
Figure 48:
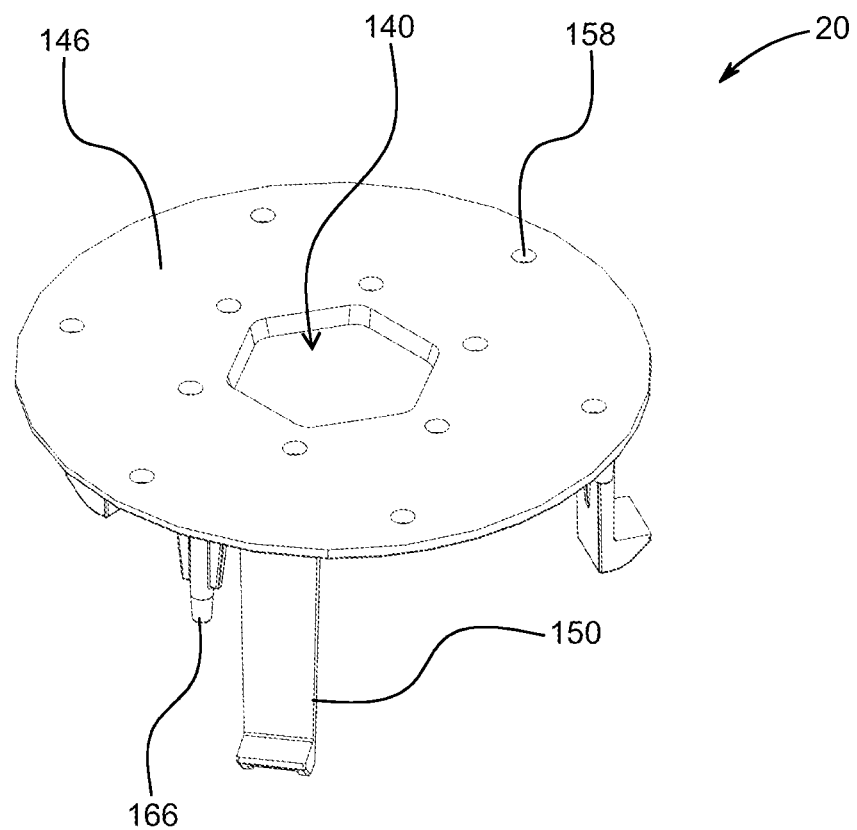
FIG. 48 shows an upper perspective view of a top cover of a project support system, in accordance with one or more arrangements of the present disclosure.
Figure 49:
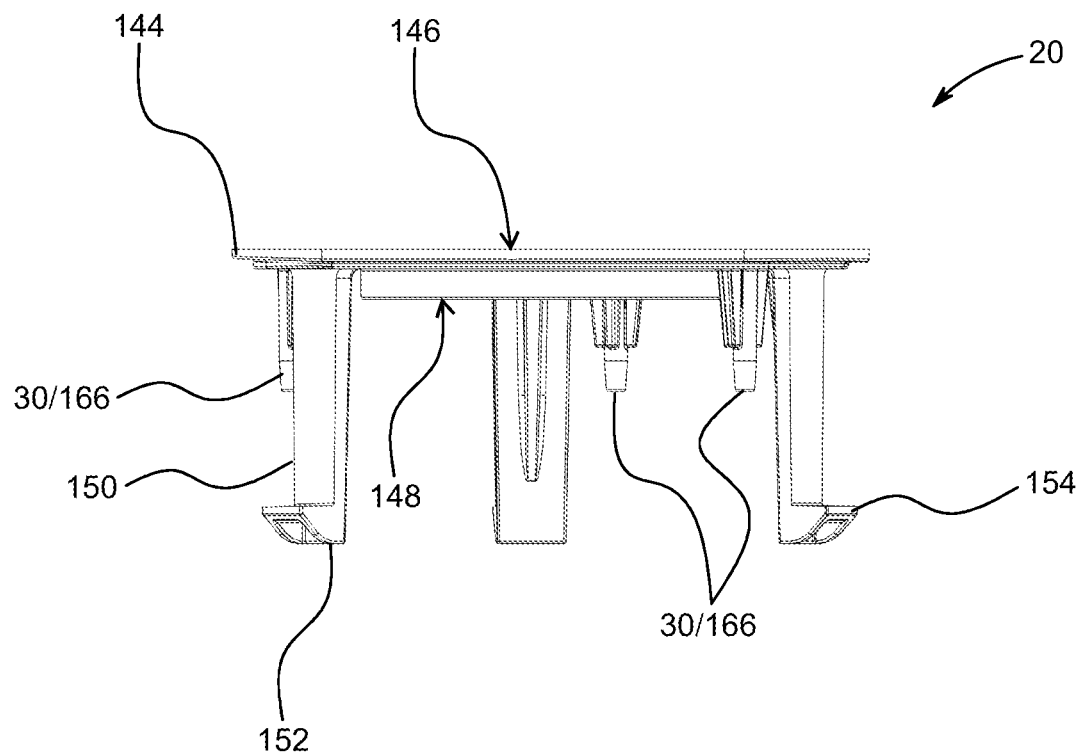
FIG. 49 shows a side view of a top cover of a project support system, in accordance with one or more arrangements of the present disclosure.
Figure 50:
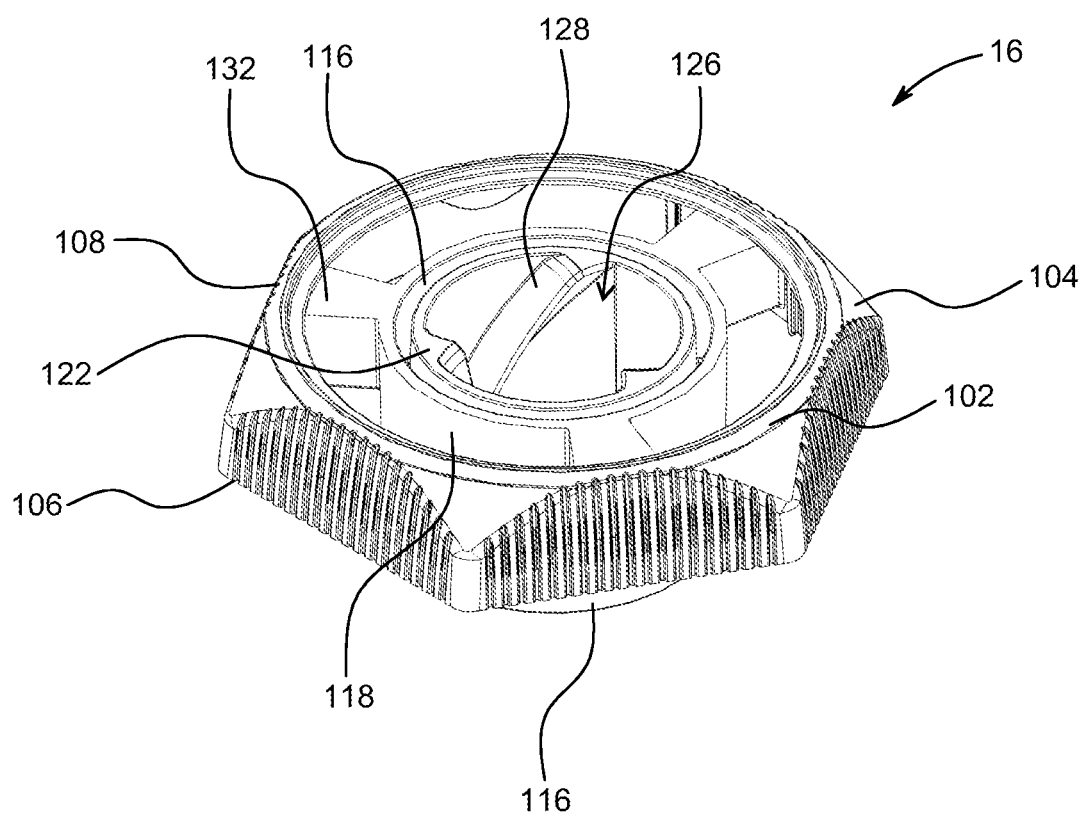
FIG. 50 shows an upper front left perspective view of a dial of a project support system, in accordance with one or more arrangements of the present disclosure.
Figure 51:
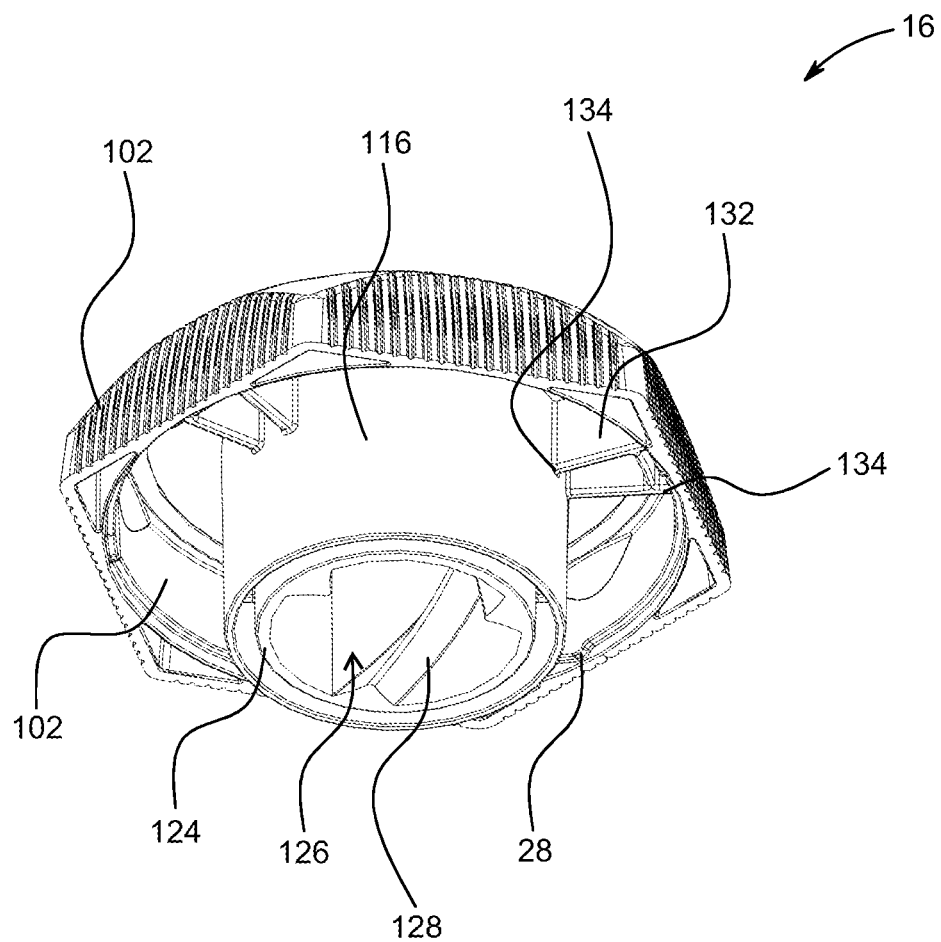
FIG. 51 shows a lower front left perspective view of a dial of a project support system, in accordance with one or more arrangements of the present disclosure.
Figure 52:
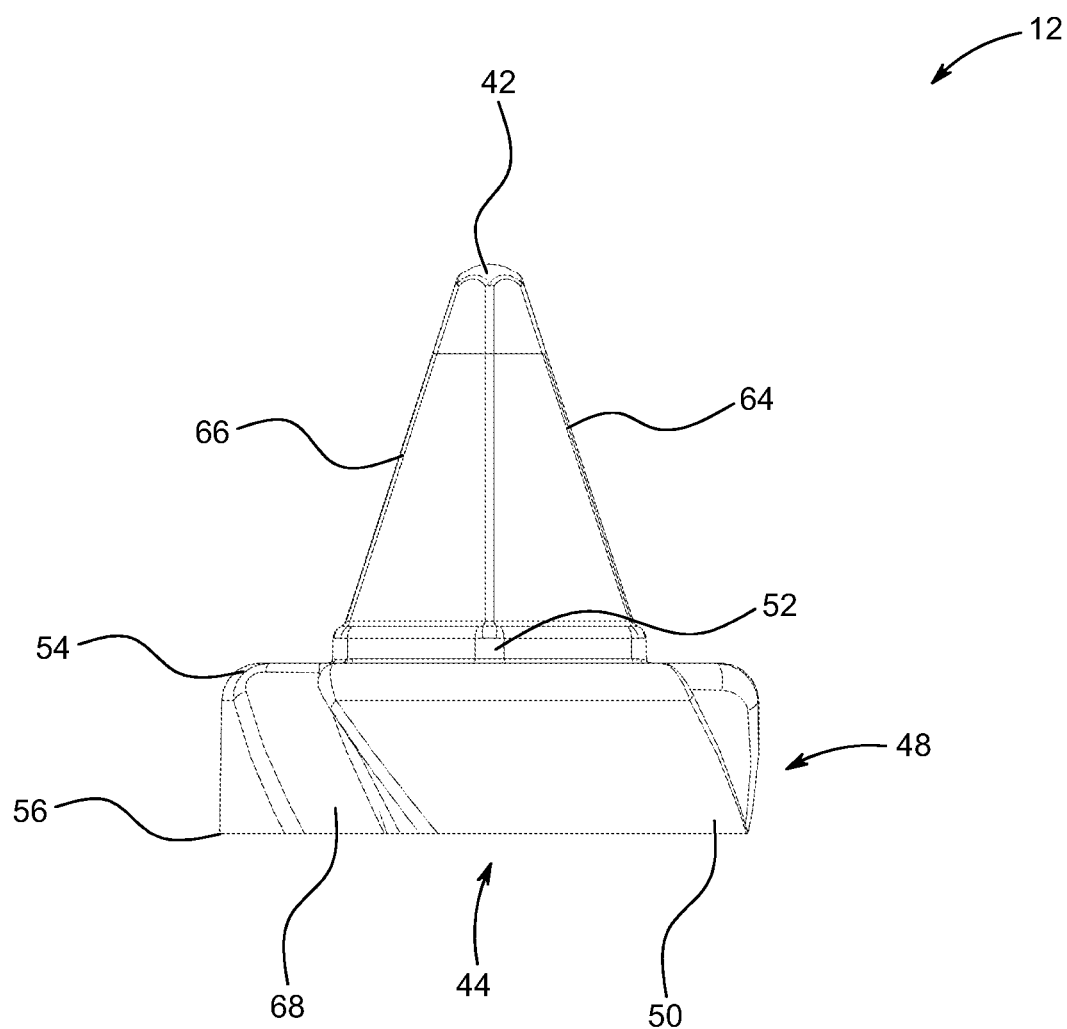
FIG. 52 shows a front view of a movable member of a project support system, in accordance with one or more arrangements of the present disclosure.
Figure 53:
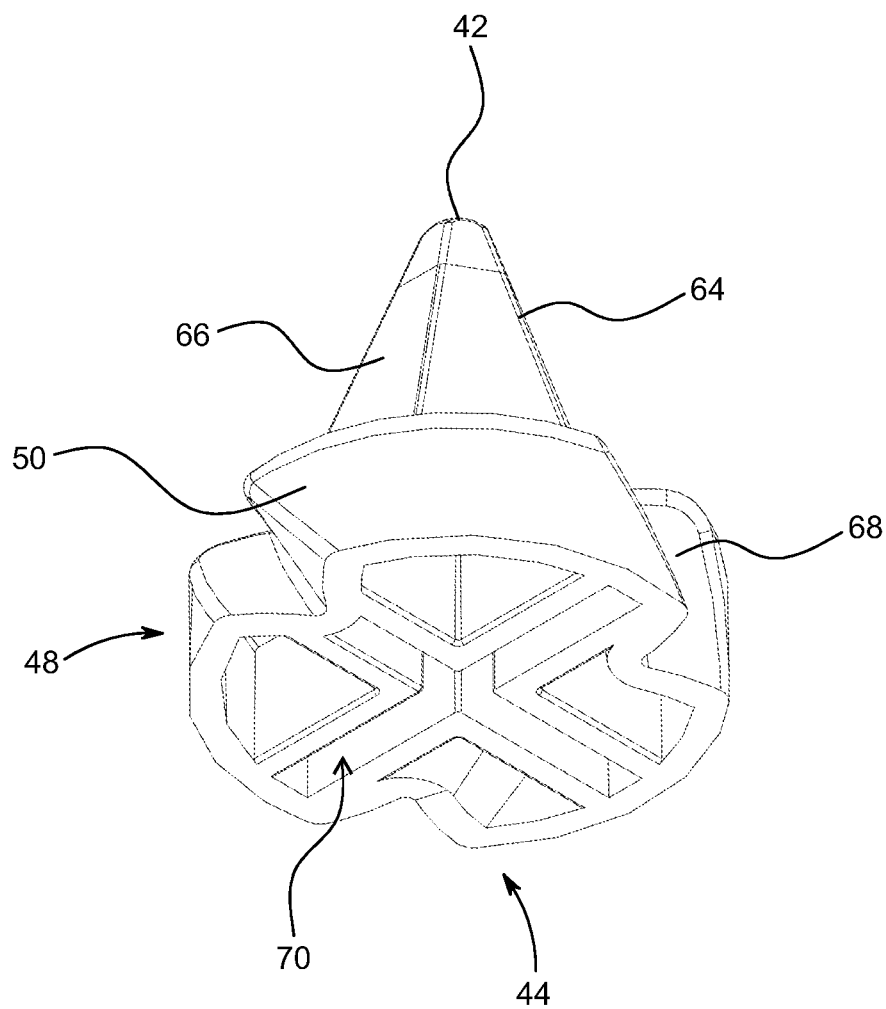
FIG. 53 shows a lower front perspective view of a movable member of a project support system, in accordance with one or more arrangements of the present disclosure.
Figure 54:
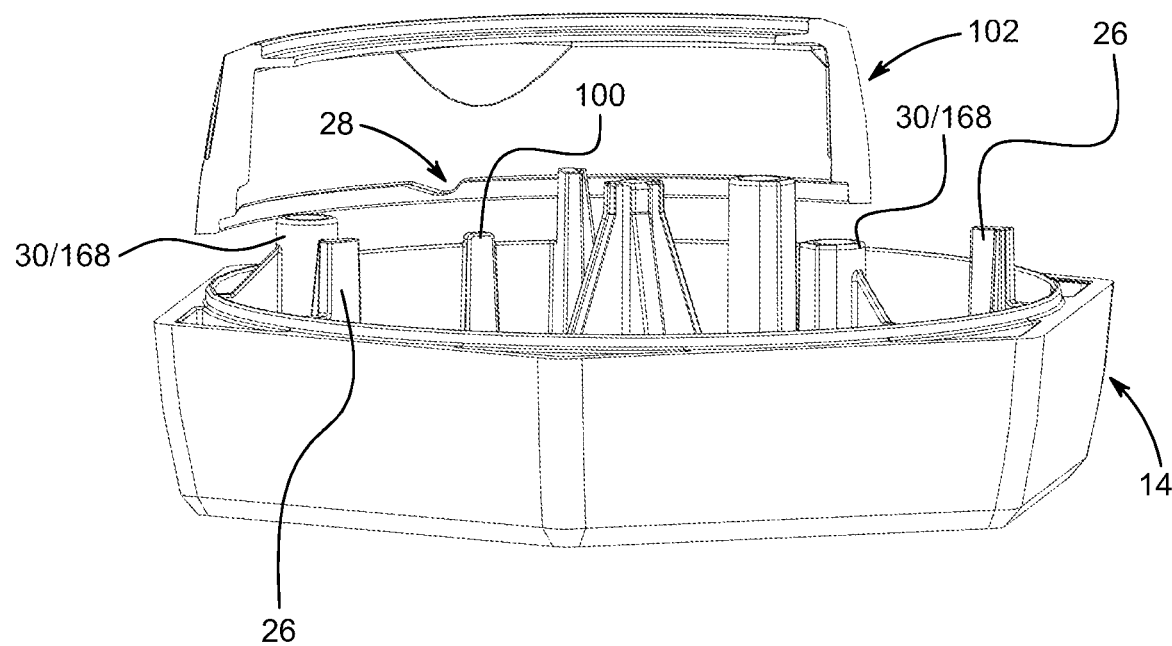
FIG. 54 shows a cutaway upper front left perspective view of a base and dial of a project support system, in accordance with one or more arrangements of the present disclosure.
Figure 55:
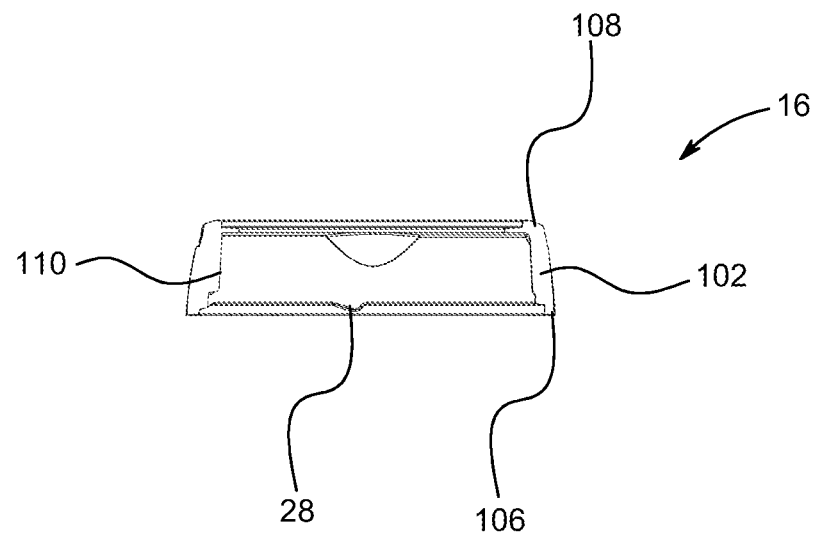
FIG. 55 shows a cross section side view of a dial of a project support system, in accordance with one or more arrangements of the present disclosure
Figure 56:
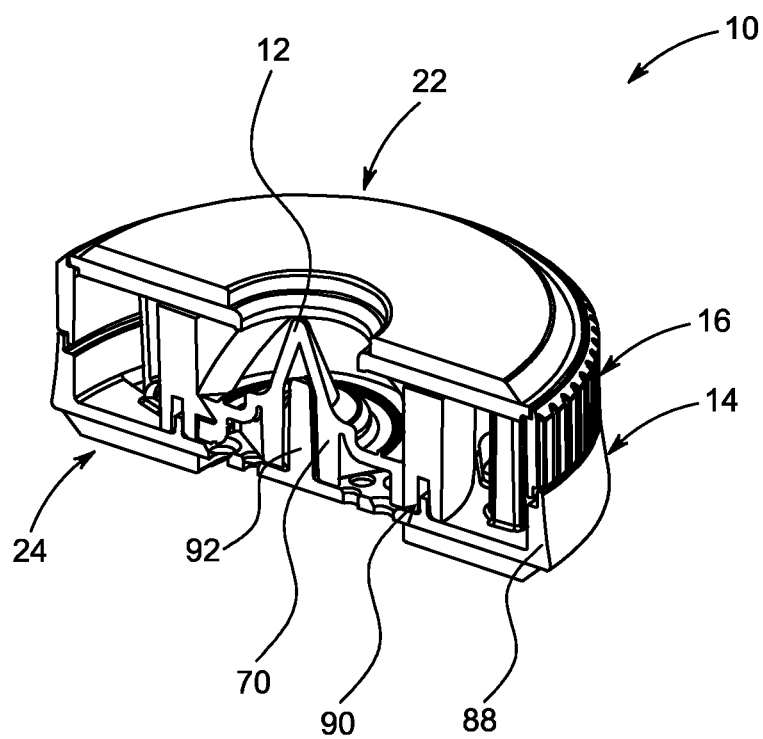
FIG. 56 shows a cross section upper perspective view of a project support system, in accordance with one or more arrangements of the present disclosure; the view showing movable member of the project support system in a fully retracted position.
Figure 57:
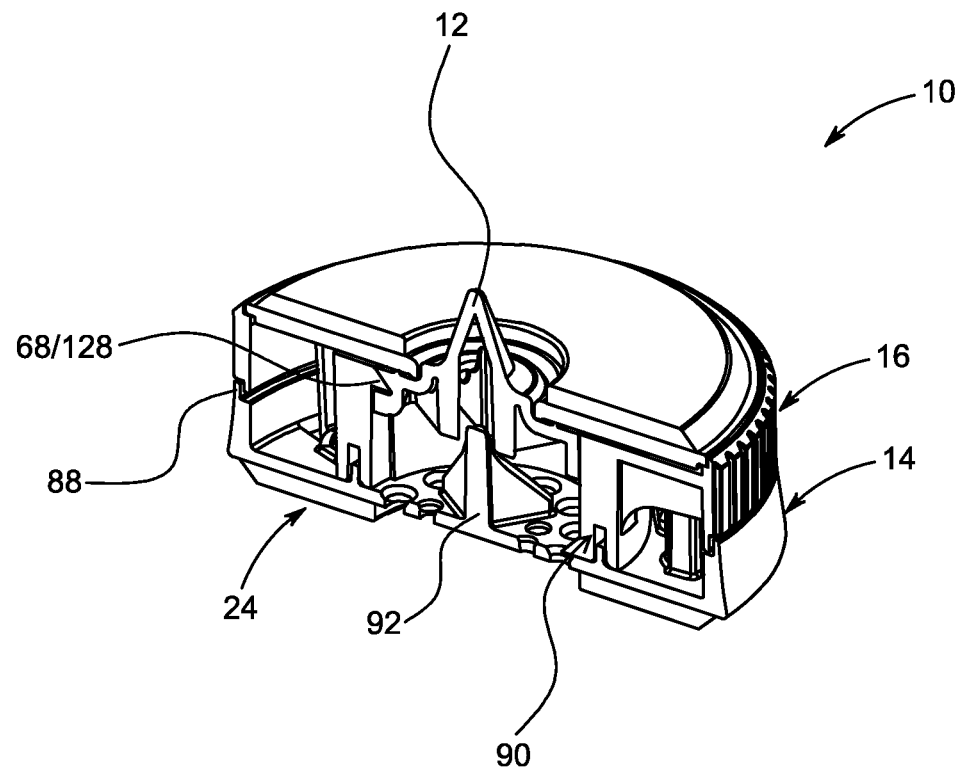
FIG. 57 shows a cross section upper perspective view of a project support system, in accordance with one or more arrangements of the present disclosure; the view showing movable member of the project support system in a fully extended position.
Figure 58:
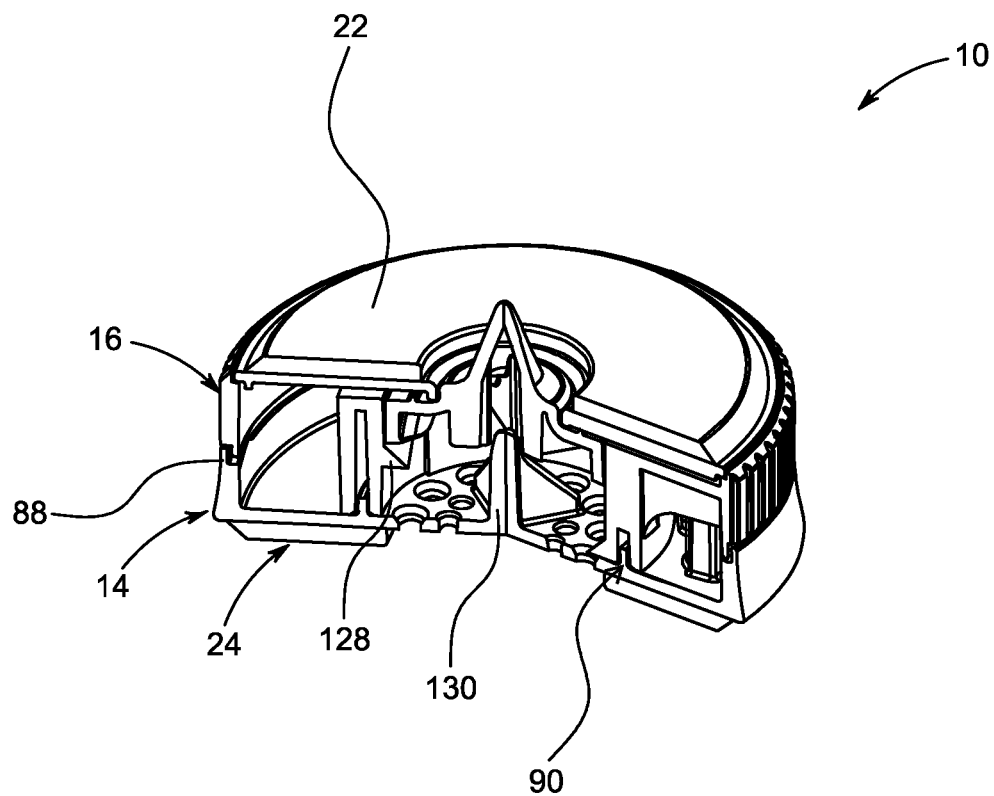
FIG. 58 shows a cross section upper perspective view of a project support system, in accordance with one or more arrangements of the present disclosure; the view showing movable member of the project support systems in a fully extended position.
Figure 59:
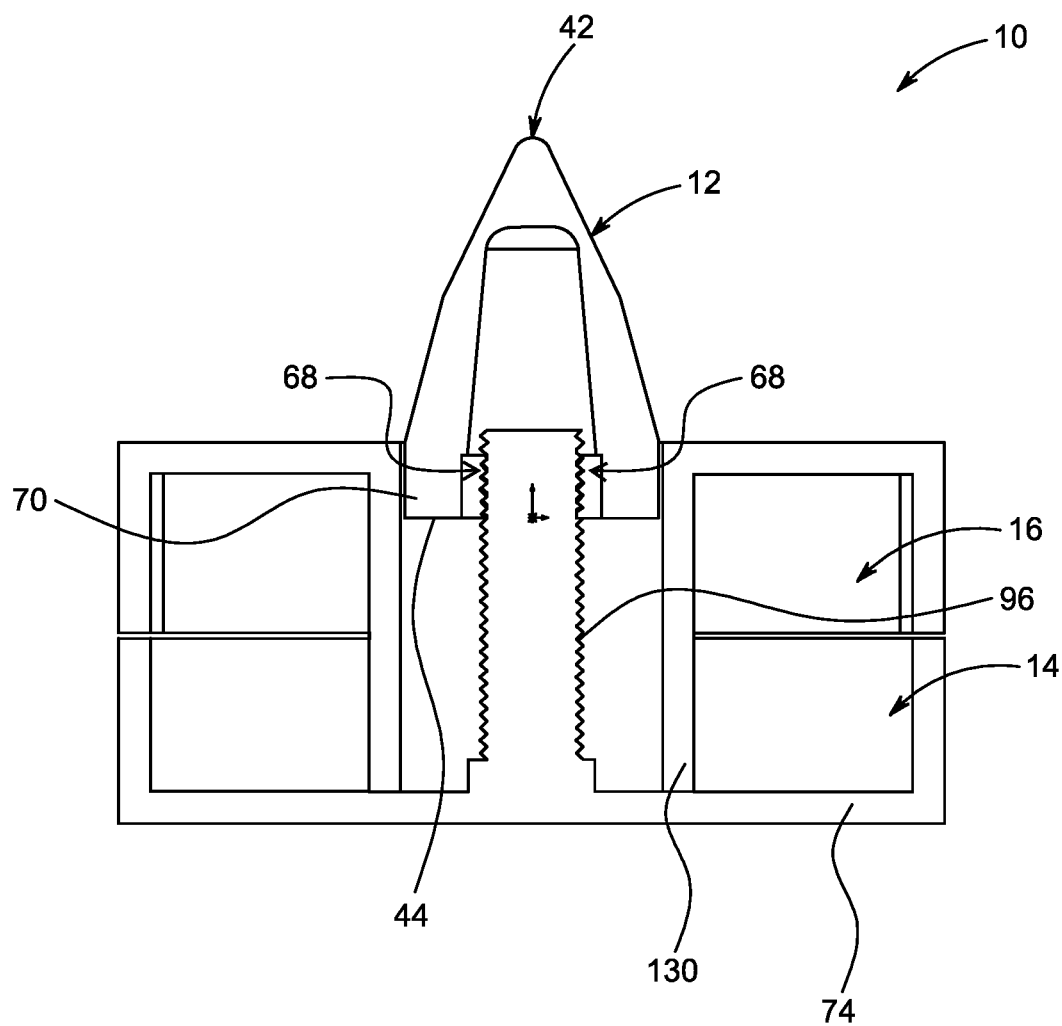
FIG. 59 shows a cross section front view of a project support system, in accordance with one or more arrangements of the present disclosure; the view showing movable member of project support system in a fully extended position.
Figure 60:
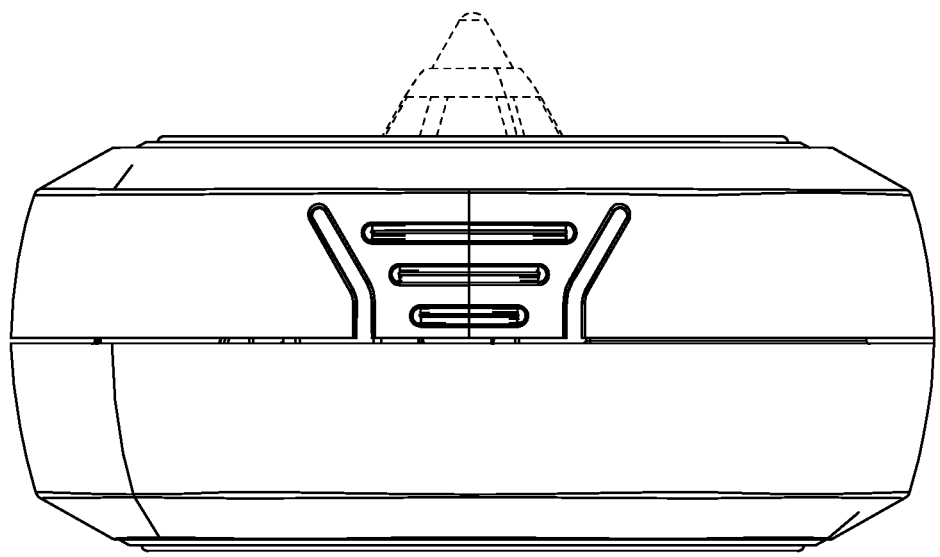
FIG. 60 shows a front view of a project support system, in accordance with one or more arrangements of the present disclosure; the view showing movable member of project support system in a fully extended position.

Sides 80:

In this example arrangement, base 14 has one or more sides 80 extending up from the lower exterior edge 78 to an upper exterior edge 82. The one or more sides 80 include an interior surface 84 and exterior surface 86 and are formed of any suitable size, shape and design and are configured to facilitate smooth operation of system 10 while providing an aesthetically pleasing appearance. In one arrangement shown, as one example interior surface 84 and exterior surface 86 are shaped differently. More specifically, with reference to FIG. 21 as one example, the shown arrangement has sides 80 having a generally circular shaped interior surface 84 and a hexagonal shaped exterior surface 86. In addition to providing a unique, pleasing, identifiable and aesthetic appearance, the hexagonal shape of exterior surface 86 may facilitate better handgrip on base 14 when rotating dial 16.

Rotational Guide Features 88 and 90:

In one or more embodiments, for example, base 14 includes a set of one or more rotational guide features 88 and 90. Rotational guide features 88 and 90 are formed of any suitable size, shape and design and are configured to engage with and facilitate smooth rotation of dial 16. In the arrangement shown, as one example, rotational guide feature 88 includes a circular member extending upward from interior surface 84 of sides 80. The circular member is configured to mate with a corresponding circular recess in dial 16. Additionally or alternatively, in one or more embodiments, the rotation guide feature 88 may include a circular recess configured to mate with a circular protrusion extending downward from dial 16.

In the arrangement shown, as another example, rotational guide feature 90 includes a circular member extending upward from an upper surface of bottom 74. The circular member is configured to mate with a corresponding circular recess in a dial 16. Additionally or alternatively, in one or more embodiments, the rotation guide feature 88 may include a circular recess configured to mate with a circular protrusion extending downward from dial 16.

In operation: the rotational guide features 88 and 90 engage with corresponding features of dial 16 with tight tolerance to maintain dial 16 and base 14 in an operable and/or optimal orientation to facilitate smooth rotation without wobbling or binding. In the arrangement shown, rotation guide features 88 and 90 are configured to facilitate rotation of the dial 16 about an axis through center point 76 of base 14.

Additionally, in some implements, upward facing surfaces of rotational guide features 88 and 90 may beneficially engage with downward facing surface of corresponding features of dial 16 to help transfer downward forces exerted on system 10 and provide support for workpiece 36. Additionally, in this arrangement, such downward forces exerted on system 10 may beneficially compress rotational guide features 88 and 90 against features of dial 16 and create frictional forces that inhibit rotation of dial 16 relative to base 14. By inhibiting rotation, when downward forces are applied, moveable member 12 can be maintained in a fully extended position while supporting workpiece 36.

Vertical Guide Features 92:

In one or more embodiments, for example, base 14 includes vertical guide feature 92. Vertical guide feature 92 is formed of any suitable size, shape and design and are configured to engage with vertical guide feature 70 of movable member 12 to prevent rotation of movable member 12 while permitting movable member 12 to be moved up and/or down between a fully extended position and a fully retracted position. In the arrangement shown, as one example, vertical guide feature 92 includes a cross-shaped member having vertical sides extending upward from the upper surface of bottom 74. Vertical guide feature 92 is configured to mate with corresponding cross-shaped recess of vertical guide feature 70 in bottom 44 of movable member 12. In this arrangement, sides of vertical guide feature 70 engage with sides of vertical guide feature 92 to prevent movable member 12 from being rotated relative to base 14. Any other size, shape or design is hereby contemplated for use for vertical guide feature 92, such as a square member, a rectangular member, or any non-round member or the like or any combination thereof.

Dial 16:

In one or more arrangements, system 10 includes dial 16. Dial 16 is formed of any suitable size, shape and design and is configured to operably connect with movable member 12, and base 14 to facilitate smooth operation of the system 10. In the arrangement shown, as one example, dial 16 includes an exterior portion 102. Exterior portion 102 has an exterior surface 104, extending between a lower exterior edge 106 and an upper exterior edge 108. In the arrangement shown, as one example, exterior surface 104 is formed of six generally flat panels that extend from lower exterior edge 106 to upper exterior edge 108 in a generally flat manner. These six panels include serrations or grooves in their exterior surface, so as to enhance user leverage and grip, and include rounded upper edges, so as to improve aesthetics and comfort. Any other shape is hereby contemplated for use for exterior surface 104.

In the arrangement shown, as one example, exterior portion 102 includes an interior surface 110. In the arrangement shown, as one example, interior surface 110 is generally circular or cylindrical in shape when viewed from above or below. However, any other shape is hereby contemplated for use for interior surface 110.

In the arrangement shown, as one example, dial 16 also includes an interior portion 116 having a generally circular ring shaped exterior surface 118 with a hollow interior 126. Interior portion 116 has a top surface 122, a bottom surface 124, an interior surface 120 extending between the top and bottom surfaces 122 and 124, and an exterior surface 118 extending between the top and bottom surfaces 122 and 124.

In the arrangement shown, as one example, dial 16 includes a plurality of connection members 132 connecting interior portion 116 to exterior portion 102. Connection members 132 are formed of any suitable size, shape and design and are configured to operably connect interior portion 116 and exterior portion 102 of dial 16 in a strong, rigid, and durable member. In the arrangement shown, as one example, connection members 132 each have an elongated shape extending between opposing ends 134. A first end 134 of each connection member 132 is connected to exterior surface 118 of interior portion 116 and the other end 134 of the connection member 132 is connected to interior surface 110 of exterior portion 102. In this example arrangement, dial 16 includes three connection members 132. However, it is contemplated that embodiments may include a greater or lesser number of connection members 132. In the arrangement shown, a gap 112 is created between opposing connection members 132 and the interior surface 110 and exterior surface 118.

Helical Guide Features 128:

In the arrangement shown, as one example, dial 16 includes helical guide feature 128. Helical guide feature 128 is formed of any suitable size, shape, and design and is configured to facilitate movement of movable member 12. In an arrangement shown, as one example, helical guide feature 128 includes a plurality of helical shaped protrusions formed on the generally cylindrically shaped interior surface 120 of interior portion 116. In this example arrangement, helical guide feature 128 is configured to engage with helical guide feature 68 of movable member 12 to cause movement upward and/or downward in response to dial 16 being rotated relative to movable member 12.

Mechanical Assembly 18:

In one or more arrangements, system 10 includes a mechanical assembly 18 configured to facilitate extension and retraction of movable member 12 up and down in response to rotation of dial 16 relative to base 14. Mechanical assembly 18 is formed of any suitable size, shape and design and is configured to extend movable member 12 upward in response to dial 16 being rotated in one direction and move movable member 12 downward in response to dial 16 being rotated in the opposite direction.

In the arrangement shown, as one example, mechanical assembly 18 includes helical guide feature 68 of movable member 12, helical guide feature 128 of dial 16, vertical guide feature 79 of movable member 12, and vertical guide feature 92 of base 14. As previously described, helical guide feature 68 is configured to engage with helical guide feature 128 to cause movable member 12 to move upward in response to dial 16 being rotated in one direction relative to movable member 12. The helical guide features 68 and 128 further cause movable member 12 to move downward in response to dial 16 being rotated in the opposite direction relative to movable member 12. As also previously described vertical guide feature 70 is configured to engage with vertical guide feature 92 to prevent movable member 12 from being rotated relative to base 14, while also permitting movable member 12 to move upward and downward. In combination, the helical guide features 68/128 and vertical guide features 70/92 cause movable member 12 to move upward in response to dial 16 being rotated in one direction relative to base 14 and move downward in response to dial 16 being rotated in the opposite direction relative to base 14.

In Operation:

As dial 16 is rotated in one direction relative to base, vertical guide features 79 and 92 cause dial 16 to also rotate relative to movable member 12. As dial 16 is rotated relative to movable member 12, helical guide features 68 and 128 cause movable member 12 to move upward to a fully extended position. As dial 16 is rotated in the opposite direction relative to base, vertical guide features 79 and 92 cause dial 16 to also rotate relative to movable member 12. As dial 16 is rotated in the opposite direction relative to movable member 12, helical guide features 68 and 128 cause movable member 12 to move downward to a fully retracted position.

Alternative Arrangement:

It is contemplated that in one or more embodiments, mechanical assembly 18 may be implemented using various other additional or alternative helical guide and/or vertical guide features in various other positions, arrangements, and/or configurations.

Figure 61:
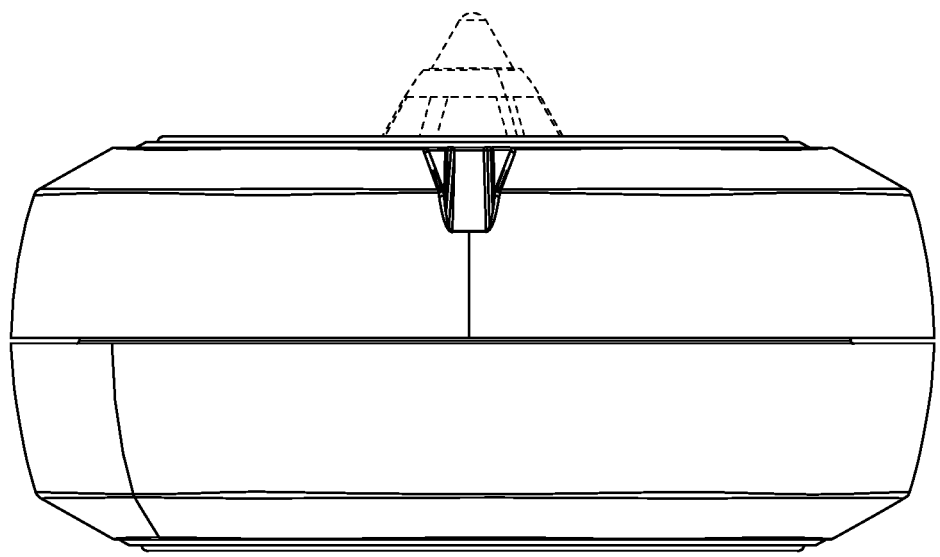
FIG. 61 shows a rear view of a project support system, in accordance with one or more arrangements of the present disclosure; the view showing movable member of project support system in a fully extended position.
Figure 62:
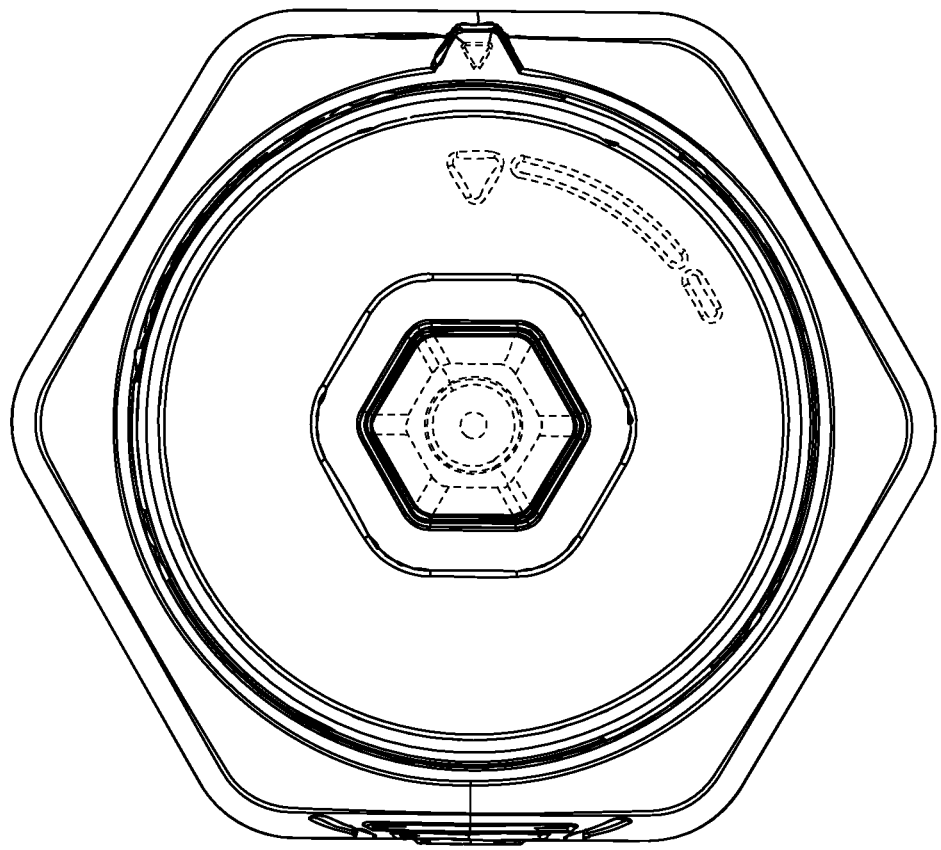
FIG. 62 shows a top view of a project support system, in accordance with one or more arrangements of the present disclosure; the view showing movable member of project support system in a fully extended position.
Figure 63:
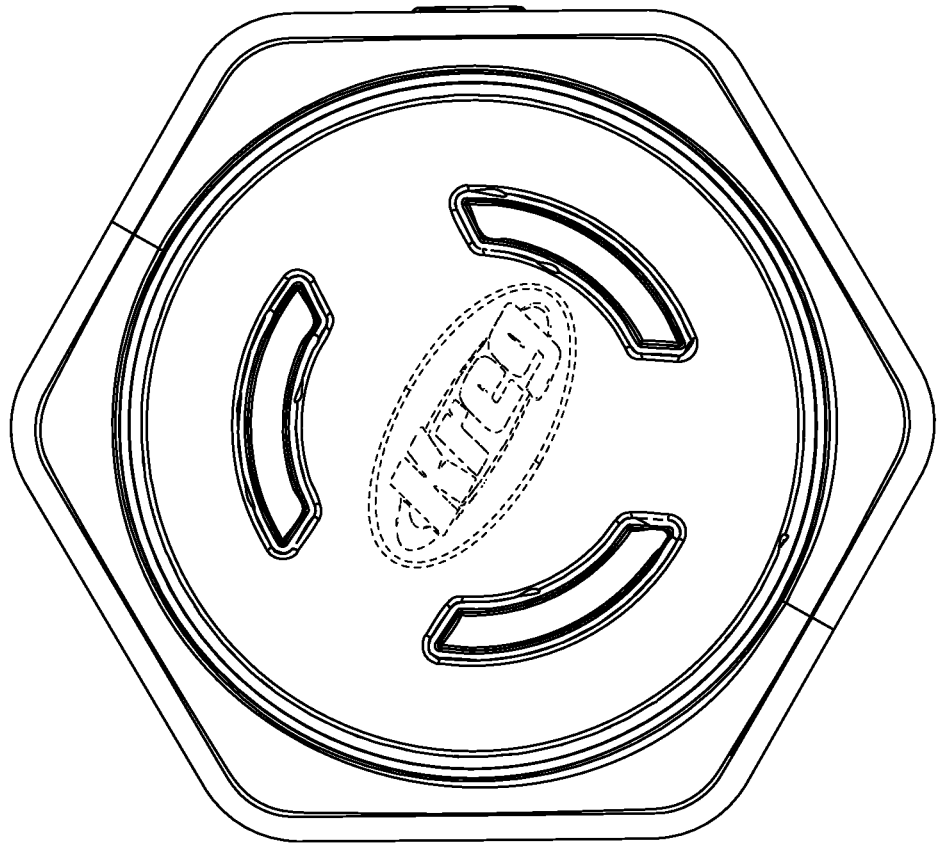
FIG. 63 shows a bottom view of a project support system, in accordance with one or more arrangements of the present disclosure; the view showing movable member of project support system in a fully extended position.
Figure 64:
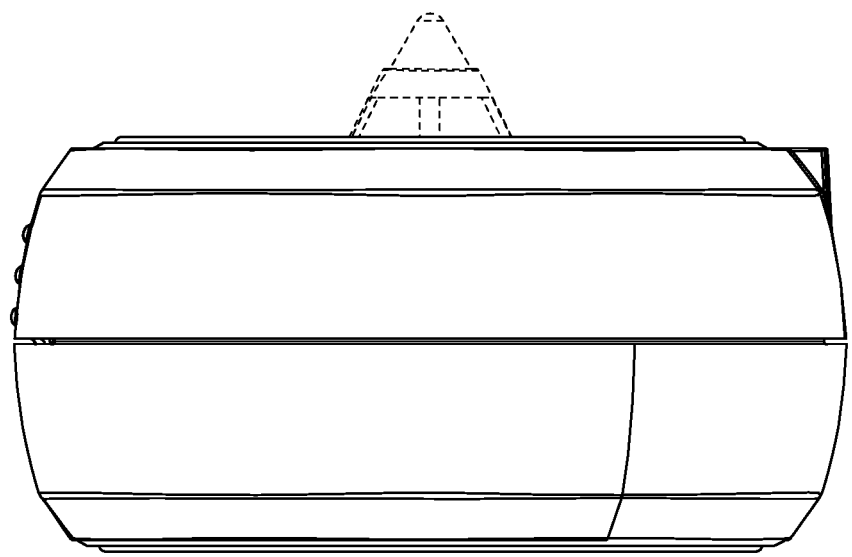
FIG. 64 shows a left side view of a project support system, in accordance with one or more arrangements of the present disclosure; the view showing movable member of project support system in a fully extended position.
Figure 65:
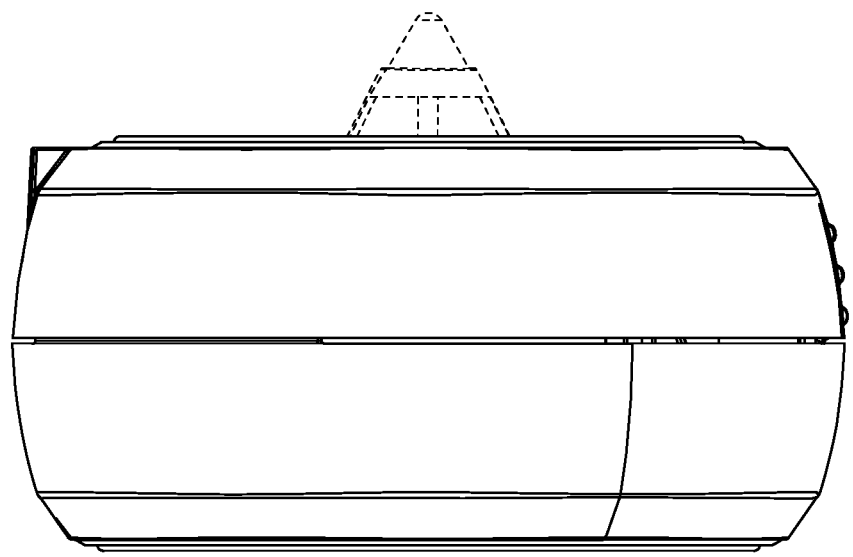
FIG. 65 shows a right side view of a project support system, in accordance with one or more arrangements of the present disclosure; the view showing movable member of project support system in a fully extended position.
Figure 66:
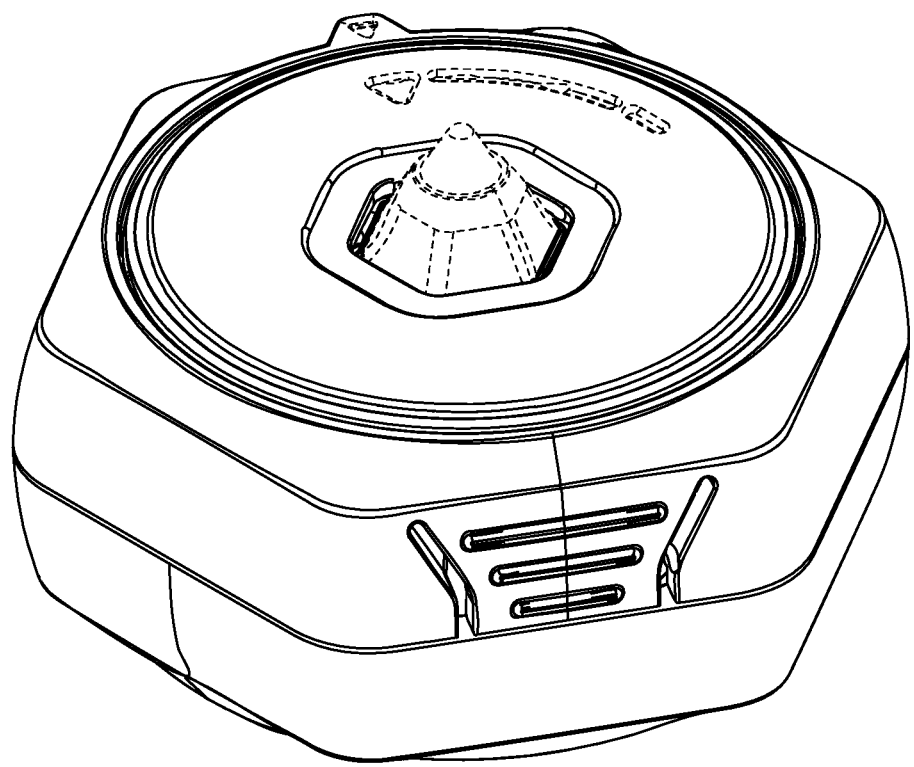
FIG. 66 shows an upper front right perspective view of a project support system, in accordance with one or more arrangements of the present disclosure; the view showing movable member of project support system in a fully extended position.
Figure 67:
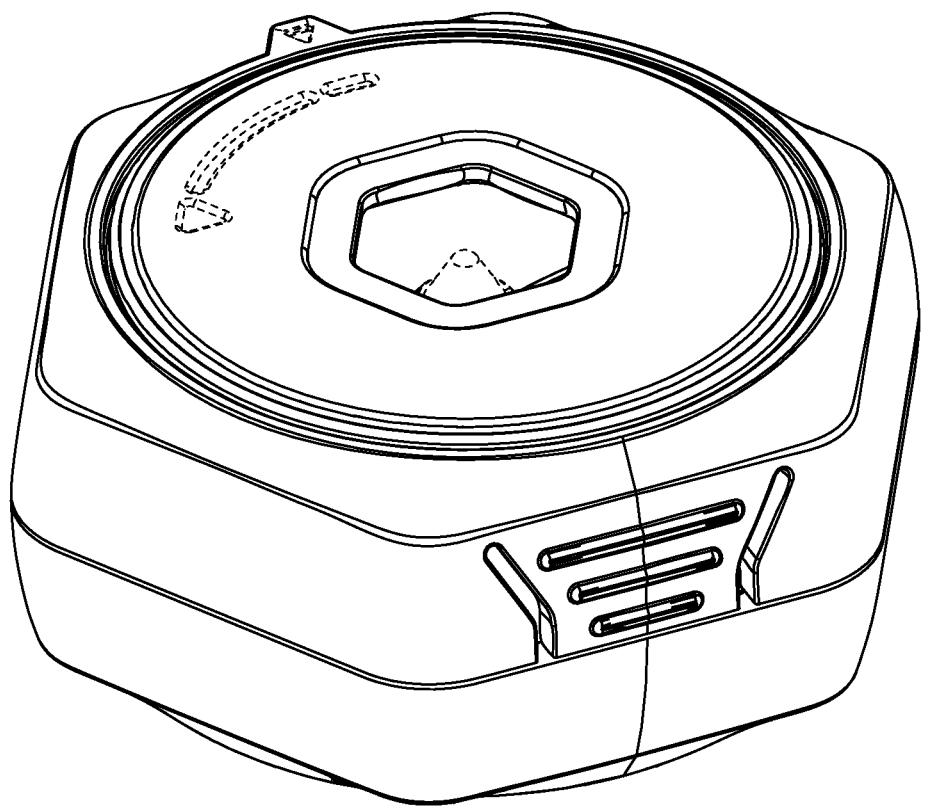
FIG. 67 shows an upper front right perspective view of a project support system, in accordance with one or more arrangements of the present disclosure; the view showing movable member of project support system in a fully retracted position.
Figure 68:
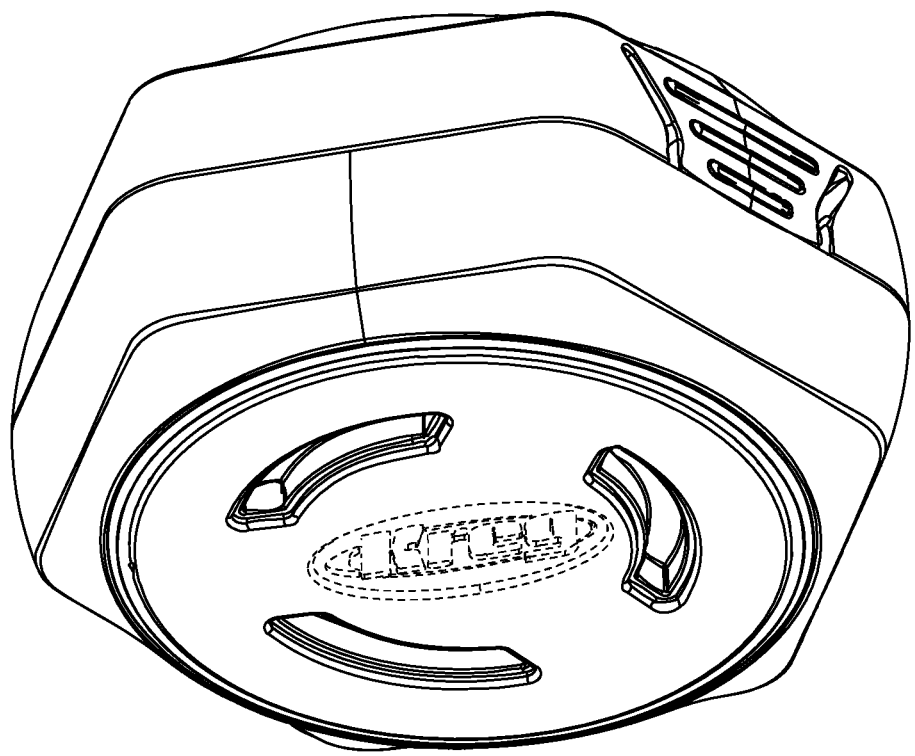
FIG. 68 shows a lower front right perspective view of a project support system, in accordance with one or more arrangements of the present disclosure.

With reference to FIG. 61, as one example alternative arrangement, base 14 includes a cylindrical member extending upward from bottom 74 and having an external surface with helical guide features 96 therein. In this example arrangement, movable member 12 includes helical guide features 68 formed in a recess in bottom 44 of movable member 12. Helical guide features 96 of base 14 are configured to engage helical guide features 68 of movable member 12 to cause movable member 12 to move upward and/or downward in response to movable member 12 being rotated relative to the base 14. In this example arrangement, exterior side surface 50 of movable member 12 includes vertical guide feature 70 configured to engage vertical guide feature 130 formed on interior surface 120 of dial 16. Vertical guide features 70 and 130 prevent movable member 12 from rotating relative to dial 16.

In Operation:

As dial 16 is rotated relative to base 14, the engagement of vertical guide features 70/130 cause movable member 12 to rotate relative to base 14 along with dial 16. As movable member 12 rotates relative to base 14, helical guide features 68 and 96 cause movable member 12 to move upward and/or downward. In this manner, movable member 12 is extended upward in response to dial 16 being rotated in one direction relative to base 14 and is retracted downward in response to dial 16 being rotated in the opposite direction relative to base 14.

Top Cover 20:

In one or more arrangements, system 10 includes a top cover 20. Top cover 20 is formed of any suitable size, shape and design and is configured to provide a surface for support of a workpiece 36 while providing an opening for extension of movable member 12 there through.

In the arrangement shown, as one example, top cover 20 has a generally circular planar shape having a top surface 146 and a bottom surface 148. In this example arrangement, top cover 20 has a hollow interior 140 and extends outward from an interior edge 142, adjacent to the hollow interior 140, to an exterior edge 144. The hollow interior 140 provides an opening through which moveable member 12 may be extended to provide a smaller surface for support of a project workpiece 36.

Connection Members 150:

In the arrangement shown, as one example, top cover 20 includes a set of connection members 150. Connection members 150 are formed of any suitable size, shape and design and are configured to facilitate connection of top cover 20 to base 14. In the arrangement shown, as one example, connection members 150 each have an elongated shape extending a length downward from bottom surface 148 of top cover 20 to an end 152.

In the arrangement shown ends 152 of connection members 150 have connection feature 154 configured to engage and connect with corresponding connection features 98 of base 14. Connection features 154 and 98 are formed of any suitable size, shape, and design and are configured to facilitate connecting of top cover 20 and base 14. In some arrangements, for example, connection features 154 and 98 may include various mechanisms that facilitate connection including, for example crimping, riveting, screwing, bolting, snap-fitting, friction fitting or any other mechanical process. In the shown arrangement, as one example, connection feature 154 have snap fittings configured to snap into corresponding holes or openings in base 14. In this example arrangement, the connection members 150 prevent top cover 20 from being pulled away from base 14 once connected.

Figure 15:
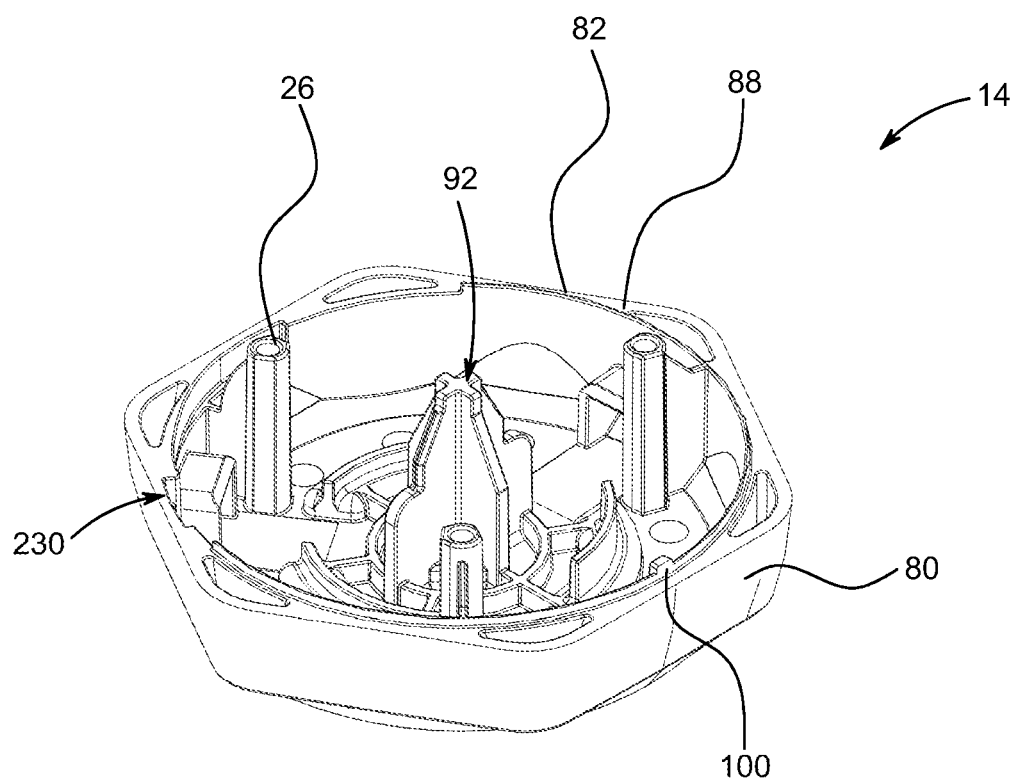
FIG. 15 shows am upper rear left perspective view of a base of a project support system, in accordance with one or more arrangements of the present disclosure.
Figure 16:
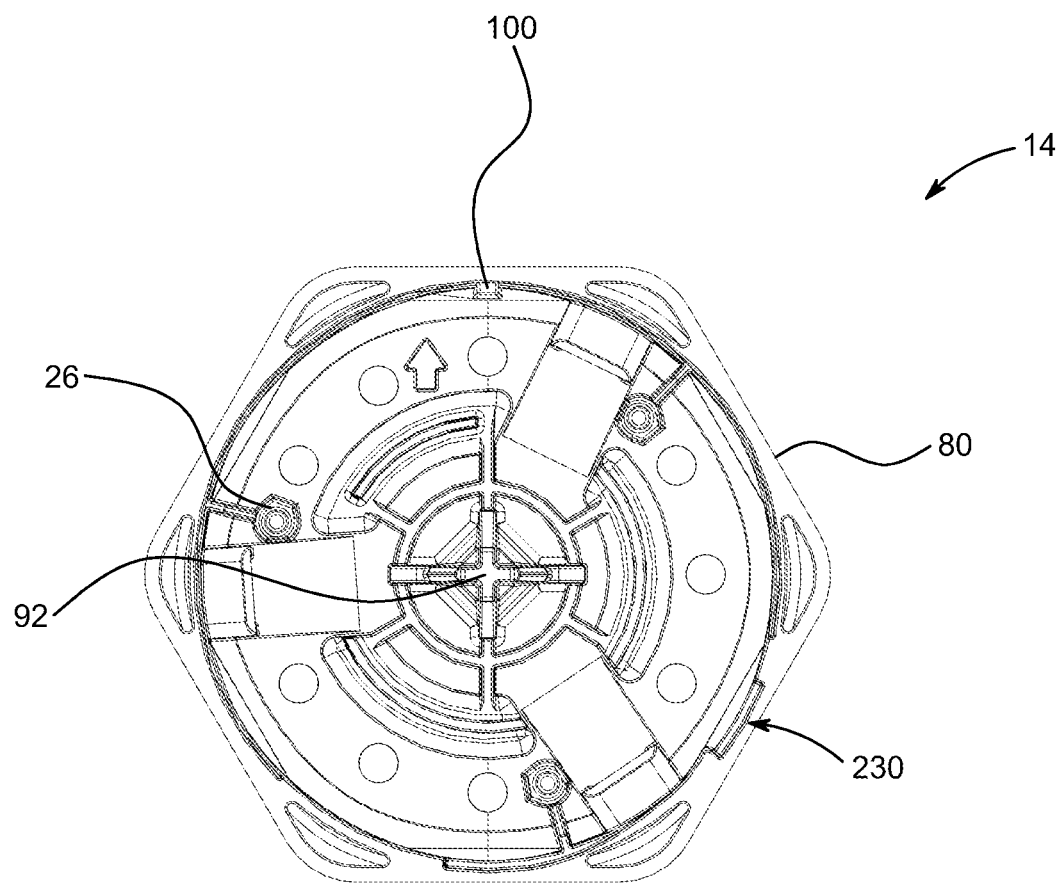
FIG. 16 shows a top view of a base of a project support system, in accordance with one or more arrangements of the present disclosure.
Figure 17:
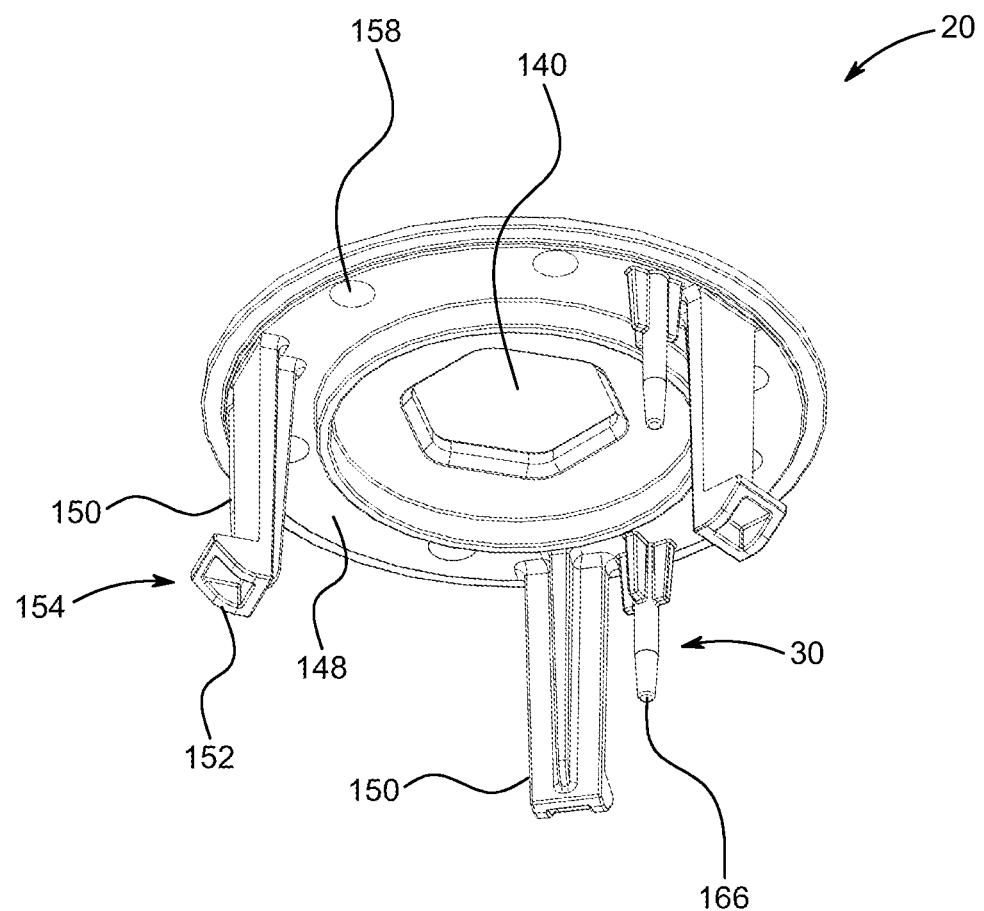
FIG. 17 shows a lower perspective view of a top cover of a project support system, in accordance with one or more arrangements of the present disclosure.
Figure 18:
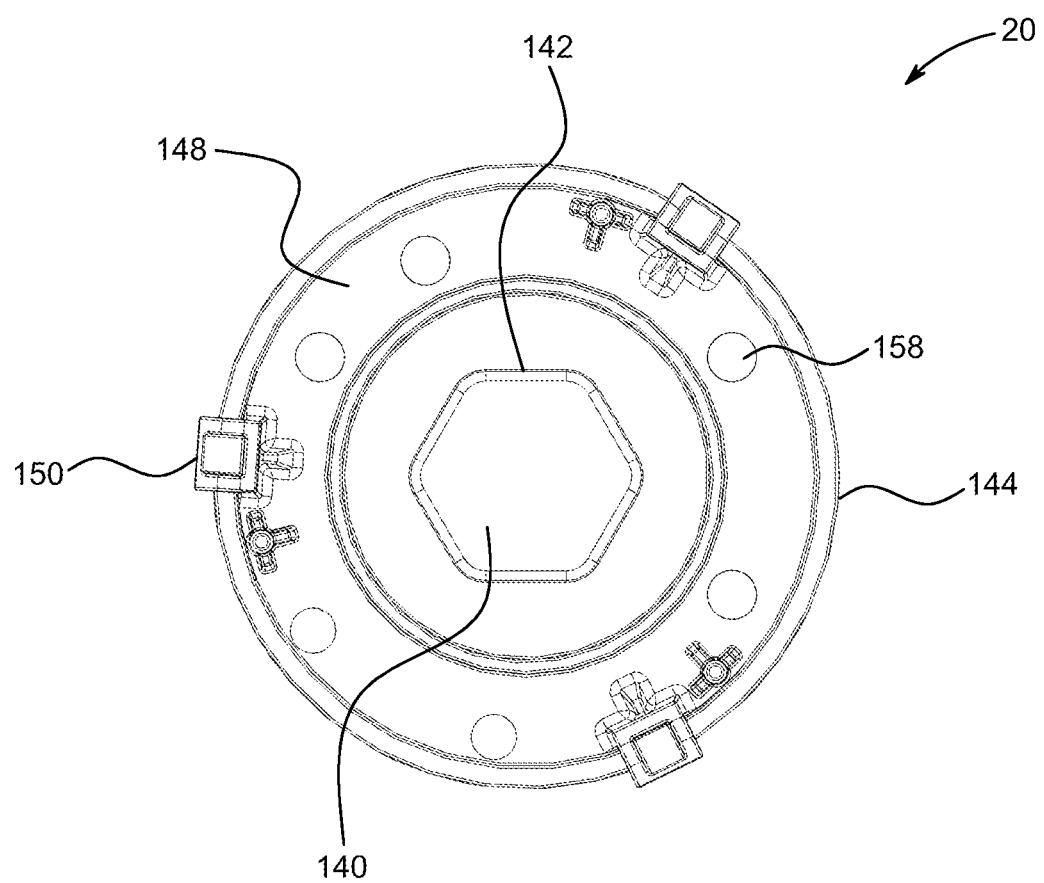
FIG. 18 shows a bottom view of a top cover of a project support system, in accordance with one or more arrangements of the present disclosure.
Figure 19:
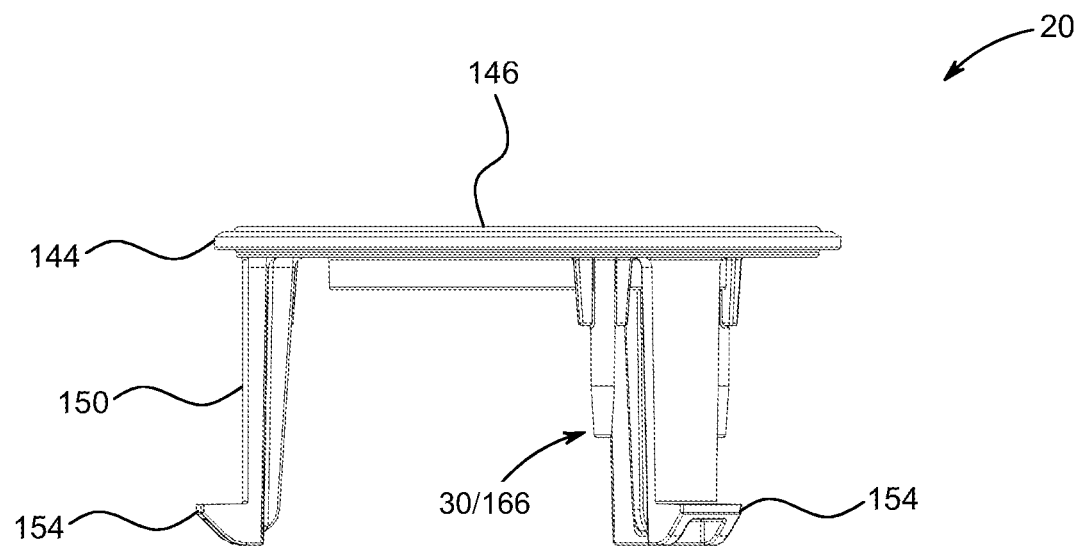
FIG. 19 shows a side view of a top cover of a project support system, in accordance with one or more arrangements of the present disclosure.
Figure 20:
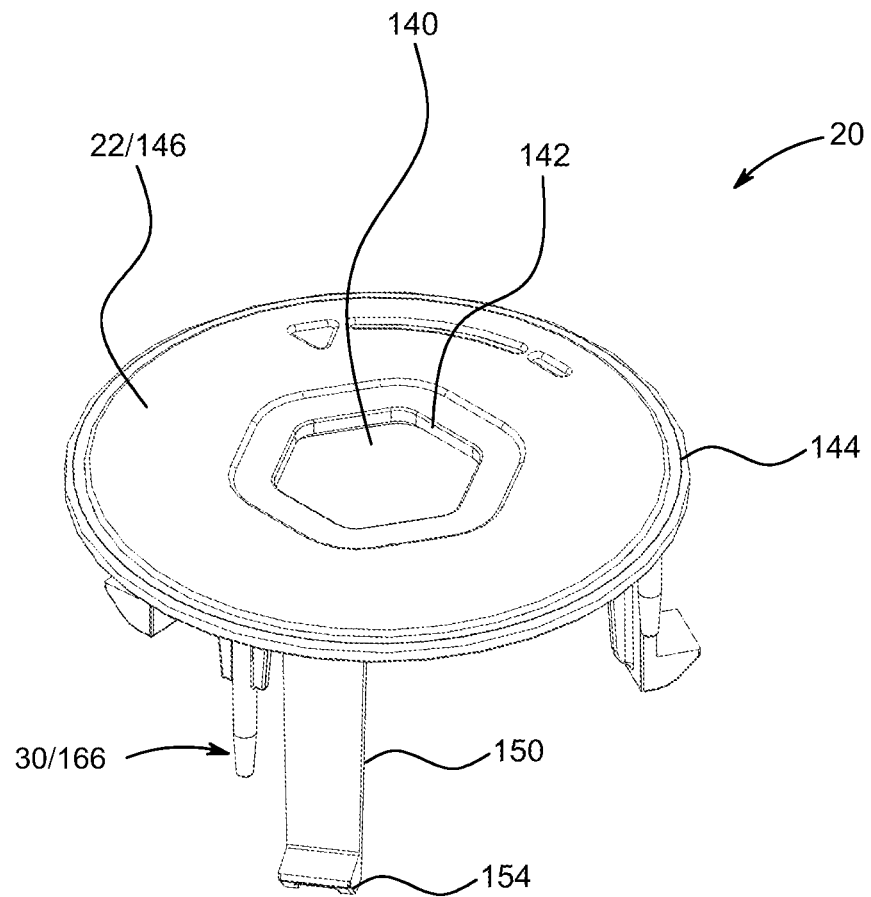
FIG. 20 shows an upper perspective view of a top cover of a project support system, in accordance with one or more arrangements of the present disclosure.

In the arrangement shown, as one example, connection feature 154 is positioned at the lower end of connection members 150 and have a curved or angled lower surface that facilitates insertion into openings in base 14 and a flat or shook-shaped upper surface that facilitates locking to openings in base 14 once inserted. In the arrangement shown, as one example, as top cover 20 is lowered onto base 14 the angled lower surface of connection features 154 engage the connection features 98 in the bottom of base 14. As these angled lower surface of connection features 154 of connection members 150 of top cover 20 engage the connection features 98 of base 14, the angled lower surface of connection features 154 guide connection members 150 to extend through the holes or openings of connection feature 98 in base 14. This engagement coupled with the downward movement of top cover 20 towards base 14 causes connection members 150 to bend or flex as they are guided through the openings of connection features 98 of base 14. This continues until the angled lower surface of connection features 154 of connection members 150 pass the generally flat lower surface of connection features 98 of base 14. Once the lower angled surface of connection features 154 of connection members 150 of top cover 20 pass the flat lower surface of connection features 98 of base 14 connection members 150 snap back into their desired alignment thereby causing locking engagement between the connection member 150 of top cover 20 with connection features 98 of base 14. In one arrangement, this is particularly well shown in FIG. 15 on the left side, wherein the flat upper surface of connection feature 154 of top cover 20 is in flat and flush and locking engagement with the flat lower surface of connection feature 98 of base 14. This flat-on-flat locking engagement of connection feature 154 of top cover 20 with connection feature 98 of base 14 prevents and top cover 20 from separating. Any other arrangement of connecting two components together is hereby contemplated for use for connecting top cover 20 and base 14 such as screwing, bolting, welding, adhering, gluing, snap fit features, threaded engagement, or the like or any combination thereof.

Rotation Stop Members 26:

In the arrangement shown, dial 16 is rotated to a first position to extend movable member 12 upward to the fully extended position and is rotated back to a second position to retract movable member 12 downward to the fully retracted position.

In the arrangement shown, as one example, system 10 includes a set of rotation stop members 26 configured to prevent dial 16 from rotating beyond the first and second positions. Rotation stop members 26 are formed of any suitable size, shape and design and are configured to prevent dial 16 from rotating beyond the first and second positions. In the arrangement shown, as one example, rotation stop members 26 have an elongated shape extending between a top surface of bottom 74 of base 14 upward toward bottom surface 148 of top cover 20. Rotation stop members 26 may extend all the way upward from a top surface of bottom 74 of base 14 to engage a bottom surface 148 of top cover 20 or other component of top cover 20. Alternatively rotation stop members 26 may extend part of the way between a top surface of bottom 74 of base 14 and a bottom surface 148 of top cover 20.

It is contemplated that, in some embodiments, rotation stop members 26 may extend downward from bottom surface 148 of top cover 20 all or part of the distance to bottom 74 of base 14. In the arrangement shown, as one example, the rotation stop members 26 extend through gaps 112 of dial 16 formed between interior portion 116, exterior portion 102, and connection members 132. In the arrangement shown, as one example, rotation stop members 26 are positioned so rotation stop members 26 contact a first side of connection members 132 when dial 16 is rotated to the first position, thereby preventing dial 16 from being rotated beyond the first position. In this example arrangement, rotation stop members 26 may contact a second side of connection members 132 when dial 16 is rotated in the other direction to the second position, thereby preventing dial 16 from being rotated beyond the second position. In this way, rotation stop members 26 define the fully extended position of dial 16 relative to base 14 and top cover 20. Or, said another way, in this way, rotation stop members 26 define the fully extended position and the fully lowered position of movable member 12.

In the arrangement shown, system 10 includes three rotation stop members 26 and dial 16 includes three connection members 132 and three gaps 112. This arrangement permits dial 16 to be rotated approximately 90 to 115 degrees. In this example arrangement, helical guide features 68 and 128 are configured to extend the movable member 12 upward from the fully retracted position to the fully extended position in response to rotating the dial 16 by approximately 115 degrees relative to base 14.

However, embodiments are not so limited. Rather, it is contemplated that the slope or pitch of helical features 68/128 may be adjusted to require more or less rotation of dial 16, relative to base 14, to move movable member 12 between extended and fully retracted positions. Similarly, it is contemplated that dial 16 may have more or fewer connection members 132 and/or system 10 may include more or fewer be rotation stop members 26 to permit dial 16 to rotate by a greater or lesser amount. Said another way, any other number of rotation stop members 26 are hereby contemplated for use as is any range of rotation.

In some embodiments, rotation stop members 26 may be configured to additionally or alternatively to function as support members 30. In such embodiments, rotation stop members 26 are configured to transfer downward forces that are applied to top cover 20 on to base 14 so as to support workpiece 36 and provide structural integrity to project support system 10. In such an arrangement, rotation stop members 26 improve support for top cover and increase the weight of workpiece 36 that that can be supported by system 10.

Additionally or alternatively, in one or more arrangements, rotation stop members 26 may be configured to facilitate a connection between top cover 20 and base 14. For example, upper portion 166 of rotation stop members 26 may be connected to lower portion 168, for example, by a screw driven downward through the upper portion 166 into the lower portion 168. However, it is contemplated that rotation stop members 26 could utilize any of various mechanisms facilitate a connection including, for example crimping, riveting, screwing, bolting, snap-fitting, friction fitting or any other mechanical process. In some embodiments, where rotation stop members 26 provide connection between top cover 20 and base 14, the rotation stop members 26 may operate as the connection members 150.

Support Members 30:

In the arrangement shown, project support system 10 includes support members 30. Support members 30 are formed of any suitable size, shape and design and are configured to provide structural rigidity, strength, and durability to system 10 and transfer downward forces that are applied to top cover 20 on to base 14 so as to support workpiece 36 and provide structural integrity to project support system 10.

In the arrangement shown, as one example, the connection members 150 of top cover 20 connect to connection features 98 of base 14. This connection serves to pull top cover 20 toward base 14.

In the arrangement shown, as one example, support members 30 are formed of elongated member extending between a top surface of bottom 74 of base 14 and a bottom surface 148 of top cover 20.

Support members 30 may extend all the way upward from a top surface of bottom 74 of base 14, or other component of base 14, to engage a bottom surface 148 of top cover 20, or other component of top cover 20.

Support members 30 may extend all the way downward from bottom surface 148 of top cover 20, or other component of top cover 20, to engage a top surface of bottom 74 of base 14, or other component of base 14.

Support members 30 may extend part of the way upward from a top surface of bottom 74 of base 14, or other component of base 14, as well as extend part of the way downward from bottom surface 148 of top cover 20, or other component of top cover 20, such that these upper portions of support members 30 engage the lower portions of support members 30 to form a complete support member 30 that extends between top cover 20 and base 14. Or, said in a more simplistic manner, support members 30 may extend part of the way between a top surface of bottom 74 of base 14 and a bottom surface 148 of top cover 20.

In this example arrangement, support members 30 include an upper portion 166 connected to bottom surface 148 of top cover 20 that extend downward, In this example arrangement, support members 30 also includes a lower portion 168 connected to the top surface of bottom 74 of base 14 that extend upward. When top cover 20 is connected to base 14 (e.g. by connection members 150), the lower end of upper portion 166 contacts and mates with the upper end of lower portion 168. In this way, a complete support extends between top cover 20 and base 14 to transfer weight and pressure across the hollow interior of project support system 10.

However, embodiments are not so limited. Rather, it is contemplated that, in some embodiments, support members 30 may extend downward from bottom surface 148 the entire distance to bottom 74. Additionally or alternatively, it is also contemplated that, in some embodiments, support members 30 may extend upward from bottom 74 of base 14 the entire distance to bottom surface 148 of top cover 20.

In the arrangement shown, as one example, the support members 30 extend from a top surface of bottom 74 through gaps 112 of dial 16 formed between interior portion 116, exterior portion 102, and connection members 132. In the arrangement shown, as one example, support members 30 are positioned just rearward of rotation stop members 26 in the direction of rotation of dial 16. In the arrangement shown, as one example, support members 30 as well as connection members 150 are positioned just rearward of rotation stop members 26 in the direction of rotation of dial 16. In this way, rotation stop members 26 contact one or more connection members 132 when dial 16 is rotated to a fully extended position or fully retracted position, thereby preventing dial 16, or more specifically connection members 132 of dial 16 from engaging support members 30 and/or connection members 150 thereby preventing damage or disruption to these components.

In the arrangement shown, system 10 includes three rotation stop members 26 and dial 16 includes three connection members 132. This arrangement permits dial 16 to be rotated approximately 115 degrees. In this example arrangement, helical guide features 68 and 128 are configured to extend the movable member 12 upward from the fully retracted position to the fully extended position in response to rotating the dial 16 by approximately 115 degrees relative to base 14.

However, embodiments are not so limited. Rather, it is contemplated that the slope of helical features 68/128 may be adjusted to require more or less rotation of dial 16, relative to base 14, to move movable member 12 between extended and fully retracted positions. Similarly, it is contemplated that dial 16 may have more or fewer support members 30 that may increase or reduce the ability to angularly rotate dial 16 relative to base 14.

In some embodiments, rotation stop members 26 may be configured to additionally or alternatively to function as support members. In such embodiments, rotation stop members 26 are configured to transfer downward forces that are applied to top cover 20 on to base 14. In such an arrangement, rotation stop members 26 improve support for top cover and increase weight of workpiece 36 that that can be supported by system 10.

Additionally or alternatively, in one or more arrangements, rotation stop members 26 may be configured to facilitate a connection between top cover 20 and base 14. In this way, rotation stop members 26 may also serve the function of support members 30 by transferring weight across the hollow interior of project support system 10.

Lock Features 28/228:

In the arrangement shown, as one example, system 10 includes one or more lock features 28/228 configured to prevent accidental rotation of dial 16 from the positions at which movable member 12 is in the fully extended position and/or the fully retracted position. Lock features 28/228 are formed of any suitable size, shape and design and are configured to inhibit rotation of dial 16 from the positions at which movable member 12 is in the fully extended position or the fully retracted position. In the arrangement shown, as one example, system 10 includes one or more lock features 28/228 in a lower end of the exterior portion 102 of dial 16. More specifically, in this example arrangement, dial 16 includes a lock feature 28/228 positioned at the lower end of exterior portion 102 where dial 16 engages rotational guide feature 88 of base 14.

In one example, in one or more arrangements system 10 may include a lock feature 28 that is configured to engage a raised protrusion 100 of base near rotational guide feature 88. In this example arrangement, the lock feature 28 is a ramp shaped downward protrusion having a gentle sloped front edge and a steep sloped back edge. The gentle sloped front edge of lock feature 28 allows the lock feature to ride over protrusion 100 with a lesser amount of force in a forward direction. The steep sloped back edge of lock feature 28 requires a larger amount of force ride over protrusion 100 in a backward direction. This configuration makes it easier to rotate dial 16 into a fully extended position (or for that matter a fully retracted position) than it does to rotate dial out of a fully extended position (or fully retracted position). This imbalance of force helps to hold dial 16 in a fully extended position (or fully retracted position).

In the arrangement shown, as one example, lock feature 28 is positioned so the lock feature 28 rides over protrusion 100 in the forward direction and rests just passed protrusion 100 when movable member 12 is in the fully extended position. In this manner, a larger amount of force is required to rotate dial 16 when the movable member 12 is in the fully extended position. Similarly, in some arrangements, system 10 may include a second lock feature 28 and second protrusion 100 positioned to require a larger amount of force to rotate dial 16 when the movable member 12 is in the fully retracted position. Additionally or alternatively, in one or more arrangements, system 10 may include a lock feature 228 that is configured to engage a recess 230 in base near rotational guide feature 88. In this example arrangement, the lock feature 228 is tab 232 extending downward from lower exterior edge 106 of exterior portion 102 of dial 16 and having a ramp shaped outward facing surface having a gentle sloped front edge and a steep sloped back edge. In this example arrangement, the outward facing surface of tab 232 engages an inward facing surface of rotational guide feature 88 and/or upper exterior edge 108 of exterior portion 102 or base.

In this example arrangement, when dial 16 is rotated to a fully extended position (or fully retracted position), lock feature 228 moves outward into recess 230. In this position, the steep sloped back edge of lock feature 232 and a steep sloped forward edge of recess 230 prevents dial 16 from being rotated in the opposite direction. In this example arrangement, lock features 228 includes slots 234 positioned in dial 16 on each side of lock feature 228 to form a button 236. In this example arrangement, slots 234 extend upward from lower exterior edge 106 of exterior portion 102 of dial 16 to permit button 236 and lock feature 228 to be moved inward by a user to facilitate move retract lock feature 228 from recess 230 and permit dial 16 to be rotated.

Notably, while the arrangements shown include either one or two sets of lock features 28 and/or 228 and protrusions 100 and/or recesses 230, any number of lock features 28 and protrusions 100 are hereby contemplated, such as three, four, five or more. Additional lock features 28 and protrusions 100 may provide greater locking force and more even hold. Any other configuration is hereby contemplated for locking project support system 10 in a fully extended and/or fully retracted position, such as a latch, lever, post and hole arrangement, a snap fit feature, a cam surface, frictional engagement, a screw or bolt or any other arrangement.

Top Surface Pad 22:

To provide maximum durability and strength and rigidity and ruggedness, the movable member 12, base 14, dial 16, mechanical assembly 18, top cover 20 and/or various other components of system 10 may be formed of a hard material such as a metal material, a metallic alloy material, plastic material, composite material, a nylon material, a fiber glass material or any other non-metallic material, or combination thereof. While hard materials are good for durability, strength, rigidity and ruggedness, hard materials tend to have a low coefficient of friction. That is, hard materials tend to slide easily. However, if a workpiece 36 is accidentally moved on the top support surface of system 10, such movement may cause damage to workpiece 36 or may cause injury to a craftsman. As such, it is important that workpiece 36 and project support system 10 resist unintentional movement during use.

In an arrangement shown, as one example, a top surface pad 22 is positioned over the top surface 146 of top cover 20. Top surface pad 22 is formed of any suitable size, shape and design and is configured to provide a slip-resistant surface for support of a project workpiece 36. In the arrangement shown, the top surface pad 22 has a generally planar shape similar to the shape of the top surface 146 of top cover 20. More specifically, top surface pad 22 has a generally circular planar shape having a top surface 180 and an opposing bottom surface 182 (not shown).

In this example arrangement, top surface pad 22 has a hollow interior 172 and extends outward from an interior edge 176, adjacent to the hollow interior 172, to an exterior edge 178. The hollow interior 172 in top surface pad 22 provides an opening through which moveable member 12 may be extended to provide a smaller surface for support of a project workpiece 36.

The top surface pad 22 may be formed of various material proving a high coefficient of friction (or at least a higher coefficient of friction as compared to top cover 20 and/or other, harder, components of system 10) including, for example rubber, polyolefins, polyesters, plastics (such as thermoplastics), and/or epoxies. Coefficient of friction describes the ratio of the force of friction between two bodies and the force pressing them together. The higher the coefficient of friction, the more force is required to cause the two bodies to slide with respect to one another. In the arrangement shown, as one example, top surface pad 22 has a higher coefficient of friction than the material that forms the top cover 20. In some embodiments, top surface pad 22 may be is textured so as to provide further increased friction.

In the arrangement shown, as one example, top surface pad 22 is attached to the top cover 20 with bottom surface 182 of top surface pad 22 in contact with top surface 146 of top cover 20. In the arrangement shown, as one example, top surface pad 22 includes a number of connection members 184 (not shown) configured to engage and connect with holes 158 in top cover 20. However, it is contemplated that top surface pad 22 may be attached to top cover 20 by any manner, method or means including, for example, crimping, riveting, screwing, bolting, snap-fitting, friction fitting or any other mechanical process; adhering using adhesives, epoxies, or other chemical bonding; depositing or spraying pad material onto top cover 20, and/or molding pad material into or onto the top cover 20.

Bottom Pad 24:

In the arrangement shown, system 10 includes a bottom pad 24 on a bottom surface of base 14. Bottom pad 24 is similar to top surface pad 22 in that it serves similar purposes to top surface pad 22 and therefore unless stated otherwise herein, the teaching with respect to top surface pad 22 applies to bottom pad 24. Bottom pad 24 is formed of any suitable size, shape and design and is configured to provide a slip-resistant surface for support of system 10 on a work surface. In the arrangement shown, the bottom pad 24 has a generally planar shape similar to the shape of bottom 74 of base 14. More specifically, in one arrangement shown bottom pad 24 has a generally planar hexagonal shape with a thin cross section extending between a top surface 196 and a bottom surface 198. In this example arrangement, bottom pad 24 has a hollow interior 190 and extends outward from an interior edge 192, adjacent to the hollow interior 190, to an exterior edge 194. The hollow interior 190 in bottom pad 24 provides an opening to provide access to holes 94, for example, to facilitate removal of materials (e.g., sawdust) that fall into base 14 through hollow interior 140 of top cover 20 during use.

Similar to top surface pad 22, bottom pad 24 may be formed of various material proving a high coefficient of friction including, for example rubber, polyolefins, polyesters, plastics (such as thermoplastics), and/or epoxies and may be textured or untextured. In the arrangement shown, as one example, bottom pad 24 has a higher coefficient of friction than the material that forms the base 14.

In the arrangement shown, as one example, bottom pad 24 is attached to the bottom surface of base 14. In the arrangement shown, as one example, bottom pad 24 includes a number of connection members 200 configured to engage and connect with some of the holes 94 in bottom 74 of base 14. However, it is contemplated that the bottom pad 24 may be attached to base 14 by any manner, method or means including, for example, crimping, riveting, screwing, bolting, snap-fitting, friction fitting or any other mechanical process; adhering using adhesives, epoxies, or other chemical bonding; depositing or spraying pad material onto base 14, and/or molding pad material into or onto base 14.

In Operation:

The multi-function project support system 10 provides a versatile project support that can be quickly and easily reconfigured by a craftsman to suit the particular needs of various tasks and operations performed in a workday. As one illustrative example, a craftsman may require different project supports in the preparation and finishing of a newly constructed wooden workpiece 36 (e.g., a bookshelf or end table). For instance, prior to finishing, the workpiece 36 is prepared by coarse and fine sanding. For sanding, a number of project support systems 10 described herein may be used to support workpiece 36 above a work surface to prevent workpiece 36 from being scratched (e.g., by stray wood/metal shavings or other shop debris). For a task like sanding, a larger surface is desired to provide more even support and prevent slipping or sliding of workpiece 36 as well as to prevent damage to the workpiece 36 when the immense pressure of sanding is applied.

To provide the larger surface for support of workpiece 36, each project support is configured by the craftsman to place movable member 12 in the fully retracted position. As previously described, the movable member 12 is moved to the fully retracted position by rotating dial 16 relative to the base 14 in one direction (e.g., counter-clockwise), until rotation is stopped by rotation stop members 26. Just before encountering rotation stop member 26, the craftsman may notice slight resistance as lock feature 28 engages and rides over a raised protrusion 100 to lock dial 16 in position.

With movable member 12 moved to the fully retracted position top surface pad 22 is the upper most surface of system 10. Accordingly, when workpiece 36 is placed on the project support system 10, top surface pad 22 touches and supports workpiece 36. As previously described, the larger surface area of top surface pad 22, provides a more distributed support and helps to prevent workpiece from sliding of slipping as workpiece 36 is sanded.

Once workpiece 36 is sanded and cleaned, workpiece 36 is finished by applying one or more coatings of wood treatments to the workpiece (e.g., stain, varnish, tung oil, polyurethane, and/or paint). In applying most wood treatments, the treatment is applied (e.g., by a brush) and allowed to dry or cure for a period of time before being touched or handled. Drying time may be, for example, one hour, two hours, or even twenty-four hours for some products. Typically, wood treatments are applied in two partial applications, to avoid touching the treated area prior to drying. For example, one side of a workpiece may be painted and allowed to dry before it is flipped over to paint the other side.

To accelerate this timeline, the craftsman may extend movable members 12 of the project support system 10 to provide a smaller support surface. As previously described, movable member 12 is moved to the fully extended position by rotating dial 16 relative to the base 14 in the other direction (e.g., clockwise). Due to the lock feature 28, the craftsman may need to apply greater initial force to rotate dial 16 out of the fully-retraced position. Rotation of dial 16 is continued until rotation is stopped by rotation stop members 26. Just before encountering rotation stop member 26, the craftsman may again notice slight resistance as lock feature 28 engages and ride over another raised protrusion 100 to lock dial 16 in the fully extended position.

With movable member 12 moved to the fully extended a smaller top surface of movable member 12 is the upper most surface of system 10. Accordingly, when workpiece 36 is placed on the project support system 10, only the small top surface of movable member 12 touches and supports workpiece 36. Due to the small area of contact, the craftsman may apply a wood treatment and flip the workpiece prior to completely drying. The small contact area of the movable member 12 avoids damages to the newly applied treatment.

Once all treatments are applied and dried, the workpiece is removed from the project support systems 10. The craftsman may move moveable member 12 back to the fully retracted position to place the project support systems 10 in a more compact and/or stackable form for storage.

From the above discussion it will be appreciated that the project support system 10 improves upon the state of the art. Specifically, various embodiments provide improved functionality over prior art project supports; provide a multifunction project support system 10 having a reconfigurable support surface; provide a project support system 10 that is easily and quickly configured for use with any of a number of different shape and size workpieces; provide a project support that is strong, robust, and durable; provide a project support system 10 that can be used in many applications; provide a project support that can be used with practically any support surface or workbench; provide a project support system 10 that provides unique functionality; provide a project support that is fast to use; provide a project support system 10 that is safe to use; provide a project support that saves time; provide a project support that is compact in size; provide a project support that is easily stored; provide a project support system 10 that is portable; that is easy and intuitive to use; provide a project support system 10 that has a long useful life; provide a project support system 10 that can support a painted surface prior to fully drying; provide a project support system 10 that is high quality; and/or provide a project support system 10 that improves the quality of the products made using the device.

It will be appreciated by those skilled in the art that other various modifications could be made to the device without parting from the spirit and scope of this disclosure. All such modifications and changes fall within the scope of the claims and are intended to be covered thereby.

What is claimed:

1. A multifunction project support system, comprising:
a base;
a dial;
the dial rotatably connected to the base;
a top cover;
the top cover having a hollow interior, an interior edge adjacent the hollow interior, an exterior edge and a first surface extending from the interior edge to the exterior edge;
a movable member;
the movable member having a top and a bottom;
the top of the movable member having a second surface having an area that is smaller than that of the first surface;
a mechanical assembly,
the mechanical assembly being configured and arranged to extend the movable member upward through the hollow interior to a fully extended position in response to the dial being rotated in a first direction relative to the base;
the mechanical assembly being configured and arranged to retract the movable member downward back through the hollow interior to a fully retracted position in response to the dial being rotated in a second direction relative the base;
the second direction being opposite the first direction; and
at least one lock feature;
wherein the at least one lock feature is configured and arranged to inhibit rotation of the dial.

2. The system of claim 1, wherein:
the base has an upper exterior edge and a lower exterior edge;
the base has a bottom, the bottom extending outward from a center point to the lower exterior edge, the lower exterior edge extending around the center point;
the base has an exterior side surface extending between the upper exterior edge and the bottom; and
the dial has an axis of rotation through the center point of the base.

3. The system of claim 1, wherein when in the fully extended position the second surface is above the first surface.

4. The system of claim 1, wherein when in the fully retracted position the second surface is below the first surface.

5. The system of claim 1, wherein when in the fully retracted position the second surface is flush with the first surface.

6. The system of claim 1, wherein the movable member has a tapered shape.

7. The system of claim 1, wherein:
the movable member includes an exterior side surface having a cylindrical shape and extending between an upper end and a lower end;
the movable member includes a first helical feature on the exterior side surface;
the dial includes a second helical feature; and
wherein the second helical feature is configured to engage the first helical feature and move the movable member upward in response to the dial being rotated in the first direction.

8. The system of claim 1, wherein:
the movable member includes a first vertical guide feature;
the base includes a second vertical guide feature; and
wherein the second vertical guide feature being configured to engage the first vertical guide feature and prevent the movable member from being rotated relative to the base when the dial is rotated relative to the base.

9. The system of claim 1, wherein:
the movable member includes a recess in the bottom of the movable member;
the movable member includes a first helical feature in the recess of the movable member;
the base includes a second helical feature; and
wherein the second helical feature is configured to engage the first helical feature and move the movable member upward in response to the dial being rotated in the first direction.

10. The system of claim 9, wherein:
the movable member includes a first vertical guide feature;
the dial includes a second vertical guide feature; and
the second vertical guide feature being configured to engage the first vertical guide feature and rotate the movable member along with the dial when the dial is rotated relative to the base.

11. The system of claim 1, wherein:
the dial includes an exterior portion having a ring shape;
the exterior portion has an exterior surface, extending between a lower exterior edge and an upper exterior edge;
the exterior portion has an interior surface;
the dial includes an interior portion;
the interior portion having a ring shape with a hollow interior;
the interior portion has a top surface, a bottom surface, an interior surface extending between the top and bottom surfaces, and an exterior surface extending between the top and bottom surfaces; and
the dial includes a plurality of connection members operably connecting the interior portion to the exterior portion.

12. The system of claim 1, further comprising a pad attached to the first surface of the top cover, the pad having a higher coefficient of friction than a material forming the top cover.

13. The system of claim 1, further comprising a pad attached to a bottom surface of the base, the pad having a higher coefficient of friction than a material forming the base.

14. The system of claim 1, further comprising at least one stop member;
wherein the at least one stop member is configured and arranged to prevent the dial from being rotated in the first direction when the movable member is in the fully extended position.

15. The system of claim 1, further comprising at least one stop member;
wherein the stop member is configured and arranged to prevent the dial from being rotated in the second direction when the movable member is in the fully retracted position.

16. The system of claim 1, further comprising at least one stop member; and
wherein the at least one stop member has an elongated shape extending from the base to the top cover through an opening of the dial.

17. The system of claim 1, wherein the at least one lock feature is configured and arranged to inhibit rotation of the dial when the movable member is in the fully extended position.

18. The system of claim 1, wherein the at least one lock feature is configured and arranged to inhibit rotation of the dial when the movable member is in the fully retracted position.

19. A multifunction project support system, comprising:
a base;
a dial;
the dial rotatably connected to the base;
a top cover;
the top cover having an opening,
a movable member;
the movable member having an upper end;
a mechanical assembly,
the mechanical assembly being configured and arranged to extend the movable member upward through the opening to a fully extended position in response to the dial being rotated in a first direction relative to the base;
the mechanical assembly being configured and arranged to retract the movable member downward back through the opening to a fully retracted position in response to the dial being rotated in a second direction relative the base;
the second direction being opposite the first direction; and
at least one lock feature;
wherein the at least one lock feature is configured and arranged to inhibit rotation of the dial.

20. The system of claim 19, wherein the surface area of an upper surface of the top cover is greater than an upper surface of the movable member.

21. The system of claim 19, wherein when in the fully extended position the upper end of the movable member is above an upper surface of the top cover.

22. The system of claim 19, wherein when in the fully retracted position the upper end of the movable member is below an upper surface of the top cover.

23. The system of claim 19, wherein when in the fully retracted position the upper end of the movable member is flush with an upper surface of the top cover.

24. The system of claim 19, wherein the movable member has a tapered shape.

25. The system of claim 19, wherein:
the movable member includes a first helical feature;
the dial includes a second helical feature; and
wherein the second helical feature is configured to engage the first helical feature and move the movable member upward in response to the dial being rotated in the first direction.

26. The system of claim 19, wherein:
the movable member includes a first helical feature;
the dial includes a second helical feature; and
wherein the second helical feature is configured to engage the first helical feature and move the movable member downward in response to the dial being rotated in the second direction.

27. The system of claim 19, wherein:
the movable member includes a first vertical guide feature;
the base includes a second vertical guide feature; and
wherein the second vertical guide feature being configured to engage the first vertical guide feature and prevent the movable member from being rotated relative to the base when the dial is rotated relative to the base.

28. The system of claim 19, wherein the at least one lock feature is configured and arranged to inhibit rotation of the dial when the movable member is in the fully extended position.

29. The system of claim 19, wherein the at least one lock feature is configured and arranged to inhibit rotation of the dial when the movable member is in the fully retracted position.

30. A multifunction project support system, comprising:
a base;
a dial;
the dial rotatably connected to the base;
a top cover;
the top cover having an opening,
a movable member;
the movable member having an upper end;
a mechanical assembly,
the mechanical assembly being configured and arranged to move the movable member between a fully extended position and a fully retracted position;
at least one lock feature;
wherein the at least one lock feature is configured and arranged to inhibit rotation of the dial;
wherein when the movable member is in the fully extended position the upper end of the movable member extends above a top surface of the top cover;
wherein when the movable member is in the fully retracted position, the upper end of the movable member is flush with or recessed to an upper surface of the top cover;
wherein when the movable member is in the fully retracted position, the multifunction project support system is configured to operate as a project support;
wherein when the movable member is in the fully retracted position, the multifunction project support system is configured to operate as a painter's point.

31. A multifunction project support system, comprising:
a base;
a dial;
the dial rotatably connected to the base;
the dial having an opening,
a movable member;
the movable member having an upper end;
a mechanical assembly,
the mechanical assembly being configured and arranged to extend the movable member upward through the opening to a fully extended position in response to the dial being rotated in a first direction relative to the base;
the mechanical assembly being configured and arranged to retract the movable member downward back through the opening to a fully retracted position in response to the dial being rotated in a second direction relative the base;
the second direction being opposite the first direction; and
at least one lock feature;
wherein the at least one lock feature is configured and arranged to lock the movable member.

32. A multifunction project support system, comprising:
a base;
a dial;
the dial rotatably connected to the base;
the dial having an opening,
a movable member;
the movable member having an upper end;
a mechanical assembly,
the mechanical assembly being configured and arranged to move the movable member between a fully extended position and a fully retracted position;
at least one lock feature;
wherein the at least one lock feature is configured and arranged to lock the movable member;
wherein when the movable member is in the fully extended position the upper end of the movable member extends above a top surface of a top cover;
wherein when the movable member is in the fully retracted position, the upper end of the movable member is flush with or recessed to an upper surface of the top cover;
wherein when the movable member is in the fully retracted position, the multifunction project support system is configured to operate as a project support;
wherein when the movable member is in the fully retracted position, the multifunction project support system is configured to operate as a painter's point.

* * * * *

UNITED STATES PATENT AND TRADEMARK OFFICE
CERTIFICATE OF CORRECTION

PATENT NO. : 11,649,922 B2
APPLICATION NO. : 17/239915
DATED : May 16, 2023
INVENTOR(S) : Lyons et al.

It is certified that error appears in the above-identified patent and that said Letters Patent is hereby corrected as shown below:

In the Claims

Claim 15 should read as follows:
15. The system of claim 1, further comprising at least one stop member; wherein the at least one stop member is configured and arranged to prevent the dial from being rotated in the second direction when the movable member is in the fully retracted position.

Claim 19 should read as follows:
19. A multifunction project support system, comprising: a base; a dial; the dial rotatably connected to the base; a top cover; the top cover having an opening; a movable member; the movable member having an upper end; a mechanical assembly, the mechanical assembly being configured and arranged to extend the movable member upward through the opening to a fully extended position in response to the dial being rotated in a first direction relative to the base; the mechanical assembly being configured and arranged to retract the movable member downward back through the opening to a fully retracted position in response to the dial being rotated in a second direction relative the base; the second direction being opposite the first direction; and at least one lock feature; wherein the at least one lock feature is configured and arranged to inhibit rotation of the dial.

Claim 30 should read as follows:
30. A multifunction project support system, comprising: a base; a dial; the dial rotatably connected to the base; a top cover; the top cover having an opening; a movable member; the movable member having an upper end; a mechanical assembly, the mechanical assembly being configured and arranged to move the movable member between a fully extended position and a fully retracted position; at least one lock feature; wherein the at least one lock feature is configured and arranged to inhibit rotation of the dial; wherein when the movable member is in the fully extended position, the upper end of the movable member extends above a top surface of the top cover; wherein when the movable member is in the fully retracted position, the upper end of the movable member is flush with or recessed to an upper surface of the top cover; wherein when the movable member is in the fully retracted position, the multifunction project support system is configured to operate as a project support; wherein when Signed and Sealed this
Eleventh Day of July, 2023

*Katherine Kelly Vidal*

Katherine Kelly Vidal
*Director of the United States Patent and Trademark Office* the movable member is in the fully extended position, the multifunction project support system is configured to operate as a painter's point.

Claim 31 should read as follows:
31. A multifunction project support system, comprising: a base; a dial; the dial rotatably connected to the base; the dial having an opening; a movable member; the movable member having an upper end; a mechanical assembly, the mechanical assembly being configured and arranged to extend the movable member upward through the opening to a fully extended position in response to the dial being rotated in a first direction relative to the base; the mechanical assembly being configured and arranged to retract the movable member downward back through the opening to a fully retracted position in response to the dial being rotated in a second direction relative the base; the second direction being opposite the first direction; and at least one lock feature; wherein the at least one lock feature is configured and arranged to lock the movable member.

Claim 32 should read as follows:
32. A multifunction project support system, comprising: a base; a dial; the dial rotatably connected to the base; the dial having an opening; a movable member; the movable member having an upper end; a mechanical assembly, the mechanical assembly being configured and arranged to move the movable member between a fully extended position and a fully retracted position; at least one lock feature; wherein the at least one lock feature is configured and arranged to lock the movable member; wherein when the movable member is in the fully extended position, the upper end of the movable member extends above a top surface of a top cover; wherein when the movable member is in the fully retracted position, the upper end of the movable member is flush with or recessed to an upper surface of the top cover; wherein when the movable member is in the fully retracted position, the multifunction project support system is configured to operate as a project support;
wherein when the movable member is in the fully extended position, the multifunction project support system is configured to operate as a painter's point.